March 27, 1956

N. D. NEWBY

ROTATIONAL USE OF REGISTER CIRCUITS IN TELEPHONE SWITCHING SYSTEMS 2,740,003

Filed Oct. 25, 1952

14 Sheets-Sheet 1

INVENTOR
N. D. NEWBY
BY J. W. Schmied
ATTORNEY

March 27, 1956

N. D. NEWBY 2,740,003

ROTATIONAL USE OF REGISTER CIRCUITS IN TELEPHONE SWITCHING SYSTEMS

Filed Oct. 25, 1952

14 Sheets-Sheet 2

INVENTOR
N. D. NEWBY
BY J. W. Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952 14 Sheets-Sheet 3

INVENTOR
N. D. NEWBY
BY
J W Schmied
ATTORNEY

INVENTOR
N. D. NEWBY
BY J W Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952 14 Sheets-Sheet 5

INVENTOR
N. D. NEWBY
BY J W Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952 14 Sheets-Sheet 6

INVENTOR
N. D. NEWBY
BY J. W. Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952

14 Sheets-Sheet 7

INVENTOR
N. D. NEWBY
BY J W Schmied
ATTORNEY

March 27, 1956

N. D. NEWBY

ROTATIONAL USE OF REGISTER CIRCUITS IN TELEPHONE SWITCHING SYSTEMS 2,740,003

Filed Oct. 25, 1952

14 Sheets-Sheet 8

INVENTOR
N. D. NEWBY
BY J W Schmied
ATTORNEY

March 27, 1956 N. D. NEWBY 2,740,003
ROTATIONAL USE OF REGISTER CIRCUITS IN
TELEPHONE SWITCHING SYSTEMS
Filed Oct. 25, 1952 14 Sheets-Sheet 9

INVENTOR
N. D. NEWBY
BY J. W. Schmied
ATTORNEY

INVENTOR
N. D. NEWBY
BY J W Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952 14 Sheets-Sheet 11

INVENTOR
N. D. NEWBY
BY J. W. Schmied
ATTORNEY

INVENTOR
N. D. NEWBY
BY J. W. Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952 14 Sheets-Sheet 13

INVENTOR
N. D. NEWBY
BY J W Schmied
ATTORNEY

March 27, 1956 N. D. NEWBY 2,740,003

ROTATIONAL USE OF REGISTER CIRCUITS IN TELEPHONE SWITCHING SYSTEMS

Filed Oct. 25, 1952 14 Sheets-Sheet 14

INVENTOR
N. D. NEWBY
BY J. W. Schmied
ATTORNEY 2,740,003

ROTATIONAL USE OF REGISTER CIRCUITS IN TELEPHONE SWITCHING SYSTEMS

Neal D. Newby, Leonia, N. J., assignor to Bell Telephone Laboratories, Incorporated, New York, N. Y., a corporation of New York Application October 25, 1952, Serial No. 316,840

19 Claims. (Cl. 179—18)

This invention relates to calling and signaling methods, apparatus and systems, and more particularly to improvements in the methods, apparatus and systems disclosed in the patent application of Malthaner-Newby-Vaughan filed on or about December 30, 1948, Serial No. 68,234, now Patent 2,615,971.

Signaling and calling arrangements in accordance with the present invention may be advantageously employed in automatic telephone switching systems wherein a subscriber initiates a call and directs automatic switching equipment at distant switching points to establish connections to desired called party's line.

More particularly, the present invention is directed to calling equipment and methods of operation thereof in which each element or digital position of a called subscriber's designation is represented by two pulses of short duration which may be readily transmitted over voice frequency communication paths and in which the time interval elapsing between the two pulses represents the numerical value of the digit or the characteristics of the symbol.

In accordance with the exemplary embodiment of the invention set forth in detail herein the signaling or calling pulses represent subscriber's designations. In many types of telephone switching systems these designations comprise a multidigit number which frequently includes an office designation of one or more letters or numbers or a combination of letters and numbers followed by a multidigit line number. These designations are in turn sometimes followed by another letter or number which is frequently employed to designate the particular party connected to a party line.

It is, of course, possible to designate called subscriber's station by any suitable symbol or group of symbols forming a code or station designation.

In order that these designations may be more readily referred to, it is assumed that each designation comprises a number of elements which in the exemplary embodiment set forth herein may be any number, five or greater.

Each of these elements is referred to herein as a symbol or digit. In order to avoid further ambiguity in describing the operation of the system in response to the various signals representing the symbols or digits, the designation will be described as comprising a number of digital positions and each of the digits or symbols in each of the digital positions or symbol positions may comprise a digit or any one of a plurality of different magnitudes or may comprise symbols in any one of a plurality of different characteristics.

Although the number of symbols or digits that each designation may comprise may be any number and as in the case of a national dialing code comprises eleven digits and symbols, for the purpose of illustrating the arrangement set forth herein in detail, it is assumed that the last five digits of the designation are the only ones of interest. This assumption is based upon the fact that the specific embodiment of the present invention described herein is arranged to be used at a terminating local office where the last five digits of the designation are all that are required to complete a connection to the desired called party's line. It is to be understood that this assumption was made only to aid in the description of the present invention in a specific embodiment given herein and in no way limits the scope or spirit thereof because the present invention can be utilized with equal effectiveness at an originating office or at an intermediate switching point.

Each of the pulses transmitted is of sufficiently short duration so that it may be readily transmitted over voice frequency communication paths, through repeating coils, filters, amplifiers, and other equipment associated with voice frequency communication paths. These pulses may be also transmitted through modulating equipment and then over carrier current and radio systems in the same manner as voice frequency currents, as is well understood.

Each pulse of a pair of pulses representing each symbol or digit of the called subscriber's designation is of the same polarity and each pair of pulses representing succeeding symbols or digits of the called subscriber's designation is of opposite polarity so that each pair of pulses as received by the arrangement set forth in detail herein is of the opposite polarity from the preceding pair received.

The arrangement set forth herein in detail is designed to cooperate with a source of such pulses representing the number or designation of the called station which is transmitted repetitively. A suitable form of pulse generating equipment for generating pulses at the subscriber's station with which the exemplary embodiment set forth herein is designed to cooperate is disclosed in Patent 2,499,606, issued to D. B. Parkinson, March 7, 1950.

In systems of the type set forth herein in detail, it is necessary to distinguish or recognize the beginning of each station designation so that the digits may be placed in their proper position in the called subscriber's designation. In order that this may be accomplished the calling equipment at the subscriber's station is arranged to interpose delays or pauses, frequently called blanks, in the transmission of signals between each series of pulses or signals representing a complete subscriber's designation.

The arrangement set forth in the above-identified application of Malthaner-Newby-Vaughan, Serial No. 68,234, filed on December 30, 1948, now Patent 2,615,971, employs a means for recognizing the pauses or blanks between repetitions of the called subscriber's designation which conditions the receiving equipment to respond and record the first series of pulses following the reception of the first blank or pause between designations. In employing such an arrangement the holding time of the receiver may be of considerable magnitude with respect to the signal reception time of a called subscriber's designation, particularly in those instances where the receiver starts to function after and near the start of the transmission of the signals representing first symbols or digits of the called subscriber's designation.

It is an object of the present invention to provide methods, apparatus and circuits to reduce the holding time of the receiving and registering circuits in a high speed dialing receiver operating on repetitively transmitted signals and thus effectively reduce the overall time required for receiving and recording a predetermined group of signals.

The number of receiver register circuits necessary in any office is a function of the volume of traffic and of the length of time required to complete a receiving and registering operation, since one receiver register circuit can only service one subscriber at any given time. Therefore, it is apparent that any means for reducing the time required for receiving and recording a called station designation will reduce the overall cost of the signaling system by reducing the total number of receivers required at each office of the system.

It is an object of the present invention to provide a receiver circuit with a reduced reception time which when utilized in a high speed signaling system will reduce the overall cost thereof by reducing the total number of such receivers required at each office.

Another object of the invention is to provide a means for the rotational use of register circuits in a receiver employed in a telephone switching system of the repetitive signaling type whereby the signal reception time is substantially decreased.

Still another object of the invention is to provide a means for the rotational use of register circuits in a receiver employed in a telephone switching system of the repetitive signaling type whereby the total number of such register circuits in each receiver may be reduced to a quantity equal only to the number of digits of a called designation which is required at any particular location to carry out a desired switching function thus eliminating the necessity of counting or registering all digits of the called designation at all locations.

When digit register circuits of a receiver are used in rotation, with the first digit of the desired numbers randomly located among the registers, it is necessary to either mark the location of this digit and spill or transfer it and the following digits progressively one at a time to the switching control equipment or arrange the spill or transfer leads in such a manner that the digits will be transferred to the control equipment and simultaneously arranged in their proper order.

A feature of this invention relates to apparatus for transferring a registered series of digital signals, the first digit of which may be randomly located in the register circuits, to storage circuits and simultaneously to arrange the series of digits in their correct order.

Another feature of the present invention relates to apparatus which is actuated when the receiver starts to function between a "start" signal and a "stop" signal of a pair representing a digital value which causes the circuits of the receiver to be reconditioned for reception of the next succeeding pair of signals and to disregard the first individual signal received.

Still another feature of the present invention relates to apparatus which is actuated during the reception of a series of signals, when one or more of such signals is not properly received. This apparatus causes the circuits of the receiver to be reconditioned for reception of the next succeeding pair of signals and to discard the improperly received signals.

Another feature of the present invention relates to apparatus which is actuated when some trouble develops in the receiver circuits. This apparatus restores the circuits to normal and blocks the receiver from further reception of signals.

The foregoing objects and features and other objects and features of this invention, the novelty of which are pointed out in the claims appended hereto, may be more readily understood from the following description of an exemplary embodiment of this invention when read with reference to the attached drawings in which:

Fig. 1 outlines broadly certain elements of an exemplary system and the manner in which they cooperate one with another;

Fig. 2 (on the same sheet with Fig. 12) shows the manner in which Figs. 3, 4, 5, 6, 7, 7A, 8, 9, 10, 11 and 12 are positioned adjacent to one another to show in detail the various circuits of an exemplary embodiment of the invention;

Fig. 3 shows the details of the band-pass filter circuit, the automatic volume control circuit, the detector circuit, the disabling multivibrator circuit, the gate circuit and the pulse absorbing circuit;

Fig. 4 shows the details of the recording amplifier circuit and the start circuit;

Fig. 5 shows the magnetic recorder and its associated pick-up coils and permanent magnet eraser;

Fig. 5A illustrates the direction of the residual magnetic induction in the disc of the magnetic recorder after it has passed the pole-pieces of the recording coil;

Fig. 6 shows the details of integrator circuits;

Fig. 7 shows the details of translator-register circuits;

Fig. 7A shows details of the storage wipe-out circuit, the spill amplifier and spill relay circuits and the manner in which they are connected to effect a transfer of digital information stored in the translator-register circuits to other storage circuits;

Fig. 8 shows a portion of the digit storing circuits, the comparator circuit and various control circuits of an exemplary embodiment of the invention;

Fig. 9 shows the remainder of the digit storing circuits, the comparator circuit and various control circuits of an exemplary embodiment of the invention;

Fig. 10 shows the recycle control circuit and the reference amplifier circuit;

Fig. 11 shows the integrator control circuit;

Fig. 12 shows the digit steering circuit;

Figure 1:
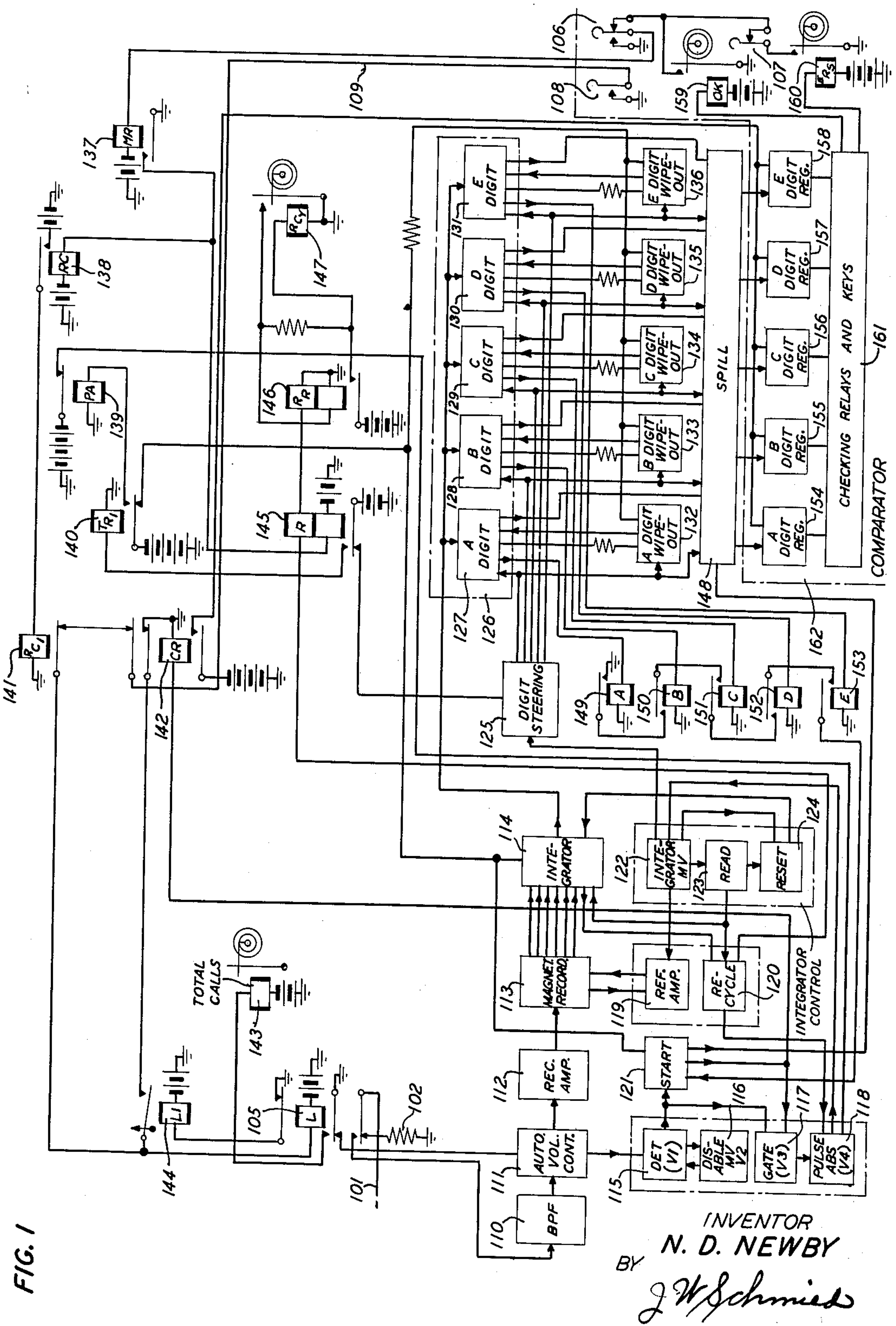

As shown in Fig. 1 the incoming line 101 normally terminates at a resistor 102. This resistor properly terminates the line and tends to suppress stray currents and transients which may be in the incoming line due to switching and other disturbances. When it is desired to receive incoming signals the receiver is conditioned by operating switch 108 or by automatic equipment which applies ground to lead 109 and causes relay 105 to operate.

The line 101 incoming to the receiver at this time is extended to the subscriber's station through suitable switching circuits and devices and over the subscriber's line from the central office to the subscriber's station. For purposes of receiving signals or pulses from the subscriber's station from calling apparatus such as disclosed in the above-identified patent of D. B. Parkinson, the paths from the central office to the subscriber's station need not transmit direct current. It is sufficient if this line will transmit voice frequency currents having a bandwidth of from approximately 300 cycles to 2,000 cycles. This bandwidth, of course, may be wider or narrower in certain cases but such a width is suitable and frequently encountered in telephone networks.

The circuit for the operation of relay 105 extends from battery through the winding of relay 105, back contacts on relays 141 and 142 to ground through the operated contacts of key 108 or to other ground applied to the same conductor by means of automatic switching circuits. Relay 105, in operating, completes an obvious circuit for operating the message register 143 for recording the total number of calls. Relay 105 in operating interrupts the holding circuit of relay 144 and permits relay 144 to start to release. Relay 144 is, however, a slow-release relay and requires appreciable time to become fully released.

The operation of relay 105 removes ground from a conductor extending to the automatic volume control circuit 111. This ground normally maintains the gain of the volume control circuit at its maximum value so that the automatic volume limiting operation is ineffective. However, upon the operation of relay 105, the automatic volume control circuit is enabled. A short interval of time thereafter the volume control circuit 111 has regulated the output volume so that it will be at a predetermined value substantially independently of the level of the applied signals.

The operation of relay 105 also transfers the incoming line 101 from the terminating resistor 102 to the band-pass filter 110. The band-pass filter 110 is provided to prevent low frequency power currents, which may be supplied to actuate the calling device of the subscriber's station over the subscriber's loop, from interfering with the operation of the receiving equipment described herein. The band-pass filter 110 also is employed to prevent high frequency signals or high frequency components of noise or other interfering signals or stray currents from interfering with the operation of the receiving equipment described herein.

From the band-pass filter 110 the signals are transmitted through the automatic volume control circuit 111. The signals are transmitted in two directions from the automatic volume control circuit 111; (1) through the recording amplifier 112 to the magnetic recorder 113; and (2) to the controlling amplifiers in other control circuits. As shown in Fig. 1 the signals are first transmitted to a detector 115 which is employed to detect the incoming pulses or other signaling currents. A disabling circuit 116 is provided for disabling the detector 115 in rendering it non-responsive to the incoming pulses.

The exemplary system set forth herein is arranged to respond to and cooperate with equipment for transmitting signals of the type set forth in the above-identified patent of D. B. Parkinson. Briefly these signals comprise a plurality of pulses separated by blank intervals or pauses to distinguish a complete set of pulses or signals representing a complete subscriber's designation. These signals are transmitted over and over again from the transmitter equipment or calling apparatus at the subscriber's station as set forth in the above-identified application of Parkinson.

Each complete subscriber's designation usually comprises a subscriber's line number which is frequently followed by a party designation where party lines are employed. In large cities or more densely populated regions the above numbers are preceded by one or more designations defining central office or switching points. In the case of national dialing, the subscriber's designation may be preceded by a plurality of symbols or digits designating the area and as a consequence a complete called subscriber's designation may consist of as many as eleven symbols and digits.

In the exemplary embodiment set forth herein it is assumed that the last five digits of the complete subscriber's designation are all that are of interest and are all that are required. This assumption is based upon the fact that the specific embodiment of the invention described herein is arranged to be used at a terminating local office where the last five digits of the designation are all that are required to complete a desired switching connection to the called party's line. The complete subscriber's designation may therefore comprise any number of digits or symbols equal to or greater than five. A complete designation is followed by a pause equivalent to the time required for the transmission of two of the characters or digits. The pulses as transmitted comprise substantially a single cycle of an alternating-current wave which is assumed to be of the order of 1,000 cycles. Two such pulses are required to define each character of the digit of the complete subscriber's designation. Each pulse of a pair of pulses defining each symbol or digit of the complete subscriber's designation is of the same polarity and each succeeding pair of pulses defining succeeding symbols or digits of the called subscriber's designation is of opposite polarity. In other words, each pair of pulses representing the value of a symbol or digit of the called subscriber's designation received by the exemplary embodiment described herein is of the opposite polarity from the preceding pair and succeeding pair received so that the pairs of pulses are alternatively positive and negative.

When each of these pulses is transmitted over voice frequency communication channels and particularly when transmitted through filters and carrier current systems having bandwidths of the order described above, each pulse as received at the receiving station and applied to the detector circuit 115 comprises a transient of a duration which is of the order of three or three and one-half milliseconds. In other words the original pulse of one millisecond as applied to the transmission system by the subscriber's equipment is lengthened so that appreciable energy is received for approximately three to three and one-half milliseconds by the receiving equipment.

In order to prevent the pulses from interfering with one another it is necessary to separate the pulses by a time interval greater than the decay time of each pulse at the receiver. Thereafter the next succeeding pulse may be transmitted. The time thereafter at which this pulse is transmitted is controlled by the character of a symbol or digit represented by the two pulses. In the exemplary embodiment set forth herein, it is assumed that the second or stop pulse of each digit will be transmitted in any one of a plurality of times succeeding one another by approximately a half millisecond. In one specific embodiment each of these times was .44 millisecond. After the final pulse is transmitted representing the magnitude of the digit or character of the symbol, the next succeeding start pulse of the following digit or character is transmitted approximately three and one-half to four milliseconds after the final possible position of the stop pulse.

In order to more readily refer to the time required for each of the digits to be transmitted, this time has been divided into twenty-five divisions or units of approximately a half millisecond duration. In addition eight such units are allowed for each of the pulses to be received and decay to such a value that they will not interfere with the next succeeding pulse. Such an arrangement permits ten different digits or symbols to be represented in each one of the digit intervals. Therefore, a digit interval will be required for each symbol or digit of the called subscriber's designation plus two such intervals for the blank or pause between complete designations. Accordingly, a called subscriber's designation consisting of eight symbols and digits will require ten such intervals for complete transmission and a called subscriber's designation consisting of eleven symbols and digits, as in the case of a national dialing code, will require thirteen such intervals.

A disabling multivibrator 116 is arranged so that it will disable the detector 115 for approximately three and one-half milliseconds or seven of such intervals. This renders the detector circuit less subject to false operation by noise and other stray signals and thereby improves the operation of the system. Thus after each pulse is received by the detector 115 the disabling multivibrator 116 operates and disables the detector for an interval of time during which the transients resulting from the pulse die out. The output of the detector 115 is transmitted to start circuit 121 and to a gate circuit 117. The start circuit 121 is employed to respond to the incoming pulses and recognize the long pause occurring between the pulses designating the called subscriber's station and to recognize when all of the register circuits 126 are filled.

As pointed out above, the incoming signals from the volume limiting amplifier 111 are transmitted through a recording amplifier 112 and applied to a delay apparatus. This delay apparatus is arranged to provide a plurality of different delay intervals which intervals are equal to or a function of the expected possible different time intervals betweens the signals or pulses. This delay apparatus may take any suitable form such as a tapped delay line or network, a plurality of different delay networks, recording and storage devices or a magnetic device as set forth in the exemplary embodiment of this invention described herein.

This magnetic recording device 113 operates in substantial synchronism with the incoming signals and records all of the signals applied to it. These signals are stored for a short interval of time and then erased after which additional signals may be then stored in the same magnetic material. The magnetic storing device is shown in detail in Fig. 5. The magnetic material comprises a disc 501 which is continuously operated by synchronous or other type of speed regulated motor and is provided with erasing magnet 510 and a plurality of recording and pick-up magnets. These magnets are spaced around the periphery of the disc 501 so that a recorded signal stored in the disc travels a distance accurately related to the possible times at which pulses may be transmitted over the system.

Figures 5, 5A:
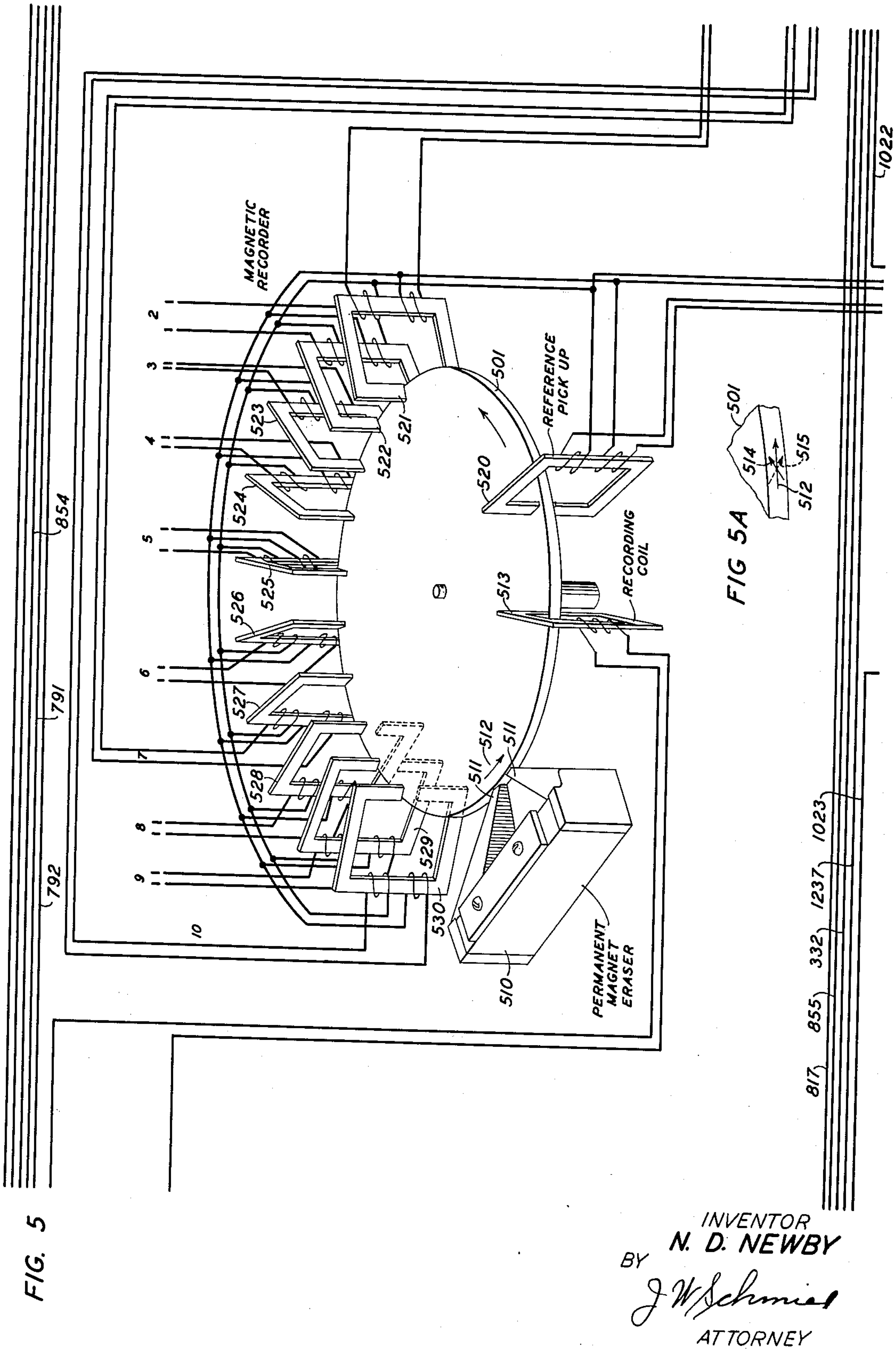

Referring now to Fig. 5, a continuously rotating disc 501 consists of magnetic material suitable for recording magnetic conditions therein. The disc 501 is continuously rotated by a synchronous motor or by any other suitable device, motor or mechanism (not shown) at a uniform precalculated speed.

Magnetic materials of the type suitable for use in magnetic recording of electrical signals are frequently called hard magnetic materials because they are mechanically hard and have a relatively high residual induction usually called $B_r$ and a relatively high coercive force $H_c$. As shown in the drawing the disc 501 is rotated past the erasing head 510 which comprises a permanent magnet and pole-pieces 511 by which the field of the permanent magnet is conveyed to the periphery of the rotating disc 501. The field from the permanent magnet induced in the rotating disc 501 should saturate the disc sufficiently to erase all previous magnetic variations within the magnetic material of the disc and leave the material magnetized with the residual magnetic induction oriented tangential to the disc. During the time that each portion of the disc is in the field of the permanent magnet of the erasing head and after it leaves the field of the erasing head the direction of magnetization of each elemental recording portion of the disc is indicated by the arrow 512 in Fig. 5 and by arrow 512 in Fig. 5A. The uniformly magnetized portions of the periphery of the disc then pass through the recording head or between the pole-pieces of the core of coil 513. At this time a transverse magnetic field is induced in the disc at right angles to the direction of magnetization 512. The transverse field is induced by coil 513 as will be evident by examination of the drawing. The coil 513 has pole-pieces adjacent opposite sides of the disc and causes a field to be induced between these pole-pieces either vertically upward or vertically downward as viewed in Fig. 5 and thus at right angles to the direction of rotation of the disc and at right angles to the residual magnetic induction in the magnetic material of the disc. As a result the residual magnetism within the disc is rotated in either direction as the material of the disc leaves the recording head 513. When the magnetic field is upward in the recording coil 513, the magnetic induction within the magnetic material of the disc is rotated in a counterclockwise direction such as illustrated by the arrow 514 of Fig. 5A. When the magnetic field due to the recording coil 513 is downward, the magnetic induction within the material of the disc after it leaves the recording field is rotated downward as shown by the dotted arrow 515.

It is thus evident that the magnetic field within the material of the disc as oriented by the recording head has a vertical component which may be in either direction and which vertical component may be employed to generate voltages in pick-up heads in a known manner.

It is also evident that fields due to both positive and negative currents are recorded in the disc by moving the magnetic vector or direction of magnetization in the disc in opposite directions. Consequently no bias is required. It is evident that in such an arrangement the relation between applied recording field and the recorded effect is relatively linear over a wide range of magnetic amplitudes and thus over a wide range of signal amplitudes applied to the recording head.

It has been assumed in the foregoing description that the disc of the magnetic material 510 is solid and made up entirely of magnetic material. It is to be understood, of course, that any suitable structure of suitable magnetic material for recording signals may be employed including discs, ribbons or other structures which are either solid and comprise essentially all magnetic material or they may comprise electro-deposited or otherwise plated metals or alloys, either in the form of discs, ribbons or the like. In addition, the disc or other form of magnetic material may consist of one of various magnetic oxides and other magnetic powders incorporated on a paper or film base or have any other suitable structure or be of any other known type of magnetic recording material. In addition, other forms of wipe-out methods and apparatus may be employed.

As shown in Fig. 5, after passing recording head 513 the magnetized material of the disc 501 passes between the pole-pieces of a pick-up head 520 and then successively past the pole-pieces of ten different pick-up devices or heads. Each pick-up device, in the exemplary embodiment, comprises a magnetic core with pole-pieces which extend adjacent to the periphery of disc 501. The pole-pieces are usually of thin magnetic material located so that the thickness or smallest dimension is parallel to the direction of motion of the magnetic recording medium. Each core is also provided with two windings connected as shown in the drawing to the other elements of the signal receiver described hereinafter.

The spacing between the various pick-up leads determines the actual time delay of the signals because with wider spacing more time is required for an elemental portion of the disc to pass from the pole-pieces of one pick-up to the pole-pieces of the next pick-up. Thus, the spacing between the reference pick-up 520 and the first one of the digit pick-ups 521 is equivalent to the time required for a pulse and its related transient to die out and be reduced to such a value that it does not interfere with any of the succeeding pulses. The spacing between each of the code or digit pick-up coils 521 to 530 inclusive, is approximately half a millisecond or in other words equivalent to the time difference assigned to digits of different magnitudes.

Thus, assume that a start pulse is recorded by the recording coil and a stop pulse is subsequently recorded in the tenth or zero position. The start pulse then passes under the reference pick-up coil 520 and induces voltages in the windings of this coil. The recorded start pulse will then pass successively between the pole-pieces of each of the digit pick-up coils 521 to 530. When this start pulse passes through the pole-pieces of the zero coil 530 the stop pulse will be passing between the pole-pieces of the reference pick-up coil 520.

If, as assumed for the second digit the stop pulse arrives during the fourth digit interval, indicating a magnitude of four for the second digit, then the start pulse of the second digit will be passing under the fourth digit pick-up coil 524 at the time the stop pulse of the second digit is passing between the pole-pieces of the reference pick-up coil 520.

Referring now to Fig. 1, incoming signals from line 101 are transmitted through the band-pass filter 110 and the automatic volume control circuit 111 and applied both to the magnetic recorder 113 through the recording amplifier and to the detector circuit 115. The detector circuit is controlled by the disabled multivibrator 116 so that it cannot respond to pulses closer together in time than approximately three and one-half to four milliseconds. The output of the detector is applied to the start circuit 121 and to the gate circuit 117. After being connected to the line in this manner the circuits are in condition to immediately accept and register digital information. The gate circuit 117 is open so that all pulses received are immediately passed to the pulse absorbing circuit 118. The gate circuit 117 is open at all times for the reception of pulses except when the register circuits 126 are filled and the digital information is being transferred to the registers 154 through 158 of the comparator circuit 162. The gate circuit 117 is closed by the start circuit 121 which operates when all registers 127 through 131 are filled and the pause or blanks between designation is received.

To illustrate the operation of the circuits of the exemplary embodiment described herein, assume that the called subscriber's designation is 87635219 and assume further that the first pulse applied to the band-pass filter 110 after the operation of relay 105 is the start pulse for the digit 7. Assume further as explained above, that the only digits of interest are the last five digits of the called subscriber's designation, namely, 35219. The first pulse from the detector circuit 115, which as assumed above is the start pulse for the digit 7 is then transmitted through gate circuit 117 to the pulse absorbing circuit 118. The pulse absorbing circuit 118 absorbs this pulse. The pulse is, however, recorded by the magnetic recorder 113 as described above. Thereafter, this start pulse passes the reference pick-up and induces a voltage in it, but the reference amplifier 119 is rendered ineffective at this time so that it does not respond to this voltage. The start pulse then passes between the various other digit pick-up coils in succession and induces voltages in these coils. However, the integrating apparatus as well as the reference amplifier are unresponsive to voltages induced in the pick-up coils until a stop pulse is received.

A stop pulse, of course, will be received at some time before the start pulse has passed between the pole-pieces of the last of the digit pick-up coils.

Upon reception of the stop pulse, the detector 115 responds to it and the pulse passes through the gate circuit 117 to pulse absorbing circuit 118. Pulse absorbing circuit 118 does not absorb the stop pulse. It merely absorbs the start pulses. A pulse is transmitted from the pulse absorbing circuit 118, upon the reception of this stop pulse, to the integrating control circuits 122. The integrating control circuit conditions the integrating circuits 114 through the reference amplifier 119 so that the integrating circuits integrate the rectified output of each of the pick-up coils. These integrating circuits in the exemplary embodiment comprise full-wave rectifier circuits which are employed to charge a condenser.

When the integrating control circuit 122 is actuated to cause the integrator 114 to integrate the output of each of the pick-up coils, the recorded stop pulse is starting to pass through the pole-pieces of the reference pick-up coil 520 and the start pulse is likewise starting to pass through the pole-pieces of some one of the digit or channel pick-up coils, channel pick-up coil 527 under the assumed condition. The reference amplifier is rendered active at this time and connected to all of the potential pick-up coils in such a manner that the voltage induced in the pick-up coil where the start pulse is starting to induce a voltage therein is in opposition to the voltage applied thereto from the reference amplifier so that the two voltages tend in a large manner to cancel one another. This cancellation of voltage takes place only in the event that the start pulse and the stop pulse are of the same pair of pulses representing a particular digital value. If they are of pulses of different pairs they will be of opposite polarity as explained hereinbefore and consequently no such cancellation of voltage will take place. In all of the other pick-up coil circuits, the full magnitude of the stop voltage pulse is applied to the integrating circuits with the result that a large voltage is built up across the condensers associated with all but one of the channel integrating circuits. The integrating time interval, that is, the time during which the integrating control multivibrator 122 renders the integrating circutis and reference amplifiers effective may be of any suitable period. In the exemplary embodiment set forth herein this period is the time interval of a received pulse, that is, from three and one-half to four milliseconds or eight of the increments or units, described above, out of the digit interval assigned to the digit. At the end of this time interval, the integrating circuits and reference amplifier are again rendered unresponsive to signals from the magnetic recording devices and a read pulse is generated in the read circuit 123. This pulse is applied to a recycle circuit 120 and also to the integrating circuits 114. This pulse causes the integrator which has a voltage less than a predetermined amount stored upon it from an integrating condenser to actuate storing apparatus.

If the storing apparatus associated with more than one of the digital channels is actuated indicating the probability of a trouble condition in the receiver circuits the recycle circuit 120 is set into operation and the circuits are restored to normal and the receiver is blocked from further reception of pulses. With such an indication of trouble within the receiver, the recycle circuit 120 locks operated and sounds an alarm (not shown in the drawing). The operation of the recycle circuit under these circumstances causes relays 145 and 146 to operate. Relay 146 in operating, operates register 147 which records the total number of trouble conditions. Relay 145 in operating removes the battery supply from the steering circuit 125 and operates relay 140. Relay 140 in operating, removes the battery supply from the integrator circuit 114, the digit wipe-out circuits 132 through 136, the registers 127 through 131 and from a portion of the start circuit 121. Relay 140 in operating, also operates relay 139. Relay 139 in operating, restores the pulse absorbing circuit 118 to normal. Relays 145 and 146 lock operated to the recycle circuit 120 and thus prevent or block the receiver from receiving any further pulses which may be transmitted on the line. The circuits remain in this condition until a maintenance man, who has been summoned by the alarm, repairs the trouble and releases the circuit.

If none of the storing apparatus is actuated indicating the probability of a trouble condition at the calling station or on the line, the recycle circuit 120 is set in operation which controls the pulse absorbing circuit 114 to recondition it to absorb the next stop pulse in the normal manner and causes the circuits to continue to receive and record the next and succeeding pairs of pulses.

If, however, the storage apparatus associated with only one of the integrating devices is actuated in response to the read pulse the equipment is not blocked or reconditioned. At the end of the read pulse, the reset circuit 124 is actuated which restores the charge in the integrating circuits to their initial values so that they will be available for use in responding to the succeeding pulses of the succeeding digit. During the read interval, as described above, the output of the integrator circuits is also transferred to the translator-register circuit 126 which may comprise any suitable number of register.

As shown in the drawing the translator-register circuit 126 comprises five individual register circuits 127, 128, 129, 130 and 131. These register circuits are connected in a reentrant chain under control of the digit steering circuit 125 in such a way that the digital value as determined by the integration of the first received pair of start and stop pulses described above, may be entered in any one of the circuits. Thereafter, the subsequently received digital values will be entered in succeeding register circuits of the reentrant chain under control of the digit steering circuit 125. Assume for the purpose of illustration that the digital value of the first received pair of pulses which as assumed above is the digit 7, is recorded in register circuit 128 as directed by the digit steering circuit 125. The recording of digital information in register circuit 128 will cause relay 150 to become operated which partially closes a chain ground circuit to the start circuit 121.

Thereafter, the next start pulse, which under the assumed condition will be the start pulse for the digit 6, will be received and actuate the circuits in a manner similar to that described above. The stop pulse for the digit 6 will follow next, which is the second stop pulse received under the assumed condition, and will again actuate the circuits and cause the integrating circuits 114 to operate in the manner described above. At this time the steering circuit 125 will cause the information to be recorded in register 129 of the translator-register. The storage of this digital value in the register circuit 129 will in turn cause relay 151 to become operated which closes an additional portion of the chain ground circuit to the start circuit 121.

The next three succeeding digits 3, 5 and 2, under the assumed condition, are transmitted to and recorded in the succeeding register circuits 130, 131 and 127 in this order. This in turn causes the operation of relays 152, 153 and 149. Upon the reception and registration of the digit 2 in register circuit 127, it will be observed that all of the individual registers 127 through 131 of the translator-register circuit 126 are filled. The third from the last digit of the called subscriber's designation 87635219, that is the digit 2, is registered in circuit 127 and the other digits 7, 6, 3 and 5 are registered in circuits 128 through 131, respectively. Because all register circuits are filled at this time, all of the relays 149 through 153 will be operated and the chain ground circuit is closed to the start circuit 121. The ground applied to the start circuit 121 at this time performs no function because the blank or pause which follows the last digit of the complete subscriber's designation has not been received. Therefore, the circuits of the receiver are conditioned to continue to receive the succeeding digits of the subscriber's designation.

The next digit received is the digit 1, which under the assumed condition is the next to the last digit of the complete subscriber's designation. At this time the steering circuit 125 will operate the digit wipe-out circuit 133 which will clear the present registration of the digital value 7 from register circuit 128. The steering circuit 125 then will cause the newly received digital value, that is, the digit 1, to be stored in the cleared register circuit 128. After this action it will be observed that the register circuits remain filled but as yet the blank or pause between complete designations has not been received. Consequently, the receiver will continue to function and will receive and record the next succeeding digital value.

The next digit received is the digit 9, which under the assumed condition is the last digit of the complete subscriber's designation. At this time, the steering circuit 125 will function and operate the digit wipe-out circuit 134 associated with register circuit 129 and cause the digital value 9 to be stored therein. The long pause or blank follows the stop pulse of the digit 9 so at this time the start circuit 121 will respond to the chain ground closed through all of the operated relays 149 through 153. The start circuit 121 functions and operates the spill circuit 148 and the gate circuit 117. The operation of the gate circuit 117 at this time blocks the reception of any further signals by the receiver. The operation of the spill circuit transfers the digital values registered in the translator-register circuit 126 to the register circuits 154 through 158 and simultaneously arranges the digital values in the correct order. The start circuit 121 in operating in this manner also operates relay 142 which closes battery through to the register circuits 154 through 158.

When the long pause or blank was received which actuated the start circuit 121 as stated above the last five digits of the complete called subscriber's designation which under the assumed condition are 35219 and which as stated above are the only digits of the complete designation that are of interest in the exemplary embodiment described herein, are registered in the registers 127 through 131. The digit 3 is registered in register circuit 130, the digit 5 in register circuit 131, the digit 2 in register circuit 127, the digit 1 in register circuit 128 and the digit 9 in register circuit 129. The spill circuit in operating will transfer these digital values to registers 154 through 158 and place them in their correct order. The digit 3 will be spilled or transferred to register circuit 154, the digit 5 to register circuit 155, the digit 2 to register circuit 156, the digit 1 to register circuit 157 and the digit 9 to register circuit 158.

The operation of relay 142 as controlled by the operation of the start circuit 121 will also interrupt the operating circuit for relay 105 which relay is slow to release and starts to release at this time. During the release interval of relay 105 the digital information stored in register circuits 154 through 158 may be used to actuate automatic switching equipment in any desired or suitable manner. After the release of relay 105 the circuits of the receiver are returned to normal and it is again in condition to be used to receive and record a new called station designation.

The output of register circuits 154 through 158 may be observed by means of lamps and checking relays and keys 161. The checking relays and keys 161 comprise a group of keys which are set in accordance with the expected subscriber's number or station designation. The relays are operated in accordance with the recorded designation. If the relay corresponding to the operated keys and only the corresponding relays operate, one circuit is completed by this equipment 161, otherwise another circuit is completed by it.

If the code has been properly received, the OK register 159 is actuated which causes relay 137 and in turn relays 138 and 145 to be operated. Relay 145 in operating causes the circuits of the system to be restored to the conditions in which they were after the first pulse is received after the system is connected to a subscriber's line. If the several digits for which the keys have been set have not properly been received, the error register 160 is actuated and provided key 107 is operated to the position shown the circuit will again advance as described above. If, however, key 107 has been operated, the system will stop in response to an error and may be advanced only by operating key 106 whereby the circuits are advanced as described above, and are then in condition for responding to another series of pulses representing a complete designation of the called subscriber.

Figures 2, 12:
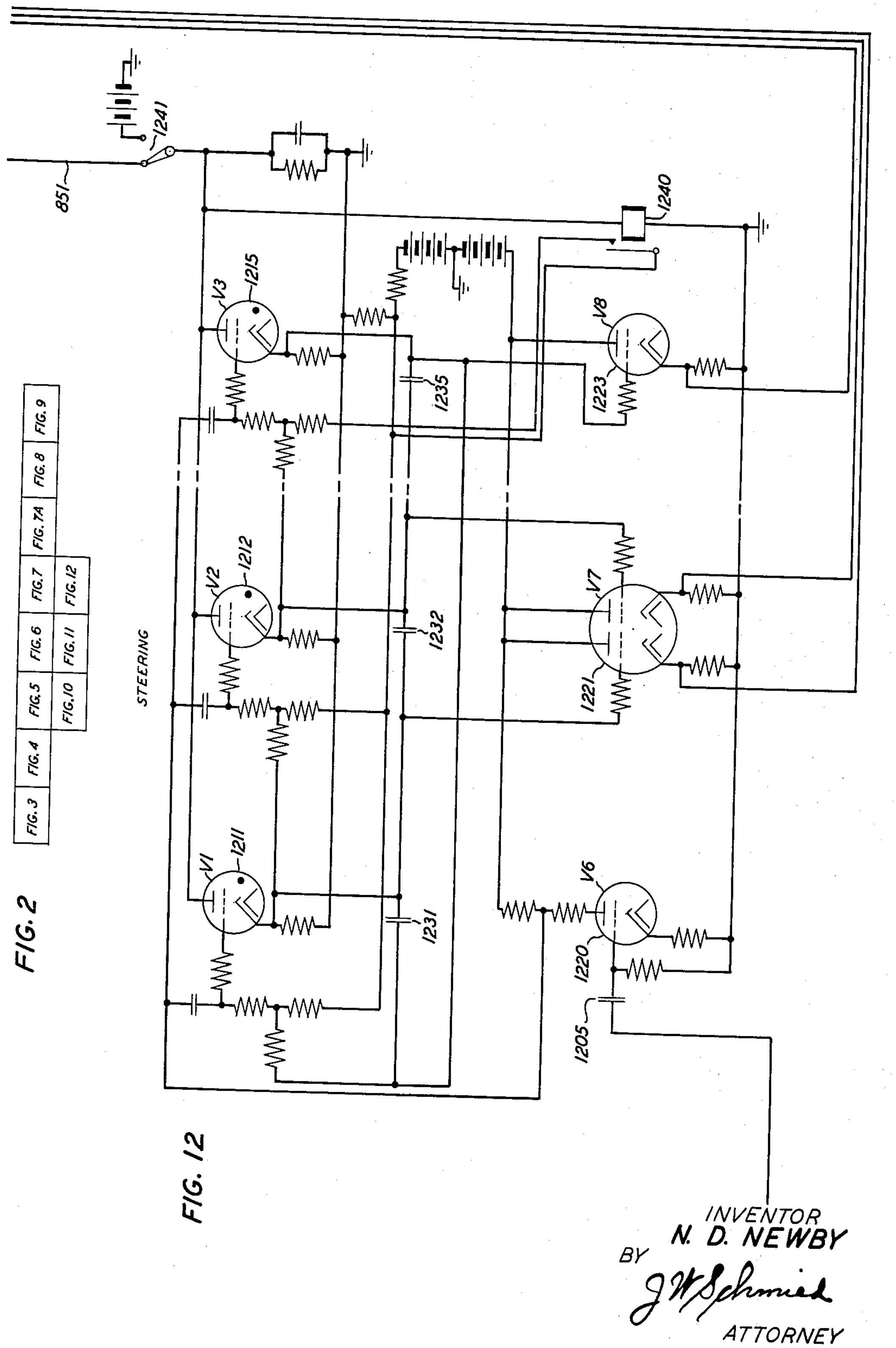
Figure 13:
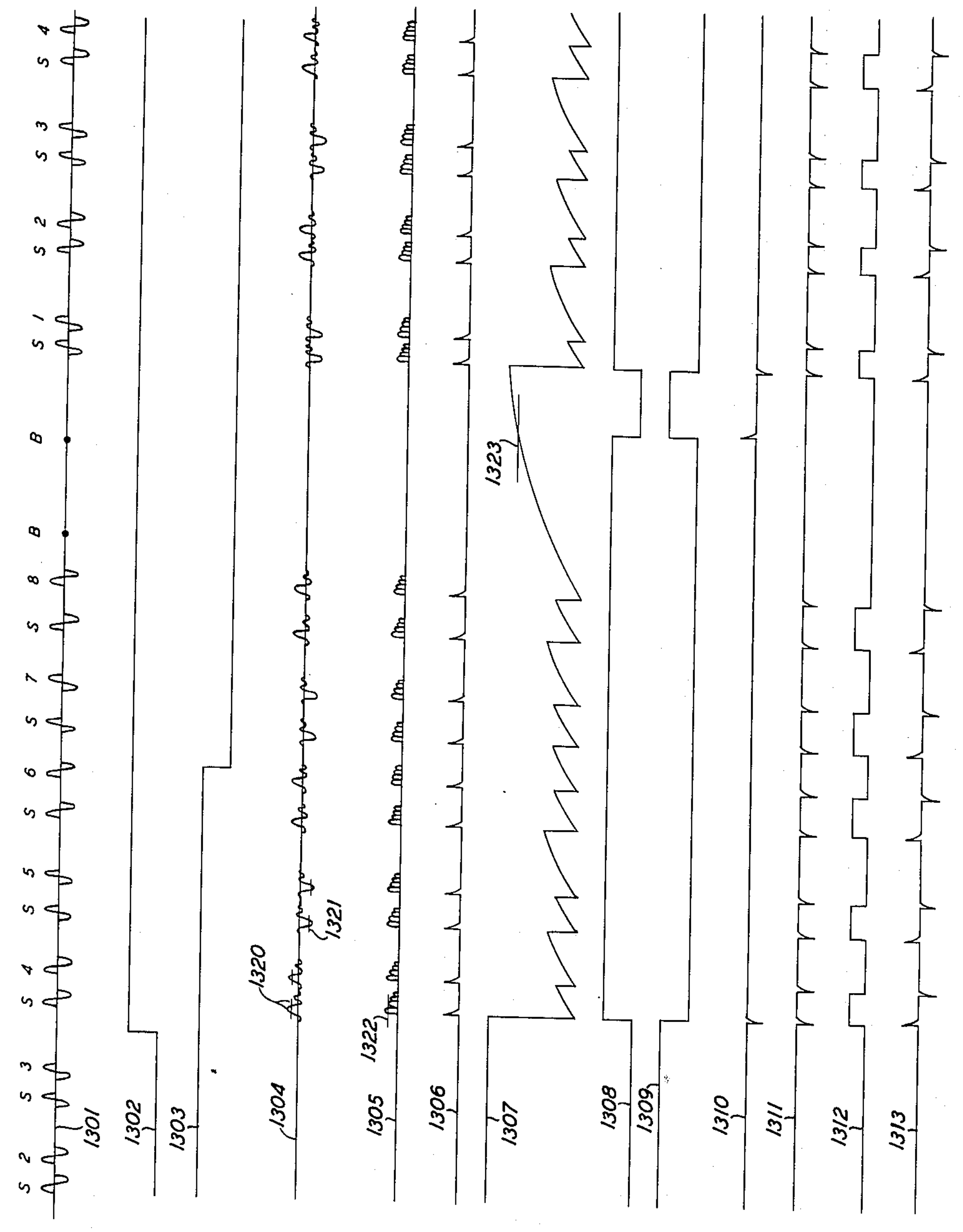
Fig. 13 shows graphs of voltages and currents at various points in the system.
Figure 14:
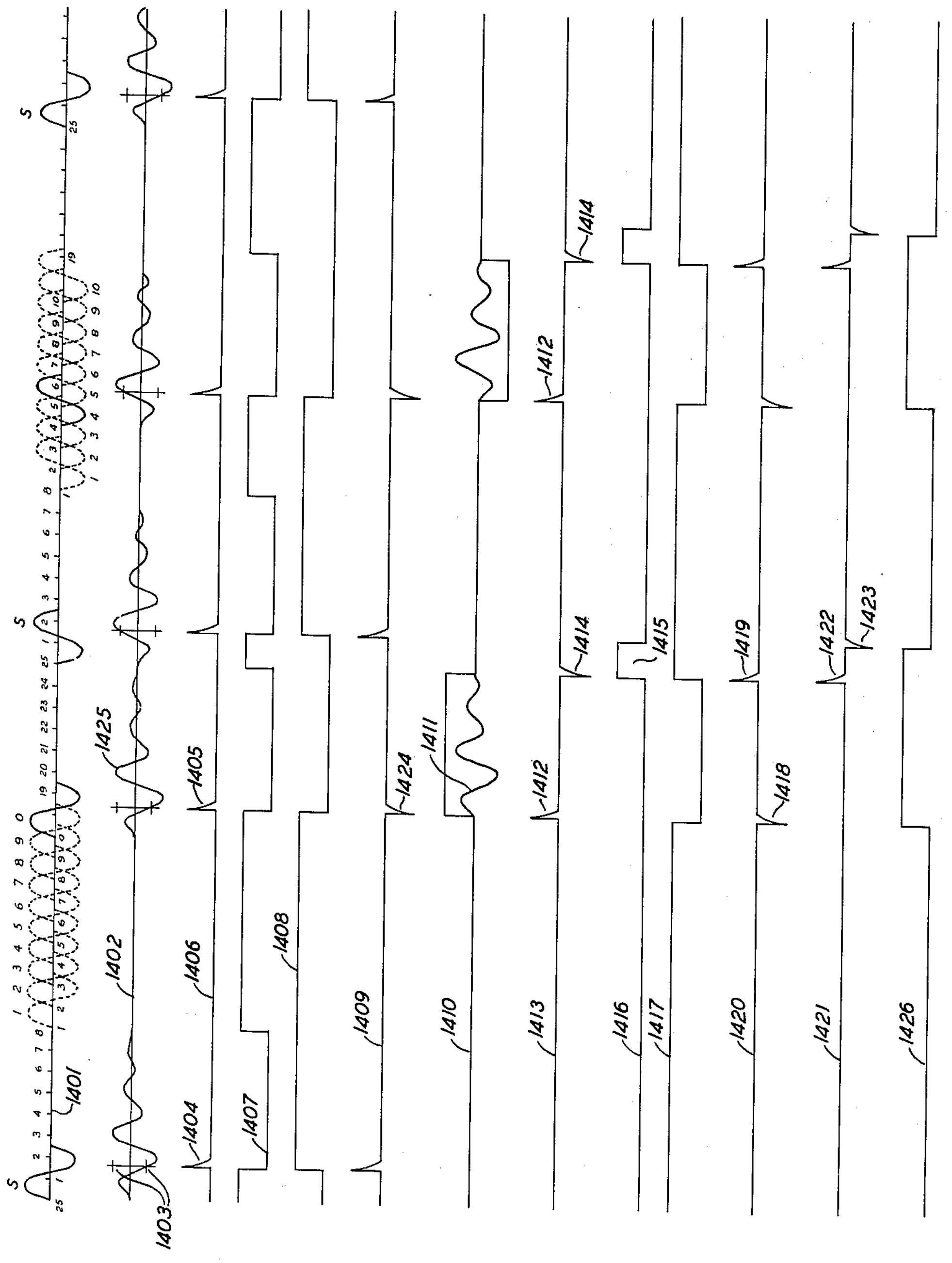
Fig. 14 shows graphs of voltages and currents at various points of the system on an enlarged scale.

The above operation as generally described, may be more readily understood from the following description in detail, of the elemental details of the system shown in Figs. 3, 4, 5, 6, 7, 7A, 8, 9, 10, 11 and 12 when arranged adjacent one another as shown in Fig. 2 and also with reference to Figs. 13 and 14 which show graphically the current and voltage conditions at various places in the system.

Figure 3:
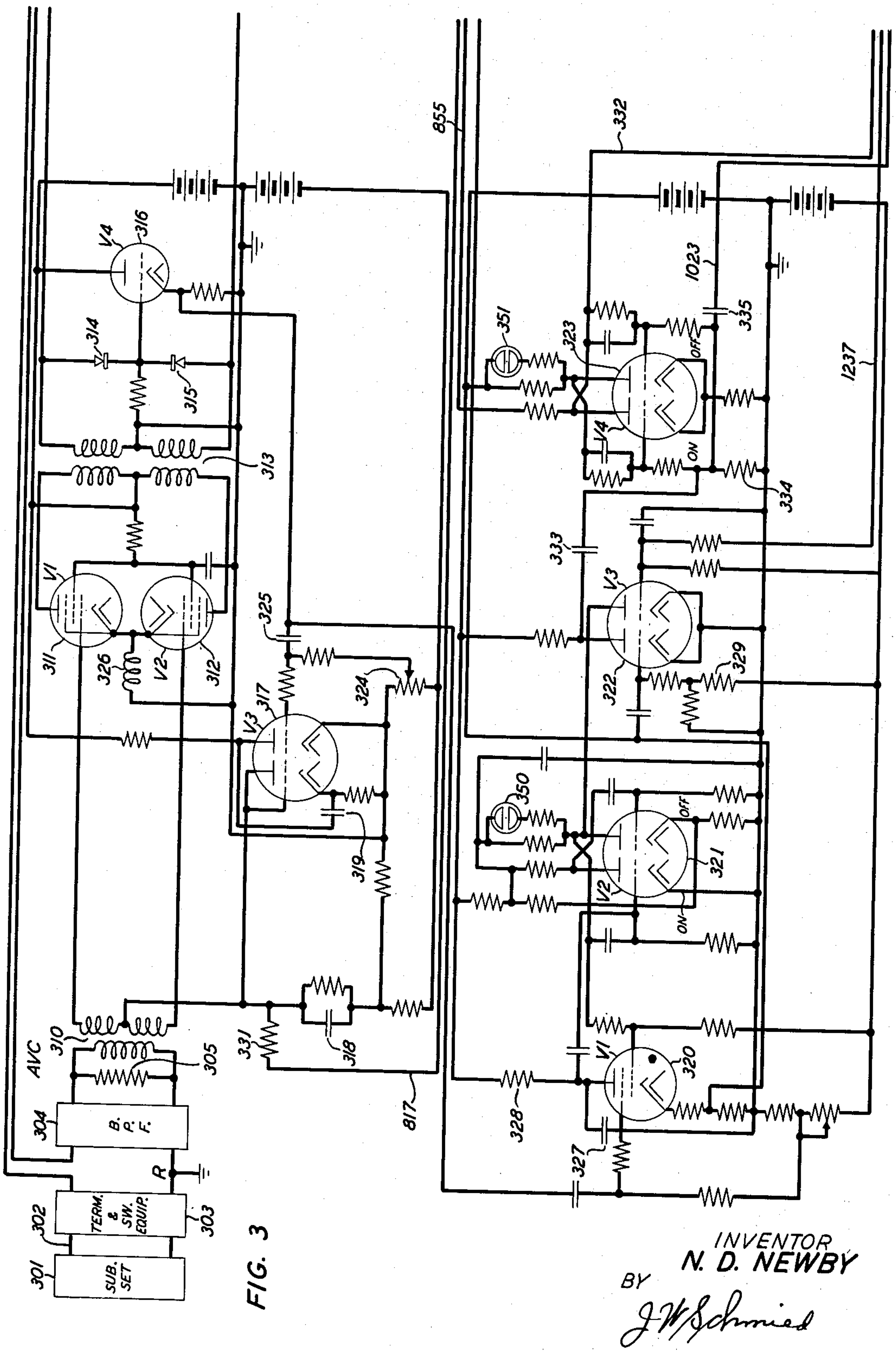

Assuming now that the calling transmitter device 301 of the subscriber station has been connected over the subscriber's line 302 to the terminal and switching equipment 303 to the receiving apparatus shown in Fig. 3. The terminating and switching equipment may include any suitable types of manual or automatic switching circuits, apparatus or systems. It is further assumed that ground is applied to conductor 901 either by means of key 902 or by means of the switching equipment which connects the receiver to the subscriber's line such as represented by 303. When ground is applied to conductor 901 the circuit is completed for the operation of relay 810 from the ground connected to conductor 901 through the lower break contacts of relay 814 and the upper break contacts of relay 815 to battery through the winding of relay 810. Relay 810 operates and interrupts the operating circuit of relay 812 which relay thereupon releases after a short interval of time. Relay 810, operated, completes an obvious circuit for the operation of the total calls register 816 which records the total number of calls received by the equipment shown in Figs. 3 through 12, inclusive. Operation of relay 810 also removes the terminating resistance 813 from the incoming line and connects the transmission path from the terminal equipment 303 to the band-pass filter 304 so that the subsequent signals will be transmitted through this filter to the terminating resistance 305 and also through the input transformer 310 to the amplifier equipment shown in Fig. 3.

Operation of relay 810 also removes ground from the conductor 817 which extends through Figs. 7A, 7, 6, 5 and 4 to the upper terminal of condenser 318 of Fig. 3 through resistor 331. When ground is removed from the upper terminal of condenser 318, it may assume a negative charge or potential as will be described hereinafter.

Assume further that the calling device 301 is supplied with suitable power either locally or over the subscriber's line, means for doing this being known and that this calling device is set into operation and repeatedly transmits signals of the type described above representing the designation of a called subscriber's station. These signals are then transmitted over the line 302 and then through switching and interconnecting equipment 303 to the band-pass filter 304 through the operated contacts of relay 810.

The subscriber's line 302 may comprise any suitable type of subscriber's line and related equipment capable of transmitting voice frequency signaling currents and any other necessary or desirable supervisory or control currents, these being known. The switching equipment 303 may include any suitable types of switching equipment including manually operated switchboards, automatic switching systems operated under control of dial produced or other types of signaling pulses. Equipment 303 may include other suitable types of interconnecting equipment including tool lines, voice frequency channels of carrier current systems, radio systems and suitable combinations of said systems together with the necessary control and interconnecting equipment. Usually, however, terminal equipment and circuits 303 will include automatic switching equipment as well as a communication path through it to the receiving equipment to be described herein in detail.

The band-pass filter 304 is arranged to pass a frequency band of approximately 300 to 2000 cycles. This band-pass filter accomplishes two purposes. In the first place by suppressing the high frequency currents the operation of the system is made more reliable and less susceptible to misoperation by noise currents which have high frequency components. In addition the lower cut-off of the filter prevents interference from the low frequency power currents which may be transmitted over the subscriber's line to the subset for actuating the calling device located thereat. In these cases the low-pass filter 304 effectively prevents these power frequencies from interfering with the operation of the receiving equipment set forth herein in detail. In case power is not supplied over the signal path, the lower cut-off of the filter still serves to prevent noise interference.

The band-pass filter 304 is terminated by matching resistor 305 and the transformer 310 having two balanced secondary windings. Incoming pulses are applied to the control elements of tubes 311 and 312 in push-pull or phase opposition by means of transformer 310.

Normally, condenser 318 is discharged through break contacts of relay 810 between calls. However, upon the operation of relay 810 as described above, ground is removed from the upper terminal of this condenser which will be charged in the manner described hereinafter. However, so long as condenser 318 is not charged the gain of the amplifier tubes 311 and 312 are maintained at their maximum value.

Tubes 311 and 312 consequently repeat the received signals through the output transformer 313. The signals are then applied to the recording amplifier shown in Fig. 4 and to the rectifier elements 314 and 315. Rectifier elements 314 and 315 are arranged in a full wave rectifier circuit.

These rectifier elements are designated in the drawing as comprising any suitable non-linear rectifier element including copper oxide, selenium, silicon, germanium, etc. These rectifier elements, however, may also comprise any suitable types of tubes including gas-filled tubes and also high vacuum diodes.

By employing two such rectifiers arranged in a full wave rectifier, both the positive and negative portions of the received signals are rectified and contribute to the output of these rectifiers. As a result, whichever one of the positive and negative portions of the received signals is largest will cause the greatest output voltage.

The output voltage from the rectifiers 314 and 315 is connected to the input of the cathode follower tube 316. Tube 316 is provided as an isolation tube and to reduce the current load on the rectifiers 314 and 315. The output of these rectifiers as supplied to the control element of tube 316 is positive with respect to ground so that a positive voltage above ground is repeated in the cathode circuit of tube 316 in response to each of the received pulses. The cathode of tube 316 is connected through a suitable network comprising condenser 325 to the control element of the right-hand section of tube 317. The control element of this tube is biased negatively by means of potentiometer 324 so that no current normally flows through the right-hand section of tube 317.

However, when the amplified output of tubes 311 and 312 as rectified by the rectifiers 314 and 315 exceeds the bias determined by potentiometer 324, current tends to flow in the output circuit of the right-hand section of tube 317. This current causes the anode of the right-hand section of tube 317 to become more negative, thus applying negative pulses through the coupling condenser 319 through to the cathode of the left-hand section of tube 317. As a result current flows through the anode-cathode circuit of the left-hand section of tube 317 which operates as a diode and applies a negative voltage to the upper terminal of condenser 318.

The time constant of condenser 318 and related resistors requires approximately three or four received pulses for the potential of the upper terminal of this condenser to become stabilized at its steady state condition.

The application of the negative voltage to the upper terminal of condenser 318 reduces the gain of tubes 311 and 312 and thus tends to stabilize the output of these tubes so that the output signals are relatively constant and independent of the amplitude of the received signals.

The inductance 326 is connected in the cathode circuit of tubes 311 and 312 to provide increased negative feedback to high frequency currents and thus decreases the longitudinal amplification.

The output of tube 316 in addition to being applied to the control element of the right-hand section of tube 317 for regulating the gain of the volume control amplifier tubes 311 and 312 is also applied to a control element of tube 320.

Tube 320 is a multielement gaseous discharge tube provided with anode and cathode and two control elements. The control elements are arranged so that discharges are initiated through the tube under the joint control of both of these elements.

The lower control element is shown connected to the anode of the right-hand section of tube 321. The two sections of tube 321 are arranged to form a single stability or one-shot multivibrator circuit in which the left-hand section is normally conducting substantially its maximum current and the right-hand section is cut off. As a result the voltage of the anode of the right-hand section will be at a relatively high value and apply sufficiently positive voltage to the lower control element of tube 320 so that discharges may be initiated through this tube in response to positive voltages repeated by tube 316 in response to each received pulse. As a result a discharge will be initiated through tube 320 at this time.

The condenser 327 together with the anode resistance 328 is arranged to provide a self-interrupting circuit which causes the discharge through this tube to be terminated at a predetermined interval of time after it is initiated. The anode of tube 320 is also connected to the control element of the left-hand section of tube 321 and as a result upon the initiation of the discharge through tube 320 a negative pulse is applied to the control element of the left-hand section of tube 321. The application of the negative pulse to the grid of this section of tube 321 interrupts the discharge current flowing through this section and causes current to flow through the right-hand section of tube 321. As a result the voltage on the anode of the right-hand section falls to a relatively low value and reduces the voltage of the lower control element of tube 320. Consequently tube 320 is unable to respond to further positive signaling voltages applied to its other control element by tube 316.

At a later time determined by the time constant of the various resistor condenser combinations associated with tube 321 and due to the fact that the cathode of the right-hand section of this tube is at a more positive value than the normal grid bias applied to this section of the tube, current flowing through the right-hand section of tube 321 is interrupted and a discharge initiated through the left-hand section of the tube. Consequently, after the tube 321 is thus restored to its initial condition, tube 320 is again conditioned to respond to succeeding positive signal voltages repeated by tube 316.

The time required for the circuits associated with both sections of tube 321 to be restored to their initial condition is sufficient to allow the transients, described above forming a part of each of the signaling pulses, to become dissipated and die out so that they do not interfere with the subsequently received signal pulses.

In addition to preventing false operation of tube 320 due to the transient currents accompanying each of the pulses, blocking of this tube by the circuits of both sections of tube 321 renders the operation of tube 320 less susceptible to noise currents. Thus during the blocked interval noise currents are unable to falsely cause discharges through tube 320 and as a result the effects of noise currents are reduced.

Each time a discharge is initiated through tube 320 current flows through the cathode resistor of this tube with the result that the cathode becomes more positive. This positive pulse from the cathode is supplied to the control grid of the left-hand section of tube 322. The left-hand section of tube 322 is normally biased slightly below cut-off so that there is no current flowing in its anode-cathode circuit. With the application of the positive pulse from the cathode of tube 320 as described above, the grid bias of the left-hand section of tube 322 is raised above cut-off and this section will conduct current. The positive pulse applied to the control element of the left-hand section of tube 322 will then be repeated as a negative pulse in its anode circuit, which negative pulse is in turn applied to the control elements of both sections of tube 323. The sections of tube 323 are connected in a double stability or flip-flop circuit such that either of these sections may be conducting, but not both. At the end of the previous call, in the manner which will be described hereinafter, a flow of current was initiated through the left-hand section of tube 323 which flow continues until the negative pulse from the output circuit of the left-hand section of tube 322 is applied to the control element of both sections of tube 323 through the coupling condenser 333. The coupling condenser 333 together with the coupling resistor 334 has a very short time constant so that the negative pulse applied to the control elements of both sections of tube 323 is of short duration. As a result of this pulse, current starts to flow through the right-hand section of tube 323 which current then continues to flow and prevents further current flow through the left-hand section of tube 323 at this time.

Figure 4:
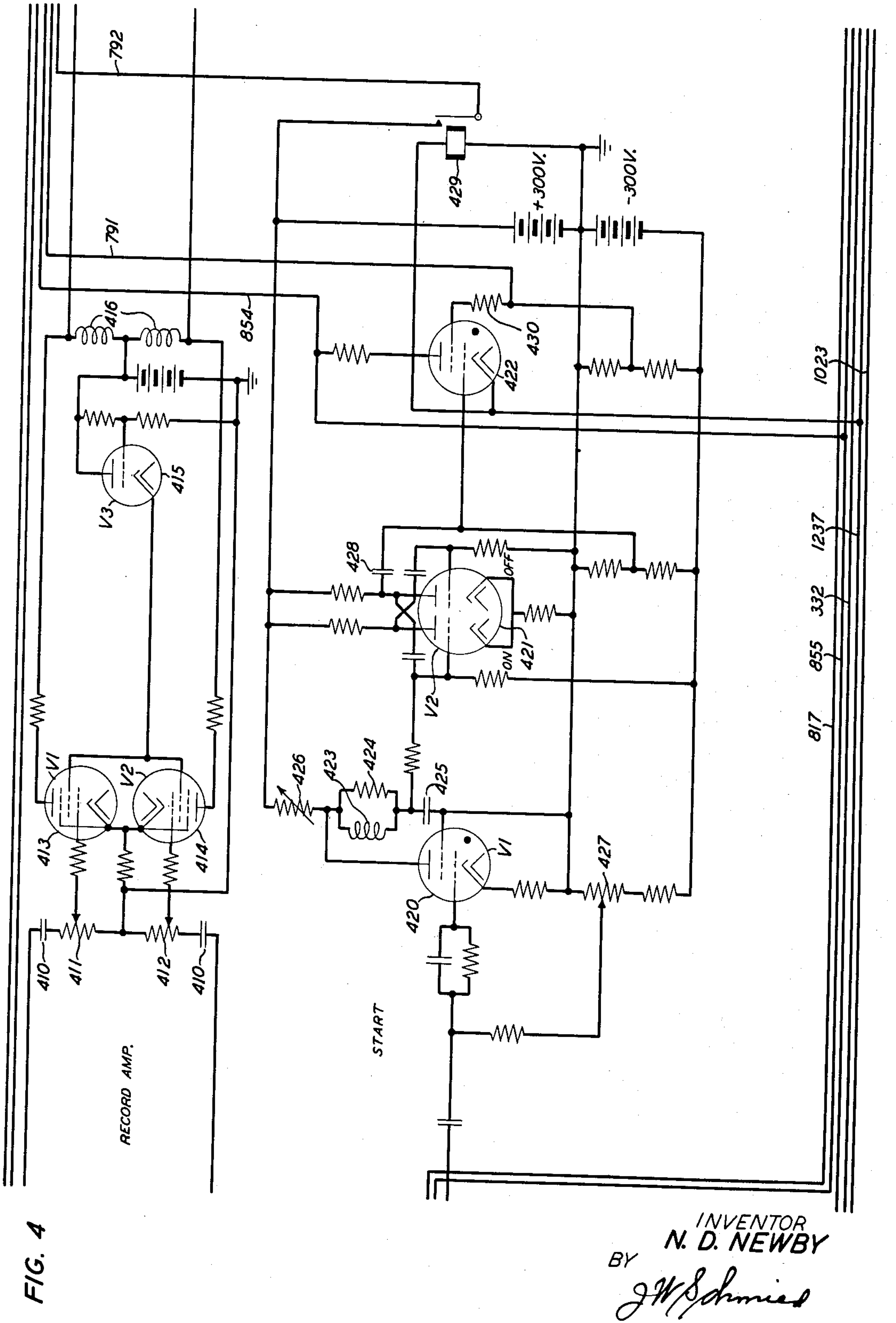
Figure 6:
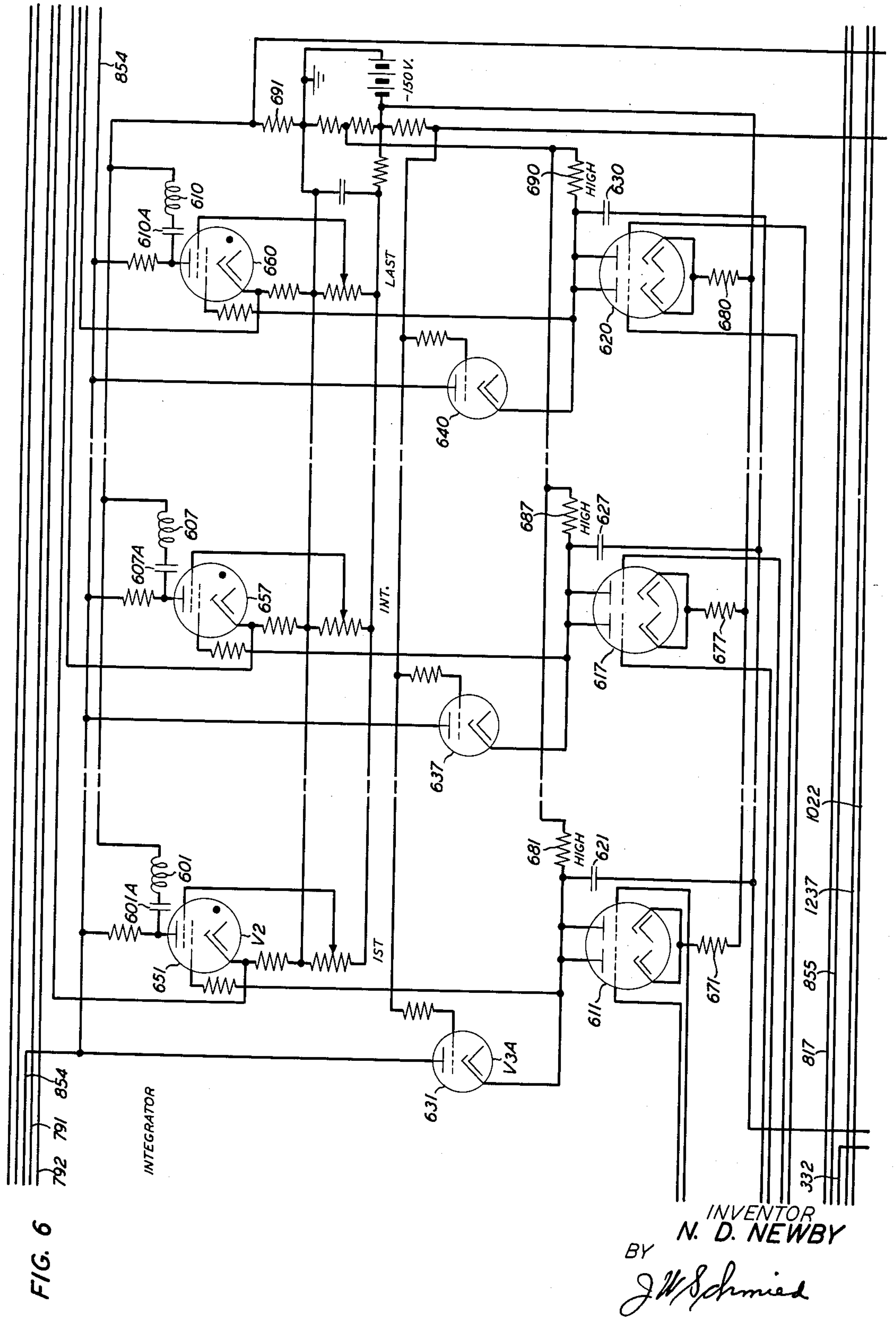

The interruption of the current flowing through the left-hand section of tube 323 at this time causes the voltage of its anode to rise to a relatively high value and apply a positive voltage to the conductor 332 extending through Figs. 4, 5 and 6 to the control element of the left-hand section of tube 1110 through the coupling condenser 1109. The two sections of tube 1110 are connected in a single stability or one-shot multivibrator circuit such that either section, but not both sections may conduct current at any instant of time. However, the circuit is connected so that the left-hand section normally conducts current. When this current is interrupted, the right-hand section will conduct current for a predetermined interval of time after which the left-hand section again starts to conduct current and interrupts the current flowing through the right-hand section, thereafter, the left-hand section continues to conduct current until again interrupted by the application of control voltage to it. Inasmuch as current is already flowing through the left-hand section of tube 1110, the application of a positive voltage over conductor 332 from the anode of the left-hand section of tube 323 as above-described to its control element does not further affect the operation of the circuit.

When tube 320 has a discharge initiated through it in response to the first pulse or incoming signal as described above, a positive pulse from the cathode of tube 320 is also applied to the inner control element or grid of tube 420 which causes a discharge to be initiated through this tube. Tube 420 is a gaseous conduction tube and is provided with a network comprising the inductance 423 and shunting resistor 424, condenser 425 and plate resistor 426 in its anode circuit with the result that these elements cause the discharge to be interrupted through this tube a definite and predetermined interval of time after it is initiated. The bias applied to the control element of tube 420 by the resistor 427 is such that a discharge will be initiated through tube 420 each time a discharge is initiated through tube 320. A discharge through tube 420 at this time will cause the condenser 425 to be discharged so that the voltage of the upper terminal thereof falls to a relatively low value. Inasmuch as the control element of the left-hand section of tube 421 is connected to the upper terminal of condenser 425, the voltage of this control element also falls to a relatively low value and interrupts the discharge current flowing through the left-hand section of tube 421.

The two sections of tube 421 are interconnected to form a double stability or flip-flop circuit in which either section will remain conductive and the other non-conductive until changed by the application of signal pulses thereto. The interruption of the discharge through the left-hand section of tube 421, as explained above, causes the voltage of its anode to rise and apply a more positive voltage to the control element of the right-hand section of tube 421. The higher voltage thus applied to the control element of the right-hand section of tube 421 causes this section to conduct current and maintain the discharge through the left-hand section of tube 421 interrupted. When a discharge is initiated through the right-hand section of tube 421 as explained above, the anode voltage of this section will fall due to the current flowing through its anode resistor. The anode of the right-hand section of tube 421 is connected to a control element or grid of tube 422. Thus, this decrease or fall in the anode voltage on the right-hand section of tube 421 will be applied to a control grid of tube 422 through condenser 428 as a negative pulse.

Tube 422 is a multielement gaseous discharge tube provided with anode, cathode and two control elements. The control elements are so arranged so that discharges are initiated through tube 422 under joint control of both of these elements. The negative pulse applied to the lower control element of tube 422 from the anode of the right-hand section of tube 421, as explained above, will have no further effect upon tube 422 and it will remain non-conductive. The operation and function of tube 422 will be hereinafter described.

Each and every discharge through tube 420 causes condenser 425 to be discharged so that the voltage of its upper terminal is returned to substantially one and the same predetermined value when the discharge through the tube 420 is finished. Between discharges, the voltage of the upper terminal of condenser 425 becomes positive due to the charging of this condenser through relatively high resistance 426. The longer the interval between the discharges of tube 420, the higher the voltage becomes upon the upper terminal of condenser 425. As pointed out above, a discharge is initiated through the tube 320 and thus through tube 420 for each received pulse. These discharges occur sufficiently rapidly so that the upper terminal of condenser 425 does not become charged to a sufficiently large positive voltage to cause the transfer of the discharge in the tube 421 from the right-hand anode to the left-hand anode until the blank interval or long pause between the pulses representing complete subscriber station designations is received. However, during the pause between the pulses representing each complete subscriber's designation the upper terminal of condenser 425 becomes charged to a much greater positive potential. As a result, the circuits of tube 421 are actuated.

When the receiver is not connected to a source of signals or pulses and after power has been applied thereto, tube 420 will be non-conductive and as a result, the upper terminal of condenser 425 will be charged to a relatively high positive potential. This charge causes a discharge to be initiated through the left-hand section of tube 421. Of course, if a discharge is already flowing through this section, a discharge will merely continue to flow. The discharge flowing through the left-hand section of tube 421 interrupts any discharge flowing through the right-hand section of this tube and maintains the discharge through the right-hand section interrupted due to the action of the common cathode resistor.

Upon the application of the first received pulse to the control element of tube 420 in the manner described above from tube 320, a discharge is initiated through tube 420 which discharge causes the condenser 425 to be discharged so that the voltage of the upper terminal thereof falls to a relatively low value. Inasmuch as the control element of the left-hand section of tube 421 is connected to the upper terminal of condenser 425, the voltage of this control element also falls to a relatively low value and interrupts the discharge current flowing through the left-hand section of tube 421.

After the receiver, shown in the drawings, has been connected to a subscriber's line and the first pulse received therefrom in the manner described above, the first pulse as well as the succeeding pulses, discharge and maintain the condenser 425 discharged so that the voltage of its upper terminal is relatively low, consequently, the voltage of the control element of the left-hand section of tube 421 is also maintained at a relatively low value so that no current flows through this section of tube 421. Current continues, however, to flow through the right-hand section of tube 421. So long as pulses are received sufficiently close together, the circuits then remain in the condition described until the blank interval or long pause between the pulses representing a complete subscriber's designation is received.

Sometime near the end of this long pause or blank signal, the upper terminal of condenser 425 becomes charged to a sufficiently positive voltage so that the voltage of the control element of the left-hand section of tube 421 becomes sufficiently positive to initiate a discharge through the left-hand section of this tube. The initiation of the discharge through the left-hand section of tube 421 interrupts the discharge flowing through the right-hand section of this tube. When the discharge through the right-hand section of tube 421 is interrupted the anode voltage of this section will rise and an effective positive pulse will be applied to the lower control element of tube 422. As explained above, the discharge through tube 422 is under the joint control of the two grids or control elements of this tube. The upper control element of tube 422 has a negative bias of sufficient magnitude to prevent a discharge through the tube with only the application of the positive pulse to its lower control element. Thus, there is no discharge initiated through tube 422 at the present time and the tube will remain in its non-conductive state until the application of a positive control voltage to the upper control element or grid which is coincident with the application of the positive pulse to its lower control element or grid from the anode of the right-hand section of tube 421 as will be described hereinafter.

Assume, for purposes of illustration, that the first pulse or signal received by the exemplary embodiment of the receiver described herein, is a start pulse. This need not be the case as will be described hereinafter, since the circuits are designed to distinguish a start from a stop pulse. In the event the receiver is connected to the subscriber's line in the middle of a digit, that is, after a start pulse has been transmitted and before the stop pulse is received, so that the initial pulse received is a stop pulse, the receiver will recondition and reset itself for the reception of a subsequent start pulse as explained hereinafter. When the first pulse or start signal as assumed is received, tube 320 will have a discharge initiated through it as described above and apply a positive pulse from its cathode to the control element of the left-hand section of tube 322. This positive pulse is repeated as a negative pulse in the anode circuit of the left-hand section of tube 322 and applied to the control elements of both sections of tube 323. As a result of the negative pulse being applied to the control elements of both sections of tube 323 the discharge current flowing through the left-hand section of tube 323 is interrupted and a discharge is initiated through the right-hand section of tube 323. The interruption of the current flowing through the left-hand section of tube 323 causes a positive pulse from its anode circuit to be applied over lead 332 to the control element of the left-hand section of tube 1110. This positive pulse on the control element of the left-hand section of tube 1110 does not further affect the operation of the circuit since current is already flowing through the left-hand section of this tube.

When tube 320 has a discharge initiated through it in response to the first start pulse as described above, a positive voltage is also applied from the cathode circuit of tube 320 to the lower control element of tube 420 thus causing a discharge current to flow through tube 420. A discharge through tube 420 at this time will discharge the upper terminal of condenser 425 and interrupt the discharge through the left-hand section of tube 421. The interruption of the current flowing through the left-hand section of tube 421 applies a positive voltage to the control element of the right-hand section of tube 421 and causes a discharge to be initiated through this section of tube 421. The initiation of a discharge through the right-hand section of tube 421 will cause a negative pulse from its anode circuit to be applied to the lower control element of tube 422. This pulse will have no further effect on the operation of the circuit since tube 422 is normally biased below cut-off.

When a start signal or pulse is received, it is also transmitted to the recording amplifier shown in Fig. 4 and applied to the recording coil 513 of the magnetic storing and delaying device shown in Fig. 5. This start pulse together with all of the other received pulses is then applied to the recording coil 513, in addition to controlling the various other tube circuits in the manner described above.

The recorded start pulse then passes between the pole-pieces of the reference pick-up coil 520 and then at later intervals of time successively between the pole-pieces of the channel pick-up coils 521 to 530 inclusive. This start pulse induces voltages in each of the pick-up coils which it passes but these voltages are ineffective until circuits are conditioned as will be described hereinafter.

Depending upon the magnitude of the first digit, the stop pulse will be received during the time the start as recorded in the disc 501 is passing between certain of the channel pick-up coils. If the magnitude of the first digit is 3, the stop pulse will be received slightly before the start pulse passes between the pole-pieces of the third pick-up coil 523. If the magnitude of the first digit is 5, the stop pulse will be received slightly before the stop pulse as recorded in disc 501 passes between the pole-pieces of the fifth pick-up coil 525. Likewise, if the magnitude of the first digit is any other value, the stop pulse will be received slightly before the start pulse as recorded in disc 501 starts passing between the pole-pieces of the corresponding pick-up coil.

Assume for purposes of illustration that the first digit is 7. Then the stop pulse will be received slightly before the start pulse as recorded in disc 501 passes between the pole-pieces of the seventh pick-up coil which is 527. Up to this time circuits connected to the pick-up coils have been rendered nonresponsive to the voltages induced in these coils by the start pulse passing between the pole-pieces of the other pick-up coils.

Upon the reception of the stop pulse this pulse will be transmitted through the volume control circuits, recording amplifier and applied to the recording coil 513. The pulse is thus recorded in the disc 501 and carried through the reference pick-up coil 520. As the stop pulse starts to pass under the pole-pieces of the reference pick-up coil 520, the start pulse will start to pass under the pole-pieces of the pick-up coil 527.

Meantime, however, other circuits respond to the stop pulse. When this pulse is received and transmitted through the volume control devices 311 and 312 and then through the rectifiers 314 and 315 it causes a positive pulse to be applied to one of the control elements of the tube 320. At this time the blocking tube 321 has again restored to normal so that tube 320 may respond to the stop pulse and have a discharge initiated through it in response to this stop pulse. The stop pulse causes blocking tube 321 to be actuated to its blocking condition so that tube 320 cannot respond to another pulse for 3½ to 4 milliseconds as described above. In addition, tube 320 applies a positive pulse to the control element of tube 420 which responds as described above and discharges condenser 425. The discharge of condenser 425 at this time will cause the circuits of tube 420 to be actuated as described above. The operation of the circuits of tube 420 performs no useful function at this time.

Tube 320 also repeats a positive pulse to the control element of the left-hand section of tube 322 which tube repeats a negative pulse from its output circuit in response thereto. As before, the negative pulse from the anode of tube 322 is applied through the coupling condenser 333 and grid resistor 334 to the grids of both sections of tube 323. This negative pulse interrupts the current flowing through the right-hand section of tube 323 and as a result current starts to flow through the left-hand section of tube 323 due to the energy stored in the coupling circuits between the two sections of tube 323.

When a discharge is initiated through the left-hand section of tube 323 in the manner described above in response to the reception of the stop pulse, the anode of this section falls to a relatively low voltage and in effect applies a negative step voltage to conductor 332. This negative step voltage is applied through the coupling condenser 1109 and grid resistor 1120 to a control element or grid of the left-hand section of tube 1110. A "step voltage" may be defined as a change in a voltage from one finite value to another in a time which approaches zero.

The coupling condenser 1109 is small in magnitude and the resistance of the resistor 1120 is also small so that the product of these two quantities, which is frequently termed the time constant, is also small. Consequently these elements act to differentiate the negative step voltage applied to the lead 332 extending from the anode of the left-hand section of tube 323 to the control element of tube 1110 as described above. Consequently a negative pulse of relatively short duration is applied through the coupling condenser 1109 to the control element of tube 1110. This pulse is of sufficient duration, however, to interrupt the current flowing through the left-hand section of tube 1110. The interruption of current flowing through this section causes its anode voltage to rise and its cathode voltage to fall, with the result that current starts to flow through the right-hand section of tube 1110. Current continues to flow through the right-hand section for a predetermined interval of time depending upon the magnitude of the coupling condenser 1121 as well as the values of various bias potentials and resistances connected to the various anodes and other resistors of the circuit. At the end of the time interval determined by these various constants, current again starts to flow through the left-hand section of tube 1110 which current causes the voltage of the cathode of this section to rise and interrupt the current flowing through the right-hand section of tube 1110. Current flow through the right-hand section of tube 1110 continues for an interval of time of approximately 3½ to 4 milliseconds which is the time interval required for the complete reception of a signaling pulse as described above.

During the time current flows through the right-hand section of tube 1110 various circuits are conditioned to respond to the voltages induced in the pick-up coils associated with the magnetic storing and delay device shown in Fig. 5.

Upon the interruption of current flowing through the left-hand section of tube 1110 in response to the reception of the stop pulse, the anode voltage of this section rises as described above, and applies a more positive voltage to the control element of the left-hand section of tube 1113. Tube 1113 operates as a cathode follower tube with its cathode connected to the negative 300-volt supply as shown in the drawing. The grid of this section is likewise connected through a leak resistor to the negative 300-volt supply and also to the anode of the left-hand section of tube 1110. Consequently, so long as current continues to flow through the left-hand section of tube 1110 the grid of the left-hand section of tube 1113 and thus its cathode is maintained at a relatively low negative voltage.

Both sections of tubes 1020 and 1021 are connected in an amplifier or repeater circuit having a large negative feedback so that the gain of the amplifier is substantially unity; both for the control or biasing voltages applied to the cathodes of tube 1020 and for the signals applied to the grids of this tube.

The cathode of the left-hand section of tube 1113 is connected to the cathode of both sections of tube 1020 and so long as these voltages are maintained at a relatively negative value, considerable current flows through both sections of tube 1020 causing the anodes of these sections to be maintained at a relatively low value. This voltage is applied to the control elements of both sections of tube 1021 which effectively causes tube 1021 to be cut off so that the cathodes of both sections of this tube are at substantially −200 volts.

The cathodes of both sections of tube 1021 are connected to the windings of pick-up coil 520. The grids of both sections of tube 1020 are likewise connected to the windings of the pick-up coil 520. Consequently, so long as current flows through the left-hand section of tube 1110 and maintains the grid of the left-hand section of tube 1113 and thus its cathode at a relatively low voltage, tubes 1020 and 1021 do not function as amplifier tubes. However, upon the interruption of the current flowing through the left-hand section of tube 1110 in response to the reception of the stop pulse, a more positive voltage is applied to the control element of tube 1113 thus raising its cathode and thus the cathodes of tube 1020 to a more positive value which in turn causes the voltage of the anodes of both sections of tube 1020 to rise and apply proper operating potentials to the grids of both sections of tube 1021. As a result, tubes 1020 and 1021 operate as normal pulse responsive tubes at this time.

The cathodes of both sections of tube 1021 in addition to controlling the bias voltage of the grids of both sections of tube 1020 also control the bias voltages applied to both sections of all of the tubes 611 through 620 of which 611, 617 and 620 are shown in the drawing, it being understood that one of these tubes is provided for each of the channel pick-up coils 521 through 530 inclusive. Normally, so long as the cathodes of tube 1021 are maintained at a relatively large negative voltage as described above, tubes 611 through 620 inclusive have a large negative voltage applied to their control elements which is sufficient to block the tubes or cut them off so that they do not respond to the voltages applied to their control elements from the various pick-up coils. However, upon the raising of the voltage of the cathodes of both sections of tube 1021 in response to the reception of the stop pulse which voltage causes the amplifier tubes 1020 and 1021 to be conditioned to respond to voltages generated in the reference pick-up coil 520 the biasing voltages applied to the control elements of both sections of tubes 611 through 620 is increased to a point where these tubes will act as full-wave rectifiers of the voltages applied to their control elements from the pick-up coils 521 to 530 inclusive.

Storage condensers 621 through 630, of which 621, 627 and 630 are shown in the drawing, are associated with the respective rectifier tubes 611 through 620. These condensers were previously substantially discharged at the end of the previous cycle of operation of the system in the manner described below. Furthermore these condensers are maintained discharged and the voltage of their upper terminals held at a predetermined value by resistors 681 through 690, of which 681, 687 and 690 are shown in the drawing, in the manner described hereinafter until they are charged by the respective rectifier tubes 611 through 620.

The rectified currents from the rectifier tubes 611 through 620 are employed to charge the associated condensers 621 through 630 so that the voltage of the upper terminals of these condensers becomes negative. A relatively high resistance is connected in the cathode circuits of these tubes. These resistances provide negative feedback voltages which increase the effective resistance of the rectifier tubes so that these tubes act as current generators and as a result these tubes together with their associated condensers sum up and integrate the current applied to them during the integrate interval instead of indicating the peak voltage of the pulses as they would with low impedance rectifier elements or tubes.

In addition these resistors reduce the effects of slightly different tube characteristics.

It will be observed that the input of the amplifier tube 1020 is connected to the outer terminals of the windings of the reference pick-up coil 520. At this time tube 1020 is conditioned to respond to these voltages as described above and repeats them and applies them to the control elements of tube 1021 which tube is also conditioned to repeat these voltages as described above. The output path of tube 1021 is connected to its cathodes. Tube 1021 thus operates as a cathode follower tube having a low output impedance. This output is connected to the inner winding terminals of all the pick-up coils including the reference pick-up coil 520 and all of the channel pick-up coils 521 through 530. The low impedance of the cathode circuit in tube 1021 together with the high impedance windings of the respective pick-up coils, provides sufficient decoupling between the windings of the various pick-up coils so that there is substantially no interference between the output circuits of these coils. In other words, voltage induced across one coil as a result of pick-up action will not cause voltage to be induced in other coils due to the common connection of the output windings of the various coils to the cathodes of tube 1021. It is to be noted that the output of the tube 1021 is connected to the inner winding terminals of the reference pick-up coil 520 which voltage is then, in effect, fed back through the pick-up coil winding to the control elements of tube 1020. This circuit comprises a low-loss feedback circuit such that the gain of tubes 1020 and 1021 operating as amplifiers is substantially unity. In other words the voltage applied to the output circuit of tube 1021 from its cathodes is substantially the same as the voltage induced in the windings of the reference pick-up coil 520. This output voltage is applied to the windings of all of the other channel pick-up coils 521 through 530 and thus to the control elements of the rectifier tubes 611 through 620. In the absence of any voltages induced within the various channel pick-up coils 521 through 530, the voltages from the cathodes of tube 1021 are applied to the control elements of all of the rectifier tubes 611 through 620 which voltages are rectified by the rectifier tubes and cause charges to be accumulated in the associated condensers 621 through 630. However, as described above, under the assumed conditions at about the time the stop pulse starts to pass under the pole-pieces of the reference pick-up coil 520 the start pulse starts to pass under the pole-pieces of the channel pick-up coil 527. These pulses pass under the respective pole-pieces substantially simultaneously and in about the same interval of time and because the signals came from a common source and were both acted upon by substantially the same transmission path attenuating all of the various elements thereof, these signals which initiate under control of the two records in the magnetic disc 501 are substantially identical. Consequently voltages having similar wave forms and generally similar amplitudes are induced in the windings of the reference pick-up coil 520 and in the windings of the seventh channel pick-up coil 527. The windings of the pick-up coil 527 and of the reference pick-up coil 520 have been reversed so that the voltages induced in these two pick-up coils tend to cancel one another. Consequently little or no voltage is supplied to the control elements of the rectifier tube 617. However, as described above, substantially the entire output voltage from the reference pick-up coil is applied through the reference amplifier tubes 1020 and 1021 and through respective channel pick-up coils to the respective amplifier tubes 611 through 620. Consequently the storage condensers 621 through 630 associated with the respective rectifier tubes all become charged to a relatively high voltage except the storage condenser 627 associated with tube 617, under the assumed conditions, because substantially no voltage is applied to the control elements of this tube.

If, however, it had been assumed that the pulses of the first digit represented some other digital value then the particular condenser associated with the corresponding one of the rectifier tubes 611 through 620 would not have been charged negatively in the manner described above. The charging of the various condensers continues for the duration of the received pulse. The high resistances 671 through 680 connected in the cathode circuits of the rectifier tubes increases the impedance of these tubes so that the tubes together with the storage condensers sum up or integrate the current during the entire period. Thus the charging of the condenser continues for the time required for the stop pulse to pass between the pole-pieces of reference pick-up coil 520 and the start pulse to pass between the pole-pieces of the last pick-up coil under the assumed conditions.

During the time charges are being accumulated by the condensers 621 through 630 as described above, the control circuits are being further conditioned in response to the reception of the stop pulse so that the digital value represented by this pulse may be properly recorded.

Upon the initiation of a discharge through the right-hand section of tube 1110 in response to the reception of the stop pulse described above, a negative pulse is applied to the control element of the left-hand section of tube 1114 through coupling condenser 1122 and grid resistor 1123. The resistor 1123 and condenser 1122 tend to differentiate or shorten the pulse applied to the control element of the left-hand section of tube 1114.

Both sections of tube 1114 are connected in a double-stability or flip-flop circuit such that current will continue to flow through either section, but not both sections, until controlling voltages are applied to the circuits and elements of the tube to interrupt the discharge through one section and initiate the discharge through the other section of the tube. Normally the tube has been conditioned as described hereinafter at the end of the reception of the previous subscriber's station designation so that current flows through the left-hand section thereof. However, upon the application of a negative pulse as described above, current is interrupted through this section and the discharge initiated through the right-hand section of tube 1114.

The interruption of current through the left-hand section of the tube 1114 causes the voltage of its anode to rise to a higher positive value which voltage is applied to the control grid of the right-hand section of tube 1113. This voltage tends to cause the right-hand section of tube 1113 to conduct current and lower its anode voltage to a low value which is slightly less in magnitude than the 150-volts negative with respect to ground to which voltage the cathode of the left-hand section of tube 1113 is connected. When the anode voltage of the right-hand section of tube 1113 falls to a relatively low value the grids of the resetting tubes 631 through 640, of which 631, 639 and 640 are shown in the drawing, have a relatively large negative voltage applied to them with the result that their outputs are substantially cut off and they are prevented from conducting any further current at this time. Consequently these tubes will not interfere with the charging of condensers 621 through 630 in the manner described above.

When current starts to flow through the right-hand section of tube 1110 in response to the reception of the stop pulse as described above the negative voltage change at the right anode is also applied through coupling condenser 1205 to the control element of tube 1220. This voltage is repeated as a positive pulse in the output circuit of tube 1220 and applied through individual coupling condensers to the control elements of each of the gaseous conduction tubes 1211 to 1215, inclusive, of which 1211, 1212 and 1215 are shown in Fig. 12. These tubes 1211 through 1215 are arranged in a so-called reentrant chain circuit so that only one tube has a discharge initiated in it each time a positive pulse from the output circuit of tube 1220 is applied to all their control grids.

To condition the steering circuit shown in Fig. 12 for proper operation, relay 1240 is connected in the grid circuit of one of the gaseous conduction tubes 1211 through 1215. Fig. 12 shows relay 1240 connected in the grid circuit of tube 1215. However, it is to be understood that relay 1240 could be connected in the grid circuit of any of the other tubes 1211 to 1214. The purpose and function of relay 1240 is to insure that one of the gaseous conduction tubes 1211 to 1215, tube 1215 when connected as shown in Fig. 12, is in a conductive condition immediately after battery is supplied to the circuit. When battery or reset battery, depending upon the position of switch 1241, is first supplied to the anode of tube 1215, its anode will be at a positive potential of approximately 120 volts while its cathode is at ground potential. The bias voltage applied to the control elements of tubes 1211 to 1215 is normally sufficiently negative so that no discharge will be initiated through any of these tubes upon the application of a positive pulse from the anode of tube 1220 as described above. In the case of tube 1215 as shown in Fig. 12, this negative voltage is supplied to the control element or grid of tube 1215 through operated contacts of relay 1240. Relay 1240 is a slow-operate relay so that during the interval after which battery is applied to the anode of tube 1215 and simultaneously to the winding of relay 1240 and until relay 1240 becomes operated, no negative grid bias is applied to tube 1215. This interval is of sufficient duration to permit a discharge to be initiated through tube 1215. The negative voltage applied to the grid of tube 1215 upon the operation of relay 1240 is of insufficient value to cause an interruption of the discharge current flowing through tube 1215. As was described above, the bias voltage applied to the control elements of tubes 1211 through 1215 is normally sufficiently negative so that no discharge will be initiated through any of these tubes upon the application of a positive pulse from the anode of tube 1220. However, under the above described conditions, current is flowing through the anode-cathode path of the tube 1215 due to the slow operation of relay 1240. Consequently the voltage at the cathode of this tube is at a higher positive value than the voltage of the cathodes of any of the other of the gaseous conduction tubes 1211 through 1214. The cathode of tube 1215 is connected through a resistance network to the control element of tube 1211 thus raising the bias potential applied to its control element to a more positive potential than the bias potential applied to any of the other gas conduction tubes 1212 to 1215 inclusive. The bias voltage applied to the control element of tube 1211 is sufficiently high that a discharge is initiated through this tube upon the application of a positive pulse through its coupling condenser.

Initiation of a discharge through tube 1211 at this time causes the voltage of the cathode of this tube to rise to a relatively high positive value and apply a sufficiently high positive voltage through condenser 1231 to the cathode of tube 1215 to extinguish the discharge through tube 1215. Thus tube 1211 will be the only tube in the reentrant chain consisting of tubes 1211 through 1215 which has a discharge current flowing through its anode-cathode path. Consequently, the voltage at the cathode of tube 1211 is at a higher positive value than the voltage of the cathodes of any of the other gaseous conduction tubes 1212 through 1215. The cathode of tube 1211 is connected through a resistance network to the control element of tube 1212 thus raising the bias potential applied to its control element to a more positive potential than the bias potential applied to any of the other gas conduction tubes 1211 and 1213 through 1215. The bias voltage thus applied to the control element of tube 1212 is sufficiently high that a discharge will be initiated through this tube upon the application of the next positive pulse through its coupling condenser from the output of tube 1220.

During the time discharge current is flowing through tube 1211 as described above, the positive voltage from its cathode is also applied to the control element of the left-hand section of tube 1221. Tube 1221 operates as a cathode follower tube and applies a positive voltage to its cathode circuit in response to the above-described positive voltage applied to its control element on grid. The cathode of tube 1221 is connected to one of the control elements of each of the gas discharge tubes 711, 712, 714 and 718. These tubes are multielement gas discharge tubes and are normally biased so that discharges cannot be initiated through them unless and until the control elements described above have a more positive voltage applied to them. At this time therefore the first row or group of tubes of Fig. 7 is conditioned to respond to voltages applied to their lower control elements as shown in the drawing whereas all of the other tubes of Fig. 7 are not so conditioned.

Figure 7:
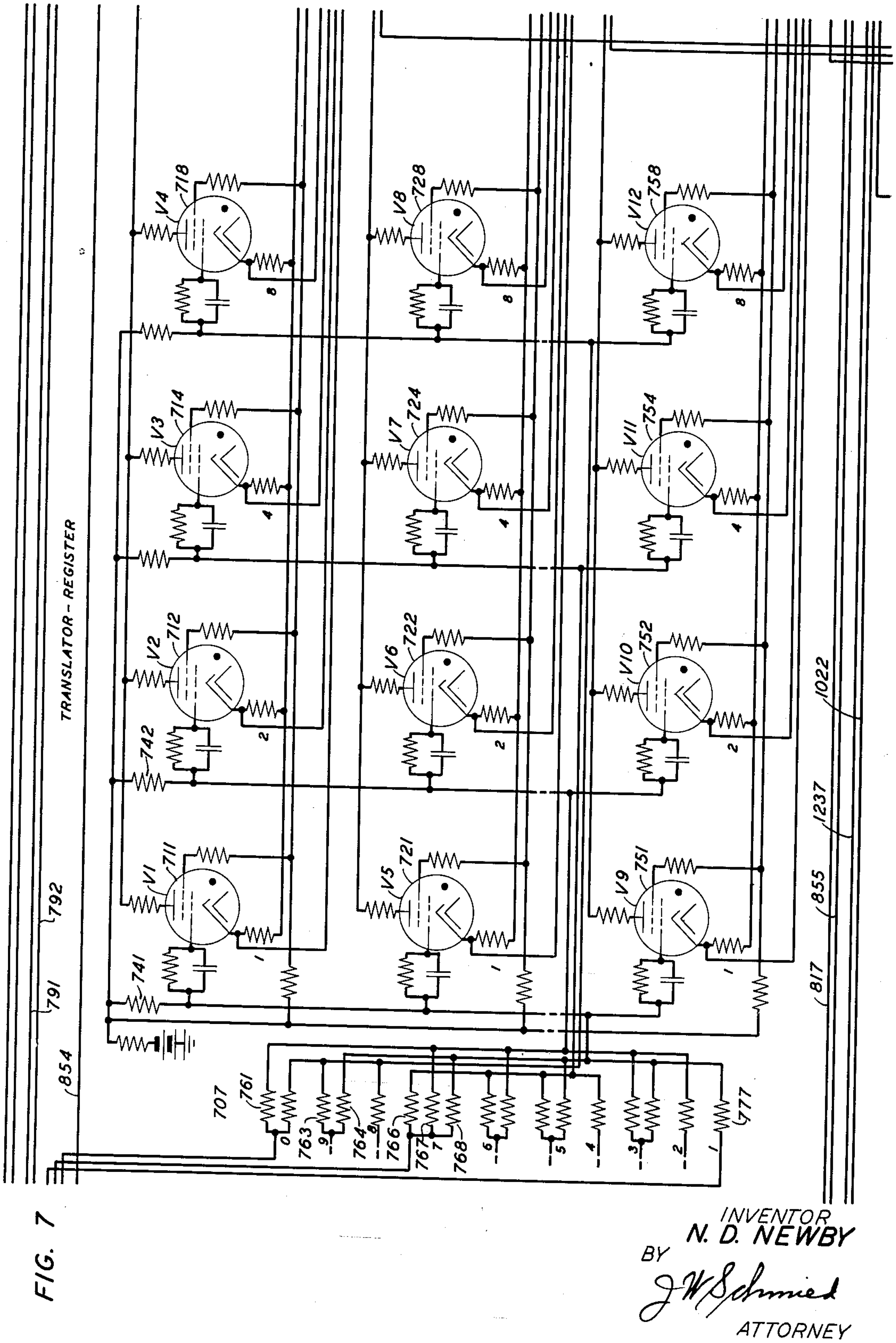

The translator-register tubes shown in Fig. 7 are divided into five sets or groups. Tubes 711, 712, 714 and 718 comprise the first group, tubes 721, 722, 724 and 728 comprise the second group, tubes 731, 732, 734 and 738 which are not shown in Fig. 7 comprise the third group, tubes 741, 742, 744 and 748 which also are not shown in Fig. 7 comprise the fourth group, and the last or fifth group is comprised of tubes 751, 752, 754 and 758 as shown in Fig. 7. Each translator-register group is used to translate the information received on a decimal basis from the integrator circuit shown in Fig. 6 to a binary code or representation as will be hereinafter described. The translator-register circuit in addition to translating the received digital information, also stores this translated information for use at a later time during the operation of the receiver. Since there are five sets or groups of translator-register tubes in the exemplary embodiment described herein, it is possible to receive and accumulate a total of five digital values at any given time.

Figure 7A:
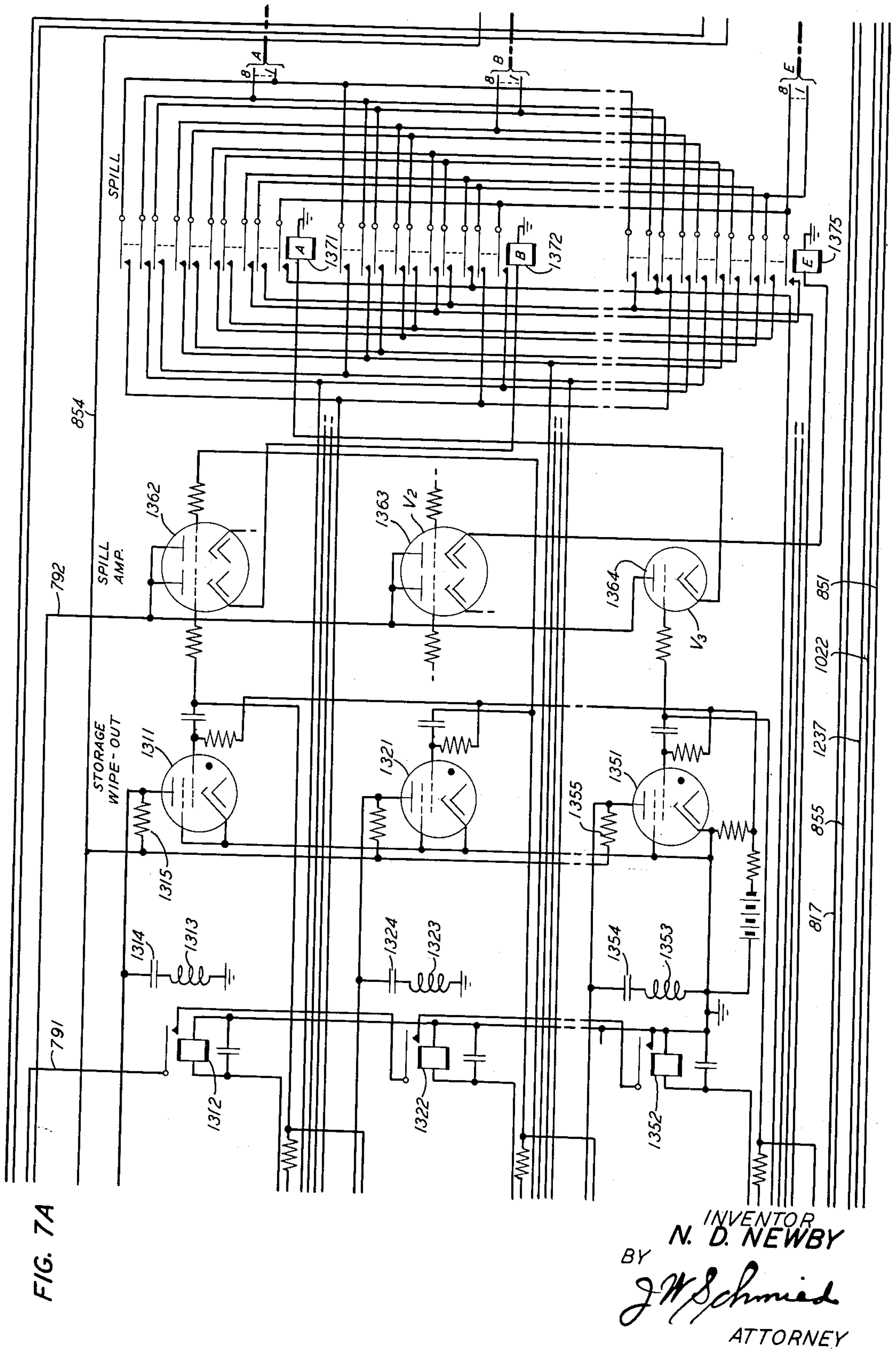

Simultaneous with the application of a positive voltage from the cathode of tube 1221 to one of the control elements of tubes 711, 712, 714 and 718 as described above, a positive voltage is also applied from the cathode of tube 1221 to one of the control elements or grids of the storage wipe-out tube 1311 which will cause a discharge to be initiated through this tube. Tube 1311, tube 1321, tube 1331 which is not shown in the drawing, tube 1341 which is also not shown in the drawing and tube 1351 are gaseous conduction tubes, each being connected in a self-extinguishing circuit. This circuit includes a condenser, such as 1314 for tube 1311, and an inductance such as 1313 for tube 1311 in the anode circuit of the tubes. The inductance and condenser in the anode circuit of each of these gaseous discharge tubes cause a discharge through the tube to be interrupted at a predetermined interval of time after it has been initiated. The action of such circuit elements in causing the discharges in gas tubes to be interrupted is well understood so that a detailed description of the operation and theory relating to the extinguishing of the discharges need not be repeated here. Each of the storage wipe-out tubes is associated with a respective group of translator register tubes as shown in Figs. 7 and 7A. Tube 1311 being associated with tubes 711 through 718, tube 1321 being associated with tubes 721 through 728 and so on. The anode voltage for each group of translator register tubes is supplied through a resistance in the anode circuit of the associated storage wipe-out tube. For example, the anode voltage for tubes 711, 712, 714 and 718 is supplied through resistance 1315 in the anode circuit of tube 1311. When the discharge flowing through tube 1311 as described above, is interrupted due to its self-interrupting circuit, the anode voltage of tube 1311 becomes momentarily negative due to the presence of inductance 1313 in the circuit. This momentary negative voltage is applied to the anodes of tubes 711, 712, 714 and 718 which will interrupt any discharges which may be flowing through any of these tubes. Thus, all previously stored digital information in tubes 711, 712, 714 and 718 is removed and the tubes conditioned to receive and store new digital information.

As was described above, the reception of the stop pulse caused the interruption of the discharge current flowing through the left-hand section of tube 1110 which in turn caused a discharge to be initiated through the right-hand section of tube 1110. At the end of the interval, determined by condenser 1121 and other circuit constants associated with tube 1110, during which current continued to flow through the right-hand section of tube 1110, the left-hand section of this tube starts to conduct current again and interrupts the current flowing through the right-hand section of this tube. This time interval has been selected to substantially coincide with or exceed the maximum length of a received pulse or in the present case from 3½ to 4 milliseconds. Thus, in the specific embodiment described herein this interval of time is substantially the same as that for the circuit including tube 321 but this period may be longer or shorter than the period of the circuits of tube 321. At the end of this interval when the left-hand section of tube 1110 starts to conduct current the receivng equipment is thus again activated to again receive the next start pulse. This next start pulse causes a discharge to be initiated in tubes 320 and 420. The discharge in tube 420 merely discharges condenser 425 which produces no other effects at this time. The discharge through tube 320 applies a positive pulse to the control element of the left-hand section of tube 322 which section repeats this pulse as a negative pulse to the control elements of both sections of tube 323. The discharge through the left-hand section of tube 323 is interrupted by this negative pulse and as a result current again starts to flow through the right-hand section of tube 323. The interruption of current through the left-hand section of tube 323 applies a positive voltage to conductor 332 extending to the control element of the left-hand section of tube 1110 through the coupling condenser 1109. However, inasmuch as the left-hand section of tube 1110 is already conducting current, this pulse produces no effect.

Returning now to the initiation of the flow of current through the left-hand section of tube 1110, the end of the stop pulse of the first digit as described above causes the potential of the anode of this section to fall to a relatively low value and the potential of the anode of the right-hand section to rise to a higher value. The rise in potential of the anode of the right-hand section of tube 1110 due to the interruption of current flowing through this section applies a positive pulse through the coupling condenser 1122 to the control grid of the left-hand section of tube 1114. This pulse, however, is of insufficient magnitude to cause current to start to flow through the left-hand section of tube 1114 at this time. The rise in potential of the anode of the right-hand section of tube 1110 also applies a positive voltage or pulse through the coupling condenser 1205 to the left-hand section of tube 1220. Tube 1220 repeats this voltage or pulse as a negative pulse in its output or anode circuit. However, this negative pulse as applied to the control elements of the gas discharge tubes 1211 through 1215 is unable to interrupt the discharge or otherwise affect the conditions of these tubes.

When the voltage of the anode of the left-hand section of tube 1110 falls to a relatively low value in response to the initiation of a discharge through this left-hand section at the end of integration, the voltage applied to the control element of the left-hand section of tube 1113 likewise decreases and falls to a relatively low value with the result that the cathode of this section similarly falls to a low value and as a result the cathodes of both sections of tube 1020 are restored to their initial low value causing the current through both sections of this tube to increase. As a result the voltage of the anodes falls to a low value and causes the grids of tube 1021 to likewise return to a greater negative value. As a result the reference amplifier comprising tubes 1020 and 1021 is rendered unresponsive to further signals or voltages induced in the reference pick-up coil 520. Likewise the rectifier tubes 611 through 620 inclusive, are again biased sufficiently below the cut-off voltage of these tubes so that they will be unresponsive to voltages induced in the pick-up coils 521 to 530 inclusive. As a result the stop pulse of the first digit will produce no further effects upon the rectifiers and the start pulse of the succeeding digit produces no effect upon the circuits connected to the reference pick-up coil at this time. Meantime, of course, the first stop pulse as recorded in the magnetic disc 501 passes adjacent to the permanent magnet 510 which erases the recording of this pulse in the disc 501.

The decrease in voltage of the anode of the left-hand section of tube 1110 at the end of the stop pulse as described above, applies a negative pulse or voltage through the coupling condenser 1124 to the control element of the left-hand section of tube 1112. The two sections of tube 1112 are connected in a single-stability or one-shot multivibrator circuit in which current flows in one section or the other but may not flow in both sections simultaneously. Current normally flows through the left-hand section of tube 1112. However, when flow of current is stopped through the left-hand section, current starts to flow through the right-hand section thereof and continues to flow through the right-hand section for a predetermined interval of time depending upon the various circuit constants and at the end of this interval of time current again starts to flow through the left-hand section and restores the circuits of both sections of tube 1112 to their initial condition. It is unnecessary to apply any external voltages or pulses to the circuit at the end of the predetermined interval of time in order to restore the circuit to its initial condition. Thereafter the circuit will remain in its initial condition or position of single stability, until again disturbed by an externally applied voltage. In the exemplary embodiment of this invention set forth herein the time interval during which the right-hand section of tube 1112 is conducting is of the order of .0002 second.

Upon the interruption of current through the left-hand section of tube 1112 at the end of the stop pulse as applied to the reference pick-up coil 520, the voltage of the anode of this section rises to a relatively high positive value and applies a high positive voltage to the control element of tube 1115. Tube 1115 operates as a cathode follower tube and as a result the voltage in the cathode of this tube also rises to a relatively high positive value. As a result a positive pulse of short duration is applied through the coupling condenser 1125 to the control element of the right-hand section of the tube 1114. However, inasmuch as this section is already conducting current the application of a positive pulse produces no change in the current flow conditions in tube 1114.

Figure 10:
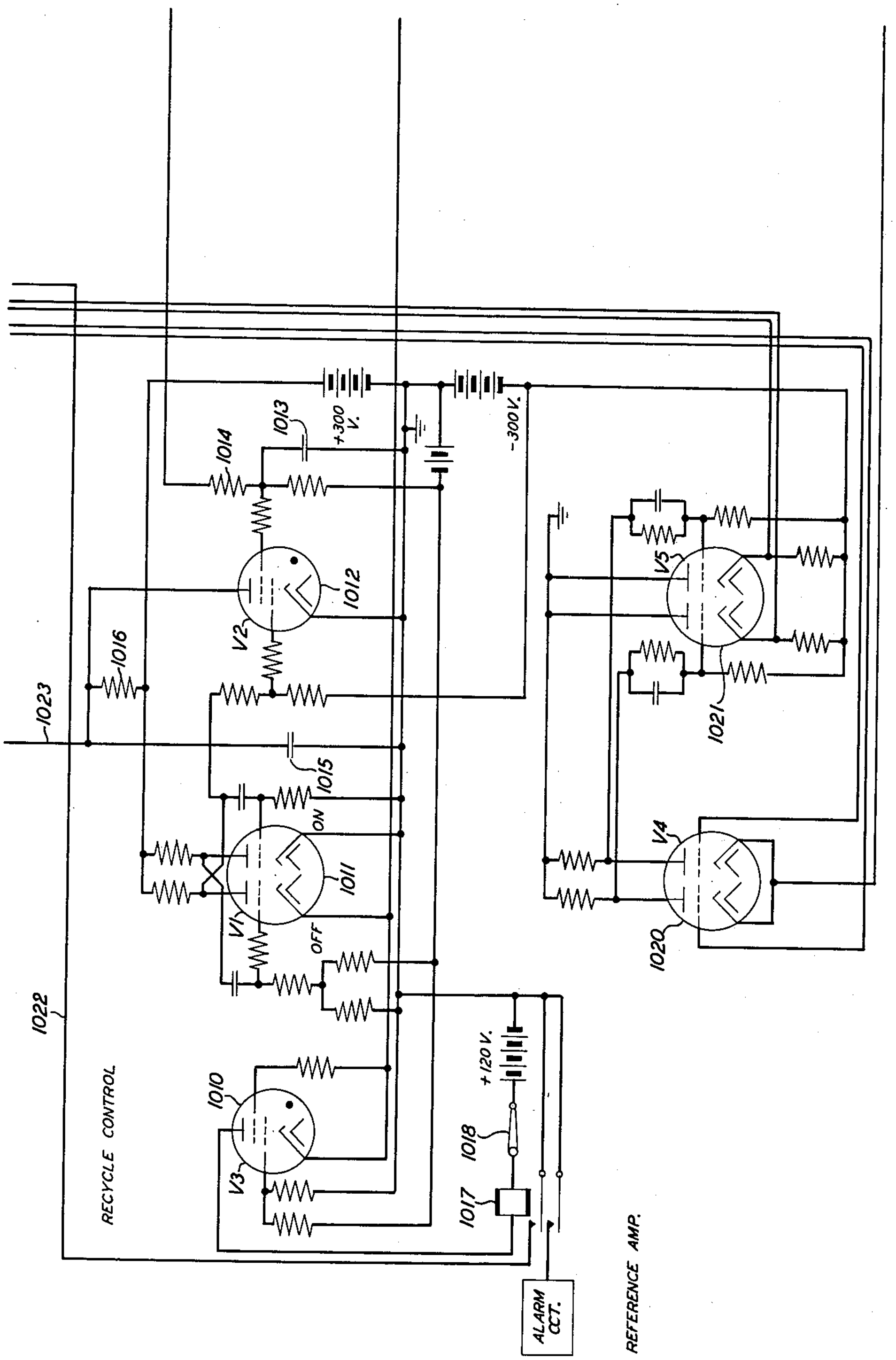

The positive voltage from the cathode of tube 1115 is also applied through the coupling network comprising resistors 1014 and condenser 1013 to one of the control elements of tube 1012. These coupling networks comprise a delay circuit which delays the application of the more positive voltage from the cathode of tube 1115 to the outer control element of tube 1012 as shown in Fig. 10.

The lower terminal of each of the storage condensers 621 through 630 inclusive, is also connected to the cathode of tube 1115. Consequently, when this cathode becomes more positive both the terminals of these condensers also become more positive with the result that the upper terminals have an instantaneous potential which is the sum of the voltage across the respective condensers 621 through 630 and the voltage of the cathode of tube 1115. The upper terminals of these condensers 621 through 630 inclusive, are connected to the lower control elements of the respective tubes 651 through 660 inclusive, of which tubes 651, 657 and 660 are shown in the drawing. These tubes are provided with bias voltages to the upper control elements thereof as well as the voltages applied to the cathodes and anodes of these tubes such that the voltage of the lower control element must rise to a predetermined fixed voltage before a discharge is initiated through any of these tubes. The voltage of the cathode of tube 1115 when it becomes more positive as described above, is sufficiently positive to cause a discharge to be initiated through any of the tubes 651 through 660 when this voltage alone is applied to the respective control elements.

However, as described above all but one of the storage condensers 621 through 630 inclusive receive a negative charge in response to the application of signal voltages to the control elements of the corresponding rectifiers 611 through 620 inclusive. This negative voltage when combined with the positive voltage of the cathode of tube 1115 is insufficient to initiate a discharge through any of the gas tubes 651 through 660 inclusive. However, as described above, one of the condensers 621 through 630 is not negatively charged during the integrating interval. Consequently only the voltage applied to the control element of the gas discharge tube in series with this condenser from the cathode of tube 1115 will be sufficient to initiate a discharge through this tube.

The tubes 651 through 660 inclusive are gaseous conduction tubes provided with a plurality of control electrodes such that so long as no discharges flow through the tubes the voltages applied to the control elements in the tubes may prevent the initiation of a discharge through the tube. However, upon the initiation of a discharge through any such tube, reasonable values of voltage applied to these elements are relatively ineffective and unable to stop the discharge current flowing through the tubes.

Each of the discharge tubes 651 through 660 is provided with an inductance such as 601 and a condenser 601A connected to their respective anodes to cause a discharge through the respective tubes to be interrupted at a predetermined interval of time after the discharge has been initiated. The action of such circuit elements in causing the discharges in gas tubes to be interrupted is well understood so that a detail description of the operation and theory relating to the extinguishing of the discharges need not be repeated here. The inductance coils 601 through 610 of which 601, 607 and 610 are shown in the drawing are connected through the common resistor 691 to ground. As a result, current flowing through these coils must flow through the resistor 691 to produce a voltage drop across this resistor. The voltage drop across the resistor 691 is applied to the cathode of the left-hand section of tube 1011 and to the cathode of tube 1010. The voltage drop across resistor 691 employed in controlling the circuits of tubes 1010 and 1011 is of a negative polarity. If one and only one of the gas discharge tubes 651 through 660 inclusive, has a discharge initiated through it, or if none has a discharge through it, the voltage drop across the resistor 691 is insufficient to initiate a discharge through the gas conduction tube 1010 due to the bias voltages applied to the various control elements thereof.

The two sections of tube 1011 are connected in a single stability or one-shot multivibrator circuit in which current flows in one section or the other but may not flow in both sections simultaneously. Current normally flows in the right-hand section and the left-hand section is normally maintained non-conductive. When the current flow is initiated through the left-hand section of tube 1011 in response to a discharge through one of the tubes 651 through 660 as described above, the current flowing in the right-hand section of tube 1011 is interrupted. Current will continue to flow through the left-hand section of tube 1011 for a predetermined interval of time depending upon the various circuit constants and at the end of this interval of time current again starts to flow through the right-hand section of tube 1011 and the circuits of both sections of tube 1011 restore to their initial condition.

The initiation of a discharge through the left-hand section of tube 1011 reduces the anode voltage of this section, which reduced voltage is applied to the lower control element of tube 1012. This reduced voltage effectively prevents any discharges being initiated through tube 1012 at this time. Consequently after the delay interval of the delay network comprising resistors 1014 and condenser 1013, the application of the positive voltage to the outer control element of tube 1012, from the cathode of tube 1115, as described above, is insufficient to initiate a discharge through tube 1012 at this time.

If, however, in response to the positive voltage derived from the cathode of tube 1115 as described above more than one of the gas conduction tubes 651 through 660 has a discharge initiated through it, a greater voltage drop is developed across resistor 691 due to the greater current flowing through this resistor. As a result a discharge is initiated through tube 1010 by this greater voltage, in addition to the discharge initiated through the left-hand section of tube 1011. If on the other hand a discharge is not initiated through any of the tubes 651 through 660 in response to the high positive voltage from the cathode of tube 1115, then after the delay interval of the delay network comprising resistors 1014 and condenser 1013, a discharge will be initiated through tube 1012.

In other words if one and only one of the tubes 651 through 660 has a discharge initiated through it in response to the positive voltage from the cathode of tube 1115 a discharge is not initiated through either of the gas conduction tubes 1010, 1012. If on the other hand a discharge is not initiated through any of the tubes 651 through 660 in response to the positive voltage from the cathode of tube 1115 a discharge is initiated through tube 1012. Also, in case a discharge is initiated through more than one of the tubes 651 through 660 inclusive, a discharge will be initiated through tube 1010. Tube 1012 is a multielement gaseous discharge tube with condenser 1015 and resistance 1016 in its anode circuit. These elements are arranged to provide a self-interrupting circuit which causes a discharge initiated through tube 1012 to be terminated at a predetermined interval of time after it is initiated.

The initiation of a discharge through the gas conduction tube 1012 will cause a negative pulse to be applied to the control element of both sections of tube 323 (over lead 1023) through coupling condenser 335 from the anode circuit of tube 1012. The negative pulse thus applied to the control elements of both sections of tube 323 will cause the current flowing through the right-hand section of tube 323 to be interrupted and cause a current flow through the left-hand section of tube 323 to be initiated. The action of both sections of tube 323 at this time will cause the system to be reconditioned for the reception of the next succeeding pulse as will be described in detail hereinafter.

The initiation of a discharge through the gas conduction tube 1010 completes a circuit through the winding of relay 1017 for the operation of this relay. Relay 1017 in operating completes a circuit for the operation of relay 811 (over conductor 1022) and applies a ground for the operation of the alarm circuit. As will be hereinafter described, the operation of relay 811 as above stated, will cause the removal of anode potentials from various components of the receiver and cause it to be unresponsive to further incoming signals. This condition will exist until a maintenance man who has received a warning by the operation of the alarm circuit, repairs the fault and extinguishes the discharge through tube 1010 by the operation of switch 1018. After the operation of switch 1018 the various circuits will be restored to their normal or idle condition as will be described below.

In other words if a discharge is initiated through one and only one of the tubes 651 through 660 the circuit has probably functioned in a normal manner so that the operation of the circuit continues as will be described hereinafter. If, on the other hand, the circuit has not functioned properly, either tube 1010 or 1012 has a discharge current initiated through it which current either causes the entire system to recondition itself for reception of the next incoming signal or to completely block itself unresponsive to further incoming signals depending upon which tube has a discharge initiated through it.

Assuming for the moment that the system has operated properly and a discharge is not initiated through either tube 1010 or 1012 at the termination of the interval of time determined by the circuit constants associated with the tube 1112, the discharge current through the left-hand section of tube 1112 again starts to flow and reduces the anode potential of this tube. Consequently, the voltage applied to the grid of tube 1115 and thus to the cathode of this tube, then falls to a much lower value which restores the voltages applied to the lower control elements of tubes 651 through 660 to their initial value. Consequently no further discharge may be initiated through the tubes 651 through 660 at this time. The application of a negative voltage to the delay network comprising resistor 1014 and condenser 1013 produces no useful result at this time.

When the voltage of the cathode of tube 1115 falls from a relatively high positive voltage to a much lower voltage as described above, a negative pulse of short duration is applied through the coupling condenser 1125 to the control element of the right-hand section of tube 1114. This pulse is of short duration due to the fact that the grid resistor 1126 together with the coupling condenser 1125 has a short time constant. That is, their product of resistance and capacity is low.

The application of a negative pulse to the control element of the right-hand section of tube 1114 at this time interrupts the current flowing through this section and causes current to flow in the left-hand section thereof thus restoring the circuits of tube 1114 to their initial condition.

Upon the initiation of current flow through the left-hand section of tube 1114 the voltage of the anode of this section falls to a relatively low value. As a result the control element of the right-hand section of tube 1113 likewise falls to a negative potential thus interrupting the current flowing through the right-hand section of this tube. As a consequence the voltage of the anode of this tube starts to rise to approximately ground potential. The rise in voltage, however, is retarded by the delay network comprising resistor 1128 and condenser 1127. This delay is introduced to prevent the false operation of any of the tubes 651 through 660 due to a possible over-charging transient during or at the end of the discharge of condensers 621 through 630. When the anode of the right-hand section of tube 1113 rises to approximately ground potential, the control elements of the tubes 631 through 640 inclusive also rise to approximately this same potential and discharge the negative charges of such of the storage condensers 621 through 630 as are charged, thus restoring these condensers to their initial conditions when they are again ready to be employed in the manner described above in response to the reception of the stop pulse of the next succeeding digit.

The resistors 681 through 690 connected to the upper terminals of the respective condensers 621 through 630 have a high resistance. In one case the value of these resistors was of the order of ten megohms. These resistors are connected between the upper terminals of the respective condensers and a voltage of about negative ten volts and serve to neutralize any leakage effects between the positive source of voltage, the upper terminals of condensers 621 through 630 and the wiring connected thereto as well as leakage or residual current through the respective tubes 631 through 640.

When one of the tubes 651 through 660 has a discharge initiated through it as described above, and one of the groups of translator-register tubes of Fig. 7 is conditioned to be made conductive as described above, the translator register circuit will function as hereinafter described to translate the dialed code or digit from a decimal basis to a binary number representation. As hereinbefore described, tube 1215 of the reentrant chain of tubes 1211 through 1215 had a discharge initiated through it due to the action of relay 1240 when battery was first supplied to the steering circuit shown in Fig. 12. The discharge current flowing through tube 1215 conditioned the next tube in the reentrant chain, that is, tube 1211, so that it would respond to a positive pulse from the output of tube 1220 upon the reception of a stop pulse. The discharge thus initiated through tube 1211 caused a positive voltage to be applied from the cathode of tube 1211 to the control grid of the left-hand section of the cathode follower tube 1221. The output of the cathode follower tube 1221, which is also in the form of a positive voltage, was then applied to the upper control element of tubes 711, 712, 714 and 718 thus conditioning these tubes, to permit one or more of them to discharge in response to a positive voltage applied to their lower control element from the output of one of the gas discharge tubes 651 to 660, inclusive, as supplied through resistor network 707. Assume now that only one of the tubes, 657 for example, has discharge initiated through it in response to a first digit of 7. Once a discharge is initiated through tube 657, current flows through its cathode resistor raising the potential of the cathode and applying a positive voltage through the resistor network 707 comprising resistors 761 through 777, inclusive, to the lower control elements of tubes 711, 712 and 714, thus initiating a discharge through these tubes. Tubes 711, 712 and 714, when a discharge flows through them, in turn apply positive voltages from their cathode circuits to the make contacts of the spill relays 1371 through 1375 of which relays 1371, 1372 and 1375 are shown in Fig. 7A. The operation and function of the spill relays 1371 through 1375 will be hereinafter described.

The resistors 761 through 777 of the resistor network 707 shown in the drawing are provided to permit the cathodes of the tubes 651 through 660 to be connected to the desired grids of the tubes shown in Fig. 7 to cause the translation of the dialed code or digit from a decimal basis to a binary number representation and at the same time prevent improper operation of the other tubes shown in Fig. 7.

In other words, while ten tubes 651 through 660, inclusive, including intermediate tubes not shown in the drawing, are required to indicate each one of ten different digital values as are described above, only four tubes 711, 712, 714 and 718 are required to record the same information in Fig. 7. Thus when a discharge initiated through tube 651 identifies the digit value of one, a discharge is also initiated through tube 711. When discharge is initiated through the next tube assumed to be 652, but not shown in Fig. 6, discharge will be initiated through tube 712. When a discharge representing a digit three is initiated through tube, say 653, not shown in the drawing, then a discharge will be initiated through both tubes 711 and 712 representing three. For a digit four a discharge is initiated through tube 714, for five through tubes 711 and 714, for six through tubes 712 and 714, for seven through tubes 711, 712 and 714, for eight through tube 718, for nine through tubes 711 and 718 and for ten i. e. numeral zero, a discharge is initiated through tubes 712 and 718.

The above-described discharges through tubes 711, 712, 714 and 718 are initiated during the time discharges flow through the anode-cathode circuits of the respective tubes 651 through 660, inclusive. As described above, the discharges through tubes 651 through 660, inclusive, are arranged to be automatically terminated after a predetermined interval of time due to the action of an inductance and the condenser elements connected in the anode circuits of these tubes as previously described. However, when a discharge is initiated through any one or more of tubes 711, 712, 714 and 718, such discharge or discharges are not interrupted at the time of restoration of tubes 651 to 660, but will continue until interrupted as described hereinafter. Coincident with the initiation of the discharges through the various tubes 711, 712, 714 and 718 as described above, similar potentials are applied to the inner control grids of the other translator-register tubes of the second through the fifth groups shown in Fig. 7. However, the second or upper control elements of these tubes are not sufficiently positive at this time to permit discharges to be initiated through these other tubes in response to the voltages applied to their lower control elements.

In addition, it should be noted that the magnitude of the various translating resistors included in network 707, together with the magnitude of the resistors connected in the cathode circuits of tubes 651 through 660, inclusive, are such that the only tubes in a translator-register group shown in Fig. 7 which have a sufficiently high positive potential applied to their inner control elements to cause a discharge to be initiated through the tubes are the particular translator tubes required to give a proper translation of the digital value. For example, assume that tube

657 has a discharge initiated through it indicating that the received digit was 7. The higher positive voltage of the cathode of tube 657, caused by the discharge current flowing through the tube, is applied to control elements of translator-register tubes 711, 712 and 714 (assuming as described above that the first group has been previously conditioned) through only one resistance each in network 707. In the case of tube 711, the positive voltage is applied through resistance 768. For tube 712, the positive voltage is applied through resistance 767. Likewise, for tube 714, the positive voltage is applied through resistance 766. On the other hand, the positive voltage applied to the control element of tube 718 in the same group is supplied through three resistances in network 707. These are resistances 763, 764 and 768. The voltage drop through these resistances is such that insufficient positive voltage is applied to the control grid of tube 718 to initiate a discharge through it. In every case, the positive voltage as applied to a particular tube in a translator-register group which must remain in a non-conductive state for proper translation, is supplied through two or more resistances in network 707.

As hereinbefore described, a discharge is initiated through tube 657 in response to the reception of the digit 7. This in turn caused discharges to be initiated through tubes 711, 712 and 714. Discharge current flowing through one or more of the tubes 711 through 718 completes a path for the operation of relay 1312 from ground through the winding of the relay to the cathode circuits of tubes 711 through 718.

Relays 1312, 1322, 1332, 1342 and 1352 of which relays 1332 and 1342 are not shown on the drawing, are connected together in a chain circuit as shown in Fig. 7A so that when all five relays are operated, a circuit is closed for the application of ground to conductor 791. Conductor 791 extends through Figs. 5, 6 and 7 to the upper control element or grid of tube 422 as shown in Fig. 4. Each group of translator-register tubes shown in Fig. 7 has associated with it one of the relays above-described. As shown on the drawing, the winding of relay 1312 is connected to the cathode circuits of tubes 711 through 718, the winding of relay 1322 is connected to the cathode circuits of tubes 721 through 728 and the winding of relay 1352 is connected to the cathode circuits of tubes 751 through 758. Likewise, the windings of relays 1332 and 1342 which are not shown in Fig. 7A are connected respectively to the cathode circuits of tubes 731 through 738 and 741 through 748 which also are not shown.

Returning once again to the operation of the integrator circuit of Fig. 6 and the translator-register circuit of Fig. 7 as hereinbefore described, it is apparent that the numerical value of the first digit has been determined in accordance with the time of arrival of the second or stop pulse representing this digit and the value transferred to the tubes shown in Fig. 7. In addition, the circuits of the receiving and storing devices set forth herein have been reset so that they are in condition for receiving the start pulse of the next digit. This pulse when it arrives is repeated through the system in the manner described above causing discharges through tubes 320 and 420. Discharges through tube 420 result in keeping condenser 425 discharged, but otherwise perform no useful function. A positive pulse from the cathode of tube 320 is repeated as a negative pulse in the output circuit of the left-hand section of tube 322 in response to this start pulse. This negative pulse in turn causes the discharge flowing through the left-hand section of tube 323 to be interrupted and a discharge initiated through the right-hand section of this tube as a result.

Interruption of the discharge flowing through the left-hand section of tube 323 at this time applies positive voltage to the control element of the left-hand section of tube 1110; inasmuch as this circuit is already conducting current this positive voltage produces no further effect. This second start pulse is of course recorded by the magnetic recording and delay device shown in Fig. 5 and later passes between the pole-pieces of the various pick-up coils in the same manner as described above. Upon the reception of the second stop pulse the circuits operate as described above in response to the first stop pulse except that in response to the second stop pulse a discharge is initiated through tube 1212 instead of 1211 and the discharge flowing through tube 1211 is interrupted; consequently, the potential of the second or upper control elements of tubes 711, 712, 714 and 718 is restored to lower or negative value so that further discharges will not be initiated through any of these tubes. The discharges already flowing through the various tubes, however, continue to flow at this time. In addition, the voltage applied to the second or upper control elements in the second group of tubes, namely, tubes 721, 722, 724 and 728 is raised to a sufficiently high value so that upon the application of a more positive voltage to the lower control elements of these tubes, discharges will be initiated through these tubes between their anodes and cathodes in the same manner described above with reference to tubes 711, 712, 714 and 718.

Thereafter, the circuit is operated in a manner similar to that described above in response to the succeeding digits. The third start and stop pulses cause the circuits to be operated in a similar manner except that in response to the third stop pulse, a discharge is initiated through tube 1213 and the discharge current flowing through tube 1212 is interrupted. As a consequence, the potential of the second or upper control element of tubes 721, 722, 724 and 728 is restored to a lower or negative value so that further discharges through these tubes for the time being will be prevented. Any discharges already flowing through these tubes will, however, not be interrupted at this time. In addition, the voltage applied to the second or upper control element of the third group of tubes, that is, tubes 731 through 738, is raised to a sufficiently high value so that upon the application of a more positive voltage to the lower control element of one or more of these tubes, a discharge will be initiated through the tube or tubes as described above and thus the digital value of the third digit will be stored in the translator-register circuit. Thus far, the numerical value of the symbol or digit for the first three sets of start and stop pulses has been received and stored in the translator-register tubes shown in Fig. 7. The fourth and fifth sets of pulses, that is, start and stop pulses will be received and acted up in a similar manner. The fourth stop pulse will cause a discharge to be initiated through tube 1214 and interrupt the discharge through tube 1213. The digital value of the fourth digit will be stored in one or more of the tubes 741 through 748. The fifth stop pulse will cause a discharge to be initiated through tube 1215 and interrupt the discharge through tube 1214. The digital value of the fifth digit will be stored in one or more of the tubes 751 through 758.

As above described, whenever a group of translator register tubes has a discharge flowing through one or more of the tubes in the group, indicating the numerical value of the stored digit, a path is completed for the operation of the associated relay 1312, 1322, 1332, 1342 or 1352. Thus, it will be observed, that upon the reception and storage of the fifth digit as above described all relays 1312, 1322, 1332, 1342 and 1352 will be operated and a ground through operated contacts of all the relays over conductor 791 will be applied to the upper control element of tube 422 through resistance 430. Tube 422, as hereinbefore described, is a multielement gaseous discharge tube with the two control elements so arranged that any discharge through the tube is under the joint control of both control elements or grids. Both control elements are normally maintained at a negative potential which is below cut-off for the tube and there is no discharge current flowing through the tube. The application of ground potential to the upper control element of tube 422, as above-described, effectively places a more positive potential upon the upper control element and conditions tube 422 so that it will respond and have a discharge initiated through it upon the application of a more positive potential to its lower control element. As hereinbefore described each received pulse will cause a discharge to be initiated through tube 420 which in turn will discharge and maintain condenser 425 discharged so that the voltage of its upper terminal is relatively low. Consequently, the voltage of the control element of the left-hand section of tube 421 is also maintained at a relatively low value and thus no current flows through this section of tube 421. Current continues to flow through the right-hand section of tube 421 after the reception of the first pulse. So long as pulses are received sufficiently close together, the circuits then remain in the condition described until the blank interval or long pause between pulses representing a complete subscriber's designation is received. As hereinbefore described, sometime near the end of this long pause or blank signal, the upper terminal of condenser 425 becomes charged to a sufficiently positive voltage so that the voltage of the control element of the left-hand section of tube 421 becomes sufficiently positive to initiate a discharge through the left-hand section of this tube. The initiation of the discharge through the left-hand section of tube 421 interrupts the discharge flowing through the right-hand section of tube 421. Thus, the voltage of the anode of the right-hand section of tube 421 becomes more positive which positive voltage is applied to the lower control element of tube 422.

Assume now for the purpose of illustration, that the fifth digit stored in the translator-register circuit was the last digit of the subscriber's designation, which as hereinbefore described, is followed by the blank or long pause. With this assumption then, tube 422 will have a discharge initiated through it since, as described above, the upper control element has had a more positive potential applied to it while simultaneously a positive voltage has been applied to the lower control element. Discharge current flowing through tube 422 completes a circuit for the operation of relay 429 from ground through the winding of the relay, through the cathode-anode circuit of tube 422 to its anode battery supply. Relay 429 in operating closes a circuit for the application of anode voltage to the spill amplifier tubes 1362, 1363 and 1364 over conductor 792. Upon the initiation of a discharge through tube 422, a circuit is also completed for the operation of relay 814 from ground through the winding of the relay over conductor 1237 to the cathode-anode circuit of tube 422 to its anode battery supply. The discharge current flowing through tube 422 will also cause a positive voltage to be applied from the cathode of tube 422 over conductor 1237 to the control element of the right-hand section of tube 322, is repeated as a more negative voltage in its anode circuit and is applied to the control element of the left-hand section of tube 321. Thus, the discharge current flowing through the left-hand section of tube 321 will be interrupted and a discharge will be initiated through the right-hand section of tube 321. It will be observed then that the low voltage from the right-hand section of tube 322 maintains the voltage of the anode of the right-hand section of tube 321 at a low value; consequently, the circuits of tube 321 remain in the condition wherein the anode of the right-hand section of tube 321 is at a relatively low positive voltage which voltage is applied to the inner control element of tube 320 and effectively prevents any further discharges through this tube in response to the reception of further repetitions of pulses of the complete subscriber's designation. Consequently, the circuits do not respond to any further repetition of the received pulses representing the designation.

Returning again to the operation of the steering circuit shown in Fig. 12 as hereinbefore described, the reception of the fifth stop pulse caused a discharge to be initiated through tube 1215. As a result of this discharge, the current flowing through the anode-cathode path of tube 1215 caused a positive voltage from the cathode circuit of tube 1215 to be applied to the control element of its associated cathode follower tube, namely, tube 1223. The output of tube 1223 which is in the form of a positive voltage is applied to the upper control elements of the translator-register tubes 751 through 758 and to the storage wipe-out tube 1351 as hereinbefore described and is also applied to the control element of spill amplifier tube 1364.

When digit register circuits are used in rotation with the first desired digit of the subscriber's designation randomly located among the registers as is the case of the exemplary embodiment described herein, it is necessary to transpose or switch the output leads from the translator-register circuit in such a manner that the digits will be stored in the associated control equipment in the proper order. This function is performed by the spill relays 1371, 1372, 1373, 1374 and 1375 of which 1373 and 1374 are not shown in the drawing. The spill relays 1371 through 1375 are shown schematically and actually require twenty sets of make contacts each. Only one of the spill relays 1371 through 1375 will be operated for each circuit usage, the choice of the relay being under the control of the steering circuit. To permit the steering circuit to select and operate the desired spill relay for each circuit usage, spill amplifier tubes 1362, 1363 and 1364 are connected between the output of the steering circuit and the spill relays as shown in the drawing. The spill amplifier tubes are three-element tubes for which the anode voltage is supplied through operated contacts of relay 429 as hereinbefore described. A high resistance is connected in the grid circuit of each section of each tube to minimize grid current prior to the connection of the anode voltage. These tubes acting as cathode followers provide a circuit for the operation of their associated spill relays.

Under the conditions hereinbefore assumed and as hereinbefore described, the reception of the fifth stop pulse will cause a positive voltage to be applied to the control element of tube 1364 and since it was assumed the long pause followed the fifth stop pulse, relay 429 will become operated as hereinbefore described which in turn will connect anode voltage to tubes 1362, 1363 and 1364. Therefore, a current flow will be initiated through tube 1364 which will complete a circuit for the operation of relay 1371. Relay 1371 in operating completes circuits for the application of the positive voltages from the cathodes of all tubes in the translator-register circuit of Fig. 7 which have a discharge current flowing through them, through the operated contacts of relay 1371 to the control elements of tubes 821 through 830 of which tubes 825 through 828 are not shown in the drawing.

As was hereinbefore described, the initiation of a discharge through tube 422 completed a circuit for the operation of relay 814. Relay 814 in operating interrupts the operating and locking circuit of relay 810 which relay is slow to release and starts to release at this time. The operation of relay 814 in addition applies positive battery to the anodes of tubes 821 through 830, thus conditioning the tubes to repeat the potential conditions on the cathodes of the tubes of Fig. 7 to the corresponding relays 831 hrough 850 of Figs. 8 and 9, operating the relays in accordance with the numerical values of the digits of the recorded subscriber's designation as recorded by the tubes of Fig. 7. The various relays 831 through 850 of which relays 839 through 846 are not shown on the drawing, may be employed to control switching circuits for the selection of the subscribers' lines, circuits, or other suitable transmission paths.

As hereinbefore discussed, the last five digits of a complete subscriber's designation are the only digits that are of interest in a terminating local office. With this in mind it was assumed above that the five digits received and recorded by the receiver were the last five digits of the subscriber's designation, therefore, the digital information stored in the first group of translator-register tubes, namely, tubes 711 through 718, represented the fifth from the last digit. This information was in turn transferred to tubes 821 and 822 and their associated relays 831 through 834 by the operation of spill relay 1371. Likewise, the digital information stored in the second group of translator-register tubes, namely, 721 through 728, represented the fourth from the last digit. This information was in turn transferred to tubes 823 and 824 and their associated relays 835 through 838 by the operation of spill relay 1371. And so on until finally the digital information stored in the fifth group of translator-register tubes, namely, tubes 751 through 758, represented the last digit. This information was likewise transferred to tubes 829 and 830 and their associated relays 847 through 850 by the operation of spill relay 1371. Thus, the digital information recorded by tubes 821 and 822 represents the fifth from the last digit of the complete subscriber's designation and tubes 823 and 824 show the fourth from the last digit, while tubes 825 and 826 show the third from the last digit, and tubes 827 and 828 the next to the last and finally tubes 829 and 830 show the last digit of the complete subscriber's designation.

Assume now for the purpose of further illustration that the first digit received by the receiver is the sixth from the last digit of the complete subscriber's designation instead of the fifth from the last digit as was assumed above. Assume further that the digital information representing this digit is stored in the first group of translator-register tubes, namely, 711 through 718. The next succeeding digits which will be the fifth from the last, will be stored in the second group of translator-register tubes and so on until the next to the last digit is received and stored in the last or fifth group of translator-register tubes, namely, 751 through 758. As was hereinbefore described, each time a translator-register group has digital information stored in it, its associated relays 1312, 1322, and so forth are operated and at such time when all five translator-register groups have stored digital information all five associated relays will be operated, that is 1312, 1322, 1332, 1342 and 1352, which in turn will complete a circuit for the application of ground over lead 791 to the upper control element of tube 422. This ground as applied to the upper control element of tube 422 performs no function at this time because as was described above, tube 422 can only have a discharge initiated through it during the time of the long pause or blank between complete subscribers' designations.

Because the last digit of the complete subscriber's designation has not yet been received by the receiver, tube 422 will have no discharge initiated through it. Consequently, relay 429 will not be operated, and as a result, no anode voltage will be applied to the spill amplifier tubes 1362, 1363, 1364 over conductor 792. Thus, the spill relays 1371 through 1375, inclusive, will be inoperative and the digital information stored in the translator-register tubes of Fig. 7 will not be transferred to tubes 821 through 830 of Figs. 8 and 9.

Under the above assumed condition, the fifth pulse received, that its the next to the last pulse of a complete subscriber's designation causes a discharge to be initiated through tube 1215. Discharge current flowing through tube 1215 causes a more positive potential to be applied to the grid of tube 1211 to condition it to respond to the next succeeding pulse. When a sixth pulse, that is the last pulse of a complete subscriber's designation under the assumed condition, is received, a discharge will be initiated through tube 1211. The discharge current flowing through tube 1211 will cause a positive voltage in the cathode to be applied to the control element of the left-had section of tube 1221. Tube 1221, acting as a cathode follower, will in turn apply a positive voltage from its cathode to the control element of the storage wipe-out tube 1311. Tube 1311, as hereinbefore described, in a gaseous conduction tube connected in a self-extinguishing circuit. Positive voltage thus applied to the control element of tube 1311 will cause a discharge to be initiated through the tube. When the discharge current flowing through tube 1311 is interrupted due to this self-extinguishing circuit, the anode voltage of tube 1311 becomes momentarily negative due to the presence of inductance 1313 in the circuit. This momentary negative voltage is applied to the anodes of tubes 711 through 718 which will interrupt any discharges which may have been flowing through any of these tubes due to the previously stored digital information. Tubes 711 through 718 are now in condition to store the sixth pulse, that is the last pulse of the complete subscriber's designation under the assumed condition. The same positive voltage from the cathode of tube 1221 which was applied to the control element of tube 1311 is also applied to the upper control element of tubes 711 through 718 thus enabling these tubes to respond to positive voltage applied to their lower control elements through the resistor network 707. The digital information stored in the second to the fifth group of translator-register tubes shown in Fig. 7 has not been disturbed by the clearing of information from the first group and the storing of new information therein. The digital information now stored in the translator-register tubes is as follows. The last digit of a complete subscriber's designation is stored in the first group of tubes, namely, 711 through 718. The fifth from the last digit is stored in the second group, namely, tubes 721 through 728. The fourth from the last digit is stored in the third group of register tubes, while the second from the last digit is stored in the fourth group of tubes and finally the next to the last digit of the complete subscriber's designation is stored in the fifth group of translator-register tubes, namely, 751 through 758. Once again a path is closed for the application of ground over lead 791 to the upper control element of tube 422. Because the long pause or blank between subscribers' designations follows the sixth digit received under the assumed condition, tube 422 as hereinbefore described will have a discharge initiated through it at this time. The discharge through tube 422 closes a circuit for the operation of relay 429, which in operating connects anode voltage to the spill amplifier tubes 1362, 1363 and 1364. The same positive voltage as applied from the cathode of the left-hand section of tube 1221 to the lower control element of tube 1311 is also applied to the control element of the left-hand section of tube 1362. Since the spill amplifier tubes 1362, 1363 and 1364 have been supplied with anode voltage through the operated contacts of relay 429, over conductor 792, a current flow will be initiated through the left-hand section of tube 1362. Current flowing through the left-hand section of tube 1362 completes a circuit for the operation of spill relay 1372 from ground through the winding of the relay to the cathode-anode circuit of the left-hand section of tube 1362. The operation of relay 1372 will transfer the digital information stored in the translator-register tubes of Fig. 7 to the register tubes 821 through 830 shown in Figs. 8 and 9 and, during this transfer process, will arrange the digits in the proper order. By tracing the leads from the cathodes of tubes 711 through 718, in which the digital information representing the last digit of the complete subscriber's designation is stored, through operated contacts of relay 1372, it will be observed that these leads connect to the control grids of tubes 829 and 830 shown in Fig. 9 which are the proper tubes for the recording of the last digit of a complete subscriber's designation. Similarly, by tracing the leads from the cathodes of the second group of translator-register tubes 721 through 728 in which is stored the digital information representing the fifth from the last digit, through the operated contacts of relay 1372, it will be observed that these leads connect to the control grids of tubes 821 and 822 which are the proper tubes for the recording of the fifth from the last digit of the complete subscriber's designation. It will be observed that regardless of the order in which the last five digits of the complete subscriber's designation is stored in the various groups of translator-register tubes of Fig. 7, the operation of the appropriate one of the spill relays 1371 through 1375 will effect the transfer of this digital information from the translator-register tubes to the register tubes 821 through 830 shown in Figs. 8 and 9 and simultaneously rearrange the digital information in the proper order or sequence.

It will also be observed that the translator-register circuits of Fig. 7, which consist of five groups of tubes, are used repetitively, each group being cleared of stored digital information before being reused to store a succeeding digital representation. The repeated clearing and storing of succeeding digital information will be continued until the last five digits of the subscriber's designation are received and stored in the five groups of translator-register tubes as indicted by the reception of the blank or long pause between designations. When this condition exists, the receiver locks itself from further reception of digits and spills or transfers the digital information stored in the translator-register circuits to the register tubes of Figs. 8 and 9.

Figure 8:
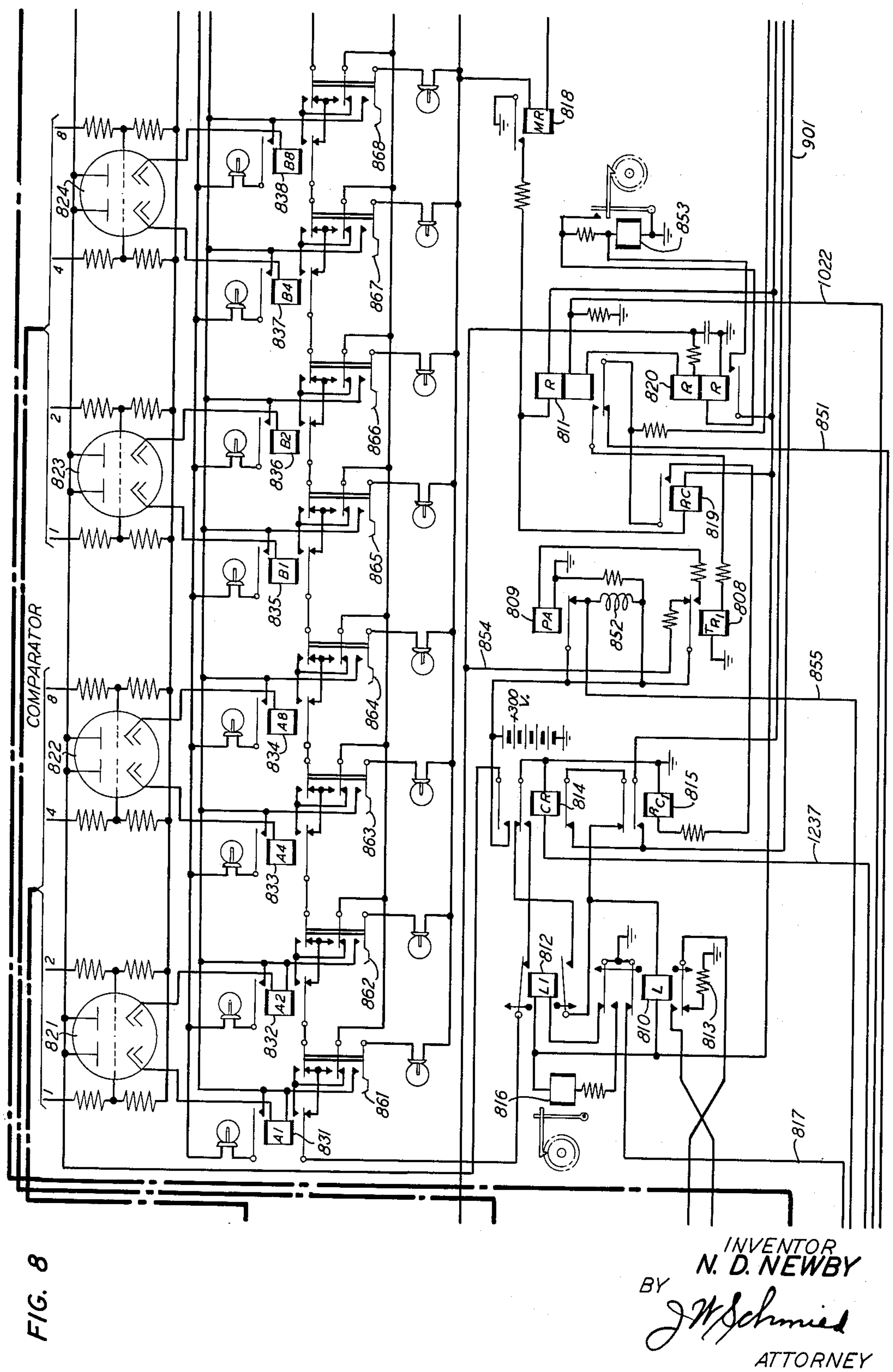
Figure 9:
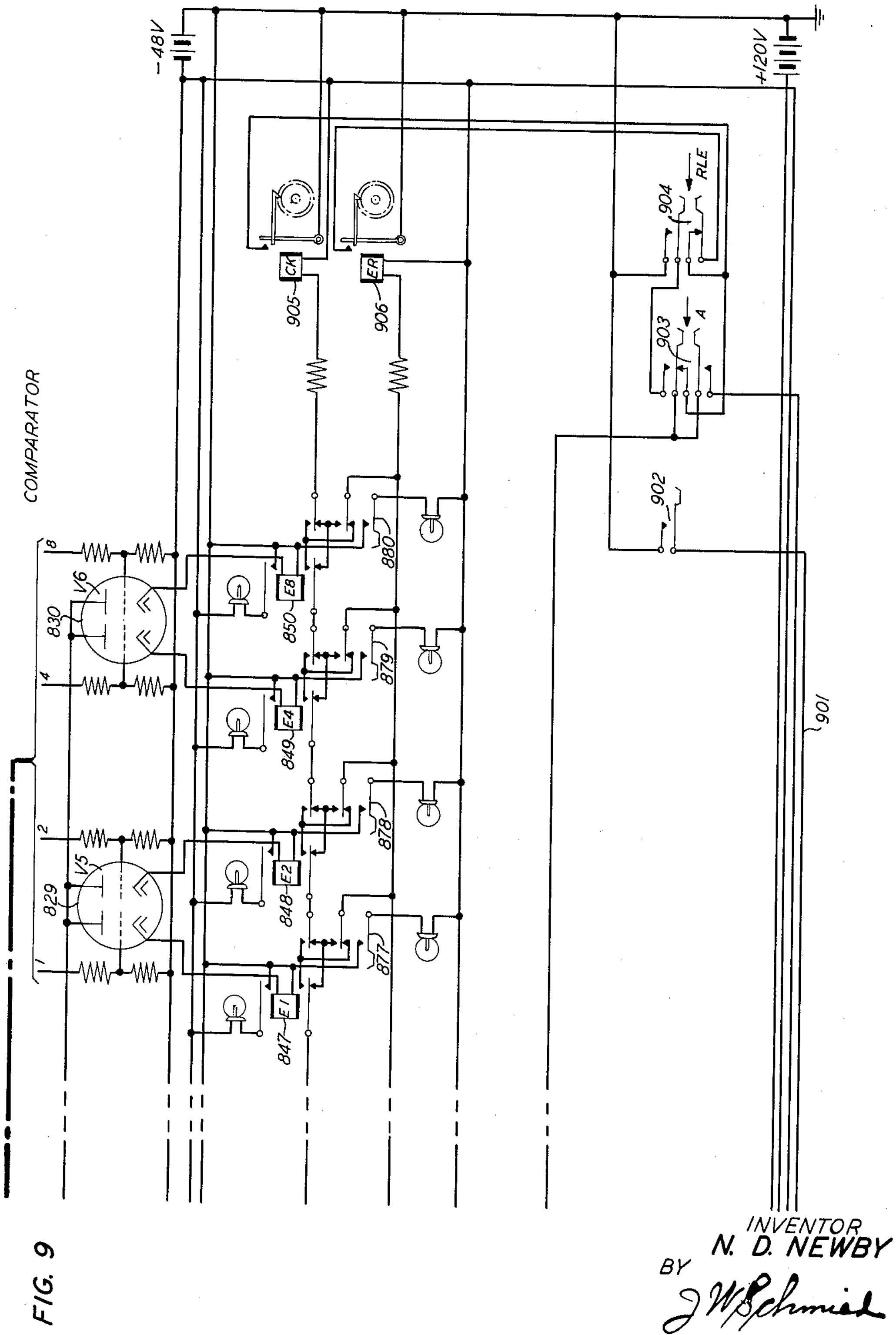

It is thus apparent that two conditions must be fulfilled before the digital information stored in the translator-register tubes of Fig. 7 is cut-through or transferred to the recording tubes 821 through 830 of Figs. 8 and 9. The first condition is that all five groups of translator-register tubes must have digital information stored in them and, secondly, the long pause or blank between complete subscribers' designations must be received at the time all five register circuits are filled. If either condition is not fulfilled, the appropriate spill relay will not function and there will be no transfer of the information from the translator-register tubes to the recording tubes of Figs. 8 and 9. For example, if the long pause or blank between complete subscribers' designations is received at such a time when only four of the translator-register tubes are filled, there will be no transfer of the digital information, likewise, if the translator-register tubes are filled and the long pause or blank between complete subscribers' designations is not received, there will also be no transfer of the digital information. If either of the conditions are not fulfilled as described above the receiver will continue to receive the digits until both conditions are fulfilled, thus, each new digit received will cause a previous digit stored in one of the groups to be cleared and the new digit stored in the particular cleared group. This process will continue until the last five digits of the complete subscribers' designations are stored in the register tubes and the long pause or blank between subscribers' designations is received. When this takes place, the reception of additional digits will be blocked and the appropriate spill relay will function and transfer the digital information to the recording tubes of Figs. 8 and 9 and arrange the digits in the proper order. Since the translator-register tubes of Fig. 7 which are under the control of the steering circuits shown in Fig. 12 are connected in a reentrant chain as heretofore described, it is not necessary to reset the receiver on recycle or to reset the receiver for the reception of a new subscribers' designation. The digits of the new designation may be received and stored in the translator-register circuit in the order received. As described above, the action of the appropriate spill relay will arrange the digits received in the proper order or sequence.

As hereinbefore mentioned, the various relays 831 through 850 shown in Figs. 8 and 9 may be employed to control switching circuits for the selection of the subscribers' lines. As shown in the drawing keys 861 through 880, of which keys 869 through 876 are not shown in the drawing, have been associated with each of the respective relays 831 through 850 for checking purposes. When it is desired to test the operation of a system, a predetermined subscriber's designation is repeatedly transmitted to the system shown in the drawing. This designation is set up on the keys 861 through 880 associated with the registering relays described above. These keys and relay contacts are wired in a circuit such that if the relays operate in accordance with the position of the keys, a circuit will be completed upon the release of relay 810 and the operation of relay 812 through the circuit of an O. K. message register 905. Upon the other hand, if any one or more of the relays is not in the same position as the associated key the time relay 810 releases and relay 812 operates, the error message register 906 operates. Relay 810 is made slow in releasing so that various register relays 831 through 850 have ample time to become fully operated in accordance with the received pulses prior to completion of the circuit from ground through the upper operated contacts of relay 814 and the operated contacts of relay 812 to battery through the windings of either the O. K. or error message registers through the contacts of the recording relays and the associated keys.

As was hereinbefore described relay 814 is operated when the long pause or blank between complete subscriber's designations is received and when the last five digits of this subscriber's designation are stored in the translator-register circuit. With keys 904 and 903 set as shown in the drawing for continuous automatic operation, the operation of either the error register 906 or the O. K. register 905 complete a circuit from ground through the operated contacts of one or the other of these registers, contacts of keys 904 and 903 to battery through the winding of relay 818. Relay 818 operates and completes obvious circuits for the operation of relays 819 and 811. Relay 819 in turn completes an obvious circuit for the operation of relay 815. Relay 815 in operating opens the operating circuit for relay 810 so that this relay cannot reoperate as long as relay 815 is operated.

The operation of relay 811 removes anode battery from the anode circuit of tubes 1211 through 1215, inclusive (over conductor 851), if switch 1241 is in the position shown in the drawing thus interrupting any discharges which may be flowing through any one of these tubes. The operation of relay 811 also completes a circuit for the operation of relay 808 which relay operates and removes anode battery from the anodes of the register tubes 651 through 660, inclusive, as well as from the anodes of tubes 631 through 640, inclusive (over conductor 854), thus preventing the improper charging of condensers 621 through 630, inclusive, and thus restoring the summing or integration circuit of Fig. 6 to its normal idle condition. The operation of relay 808 also removes the anode voltage from the storage wipe-out tubes of Fig. 7A, the translator-register tubes of Fig. 7 and from tube 422 of Fig. 4 (over conductor 854) thus extinguishing all discharges which may be flowing through any of these tubes. Therefore tubes of the storage wipe-out circuit, the translator-register circuit, and tube 422 are restored to their normal idle condition.

The operation of relay 808 also completes an obvious circuit for the operation of relay 809 which relay in turn operates and removes the short circuit from around the inductance 852 and in effect applies a negative pulse to the control grid of the right-hand section of tube 323 (over conductor 855) thus interrupting any discharge to this section of the tube. The interruption of the discharge to the right-hand section of tube 323 will, as was described above, initiate a discharge to the left-hand section of this tube and thus this tube is restored to its normal or idle condition.

Upon the interruption of the discharge of tube 422, as described above, the positive potential is removed from its cathode and results in the removal of the positive potential of the control element of the right-hand section of tube 322. This in turn restores the potential of the anode of the right-hand section of tube 321 and the control element of the left-hand section of this tube to a more positive voltage and insures that a discharge is flowing through the left-hand section of this tube. Therefore the tubes 320, 321 and 322 are restored to their normal idle condition in such a manner as to permit them to operate as described above upon the reception of another start signal. Interruption of the discharge through tube 422 also opens the operating circuit for relay 429. The release of relay 429 removes the anode voltage (over conductor 792) from the spill amplifier tubes 1362, 1363 and 1364 thus restoring them to their normal idle condition. The interruption of the discharge through tube 422, as described above, also opens the operating path for relay 814. The release of relay 814 removes the anode potential from tubes 821 through 830 thus restoring relays 831 through 850 associated with these tubes to the idle or normal condition. In addition, the release of relay 814 removes the operating ground from either the message register 905 or 906 thus permitting this register to release. The release of the operated register causes relay 818 to release and interrupts the operating circuits for relays 811 and 819 thus permitting them to release. The release of relay 819 releases relay 815. The release of relay 811 restores operating anode potentials to the gas tubes 1211 through 1215, inclusive, in the steering circuit shown in Fig. 12. At this time relay 1240, shown in Fig. 12, will operate as hereinbefore described, and initiate a discharge through tube 1215 thus conditioning the steering circuit for the reception of the next stop pulse.

The release of relay 811 interrupts the operating circuit of relay 808 which relay in turn interrupts the operating circuit of relay 809. The release of these two relays restores the positive anode voltage to the gas tubes of Figs. 7, 7A and 6 and to tube 422 shown in Fig. 4. The release of relay 809 short-circuits the inductance 852 again so that it will be ready to restore the circuits of tube 323 to their normal or idle position at the end of the next series of pulses received by the circuit.

The release of relays 814 and 815 restores the circuits for relay 810 whereupon this relay will reoperate and the circuits respond in the manner described above in response to the succeeding pulses transmitted to the circuit.

Key 904 is operated when it is desired to stop the operation of the circuit in case an improper subscriber's designation has been recorded on the recording relays 831 through 850, so that an attendant may have time to examine the circuits and their mode of operation. When key 904 is operated the circuit for the operation of relay 818 is interrupted. Consequently, when an improper designation or number is received with key 904 operated, the operation of the system is interrupted upon the operation of the error register 906 with the received designation standing upon the storing relays. In addition, the lights associated with the keys 861 through 880 are lighted if the keys are operated so that the attendant may determine which portion or portions of the subscriber's designation were not properly received. As shown in the drawing, a group of lamps are wired so that they indicate or designate numbers recorded or registered by the relays 831 through 850. When desired, the attendant may, upon observing these numbers, momentarily operate key 904 whereupon the circuit is restored to its normal or idle condition as described above and available for use and responding to succeeding series of pulses representing subscribers' designations.

The operation of the various tubes and circuits described above is illustrated by the graphs shown in Figs. 13 and 14. For example, the graph designated 1301 in Fig. 13 represents representative signals transmitted from a subscriber's station showing a portion of two series of pulses, each series of which represents a subscriber's number or designation. Each series of pulses is made up of 16 pulses comprising eight start pulses and eight stop pulses. Each series is separated by two blank intervals designated B in the drawing. It will be observed that each pair of pulses, that is a start pulse and its associated stop pulse are of opposite polarity from the previous pair of pulses as hereinbefore discussed. It is assumed that such a series of pulses is transmitted from the subscriber's station 301 over the subscriber's line 302 and switching equipment 303 to the input of the receiving equipment in accordance with this invention.

While relay 810 may be operated before or after the start of the signals 1301 it is assumed in Fig. 13 that relay 810 is operated some time after the equipment of the subscriber's station 301 starts to transmit signals to the central office. Graph 1302 illustrates the time at which it is assumed that relay 810 operates. Graph 1303 illustrates the time that relay 812 releases and locks relay 810 operated under control of relay 814 as described above.

The operation of relay 810 connects the output of the switching and terminal equipment 303 to the input transformer 310. Graph 1304 illustrates a typical form of signals as received and applied to the transformer 310 in response to the signals 1301 applied to the subscriber's line at the subscriber's station 301.

It will also be observed at this point that each pair of pulses is of opposite polarity from the previous pair. These signals are amplified by the gain controlled amplifier comprising tubes 311 and 312 in the manner hereinbefore described. The amplified signals are of substantially the same wave form as those shown in graph 1304. It is assumed that graph 1304 therefore illustrates wave form of the signals after they have passed through the amplifier comprising tubes 311 and 312. These amplified signals are then rectified by the full wave rectifier comprising elements 314 and 315 and are applied to one of the control elements of the gas discharge tube 320 through the cathode follower tube 316. The wave form of the signals thus applied to the upper control element of tube 320 is shown in graph 1305. Except as described hereinafter bias applied to the control elements of tube 320 is such that a discharge is initiated through tube 320 each time the line signal wave exceeds a predetermined amplitude which is illustrated at 1320, 1321 and 1322 in Fig. 13. The graph 1306 illustrates the wave form current flowing through the discharge tube 320. As shown by the graph 1306 and as described hereinbefore, due to the action of condenser 327, resistor 328 and the other parameters of the circuit of tube 320, discharges flowing through this tube are self-extinguishing and exist for only a short interval of time. The output pulses from tube 320 are applied to a control element of tube 420 where they cause similar discharges to be initiated through tube 420. Condenser 425 is connected in the output circuit of tube 420 and tends to charge through high resistor 426 to a relatively high positive voltage between discharges through tube 420. Tube 420 is provided with a self-extinguishing discharge circuit comprising resistors 424, 426, and inductance 423 in addition to the condenser 425. Each time a discharge is initiated through tube 420 the condenser 425 is discharged.

Prior to the application of signals to the circuit the terminal of this condenser is charged to a maximum value and upon the application of the first pulse as illustrated in graphs 1306 and 1307, the upper terminal of this condenser is discharged and after the termination of the discharge the condenser again starts to charge. However, the charging time of the condenser is sufficiently slow so that it has received only a small charge when the next pulse arrives and is again discharged by this pulse.

When condenser 425 is discharged in response to the first pulse applied to the control element of tube 420, it applies a more negative pulse or voltage to the control element of the left-hand section of tube 421 thus interrupting the discharge through this section of tube 421 and initiates a discharge through the right-hand section of tube 421 as described hereinbefore. Interruption of the discharge through the the left-hand section of tube 421 causes the voltage of the anode of this section to rise as illustrated by graph 1308 and the initiation of a discharge through the right-hand section of tube 421 will cause the voltage of the anode of the right-hand section of tube 421 to fall as illustrated by graph 1309. This decrease or fall in the anode voltage of the right-hand section is coupled through a small coupling condenser 428 to a grid tube 422 which causes a negative pulse of short duration to be applied to one of the control elements of tube 422. This negative pulse is illustrated by graph 1310 which will have no effect upon tube 422 at this time.

Thereafter, as described hereinbefore, upon the reception of each of the remaining pulses of the first series the voltage at the upper terminal of condenser 425 is lowered by the discharge through tube 420 as shown in graph 1307. However, upon the reception of the blank intervals between the two series of pulses, the voltage at upper terminal of condenser 425 rises to above a critical reference value illustrated by line 1323 in Fig. 13. As a result the flow of current through the left-hand section of tube 421 is again initiated causing the voltage of its anode to fall to relatively low value as shown by graph 1308 and the current flow through the right-hand section of tube 421 is interrupted causing the voltage of its anode to rise to a relative high value as shown by graph 1309. This rise in voltage of the anode of the right-hand section of tube 421 will cause a positive pulse of short duration to be applied to one of the control elements of tube 422. As explained hereinbefore, the initiation of a discharge through tube 422 is under the joint control of its two grids or control elements. The upper control element of tube 422 has a negative bias of sufficient magnitude to prevent a discharge through the tube with only the application of the positive pulse to its lower control element. Therefore, there is no discharge initiated through tube 422 at this time and the tube will remain in the non-conductive state. Upon the reception of the first start pulse of the next series, a discharge will again be initiated through tubes 320 and 420 and again cause condenser 425 to be discharged lowering the voltage of its upper terminal. As a result the current flowing through the left-hand section of tube 421 is interrupted and the voltage of its plate or anode again rises to a more positive value as shown in graph 1308. At this time, a pulse of negative voltage of short duration is again applied to the lower control element of tube 422 as illustrated by graph 1310.

The output pulses from tube 320 are also applied to the control element of the left-hand section of tube 322. This positive pulse is repeated as a negative pulse in the anode circuit of the left-hand section of tube 322 and is applied to the control elements of both sections of tube 323 as shown in graph 1311. As a result of the first negative pulse, the discharge current flowing through the left-hand section of tube 323 is interrupted and a discharge is initiated through the right-hand section of tube 323. The interruption of the current through the left-hand section of tube 323 causes its anode voltage to rise as shown in graph 1312 and this rise in voltage applied over conductor 332 will cause a positive pulse of short duration to be applied to the control element of tube 1110 as illustrated by graph 1313. The positive pulse on the control element of tube 1110 does not further affect the operation of the circuit because current is already flowing through the left-hand section of this tube. When the next pulse is received by tube 320 (stop pulse) a negative pulse is again applied to both sections of tube 323 as shown in graph 1311. This negative pulse will interrupt the current flowing through the right-hand section of tube 323 and initiate a current flow through the left-hand section of tube 323. The initiation of the current flow through the left-hand section of tube 323 will cause its anode voltage to fall as shown in graph 1312 and a negative pulse as shown in graph 1313 will be applied to the control element of tube 1110.

In order that the operation of the circuits at this time may be more readily understood, the first four pulses representing the first two digits of the subscriber's number or station designation are shown in Fig. 14 on an amplified scale. Here graph 1401 again represents the signals as transmitted from a subscriber's station. In addition the time interval assigned to each digit has been divided up into 25 increments or unit divisions and the possible positions of the various pulses representing different digit values are shown in dotted lines. The solid line is shown in the zero position so that if it is assumed that the pulse is received at this time, it represents the zero value for the first digit of the subscriber's number. The second stop pulse is shown in the No. 4 position. It is, of course, understood that these stop pulses may be received in any one of the 10 positions in their respective pulse intervals.

Graph 1402 shows corresponding pulses as received from the output of the amplifier tubes 311 and 312. When these pulses as applied through rectifier elements 314 and 315 exceed a predetermined magnitude such as represented by lines 1403 in Fig. 14, they initiate a discharge through tube 320. Due to the self-extinguishing action of condenser 327 and resistor 328, the discharge current flows through tube 320 for only a short interval of time as illustrated by the pulses 1404 and 1405 on graph 1406 and the remaining pulses of the same graph shown in Fig. 14.

Each time one of these pulses is received the voltage of the plate of tube 320 is reduced and applies a negative pulse through the coupling condenser to the grid of the left-hand section of tube 321, thus interrupting a discharge flowing through the left-hand section of tube 321, thus interrupting a discharge flowing through the left hand section of this tube and initiating a discharge through the right-hand section. As described above this discharge continues to flow for an interval of time substantially the same as the time required for the incoming pulse, and the transient accompanying it, to die out. At the end of this time the current starts to flow through the left-hand section of tube 321 and the current flowing through the right-hand section of this tube is interrupted. During the time current is flowing through the right-hand section of tube 321 the potential applied to the inner control element of tube 320 as shown in Fig. 3 is reduced so that it is impossible to initiate further discharges through tube 320 in response to noise currents or to any of the transients or oscillations forming a part of the received pulse. At the end of this transient interval, tube 320 is conditioned to respond to a succeeding pulse. Graph 1407 of Fig. 14 shows the voltage of the plate or anode of the right-hand section of tube 321. As shown in this graph this voltage and thus the voltage of the inner control element of tube 320 is reduced to a low value after each discharge through tube 320 and maintained at this low value for a time interval substantially equal to the time required for the received pulse to die out. The above-described action of tubes 320 and 321 takes place upon the operation of relay 810 as described above and continues so long as pulses are received by the equipment described herein, both during the operation of the circuits as described above with reference to Fig. 13, and during the operation of the circuits described herein with reference to Fig. 14.

Upon the reception of the first start pulse a discharge is initiated through tube 320 as described above and illustrated by pulse 1404. This pulse is repeated through the left-hand section of tube 322 and applied to the grids of both sections of tube 323 where it interrupts current flowing through the left-hand section of tube 323 and initiates the flow of current through the right-hand section of this tube. Thereafter current continues to flow through the right-hand section of this tube until the stop pulse is received as illustrated by pulse 1425 on graph 1402 which causes a second discharge 1405 to flow through tube 320. This discharge again causes a pulse to be repeated by tube 322 which pulse interrupts current flowing through the right-hand section of tube 323 and initiates the current flowing through the right-hand section of this tube. Thereafter tubes 320, 322 and 323 respond in the same manner to each pair of pulses.

The voltage of the plate of the left-hand section of tube 322 is illustrated by graph 1408, the voltage being of a low value when the left-hand section is conducting current and of a relatively high value when the left-hand section is not conducting current.

Upon the interruption of current through the left-hand section of tube 323, a positive voltage of short duration is applied over conductor 332 and through the small condenser 1109 to the control element of the left-hand section of tube 1110. Inasmuch as this section of tube 1110 is already conducting current, this pulse produces no useful effect upon the circuits. The graph of the voltage applied to the control grid of the left-hand section of tube 1110 from tube 323 through condenser 1109 is illustrated by graph 1409.

Upon the reception of the stop pulse the flow of current is initiated through the left-hand section of tube 323 which in turn causes negative pulse 1424 on graph 1409 to be applied to the control element of the left-hand section of tube 1110 which pulse interrupts the current flowing through this section and initiates a flow of current through the right-hand section of tube 1110 as described above, the current thereafter continues to flow through the right-hand section of tube 1110 for a time interval which is substantially equal to the time interval required for the received pulse to die out. In other words, the right-hand section of tube 1110 remains conducting for about the same time interval that the right-hand section of tube 321 remains conducting. Thereafter, the flow of current through the left-hand section is again initiated and the current flowing through the right-hand section interrupted automatically without the application of any signaling or control pulses through any of the circuits of this tube. In response to the next start pulse another positive voltage is applied to the control element of the left-hand section of this tube, but inasmuch as this section is already conducting current this pulse again produces no useful results. The succeeding stop pulse then interrupts the current flowing through the left-hand section of tube 1110 for the same predetermined time interval. Thereafter each succeeding pair of pulses which it is desired to record causes the circuits of tubes 320, 322, and 1110 to operate in the manner described.

Graph 1410 shows the voltage of the plate of the left-hand section of tube 1110. This voltage is of a relatively low value while this section is conducting and of a relatively high value when it is non-conducting.

During the time the left-hand section of tube 1110 is non-conducting and its voltage has a relatively high value, a more positive voltage is applied to the cathodes in both sections of tube 1020 which causes this tube and tube 1021 to operate as amplifier tubes and repeat the output from the reference pick-up coil 520 and also to condition the rectifier or integrating tubes 611, 617, 620, etc. to properly respond to the signal voltages induced in the windings and circuits of the channel pick-up coils 521 through 530 in the manner described above.

The delay interval and spacing of the reference pick-up coil 520 is such that the entire stop pulse as received passes under the pick-up coil 520 during the time the left-hand section of tube 1110 is non-conducting as shown by graph 1411. Thus, during this time the amplifier tubes 1020 and 1021 and the rectifier tubes 611, 617, 620, etc. are conditioned to respond to the voltages introduced in the pick-up coils as described above, the voltage from the pick-up coil 520 as amplified by tubes 1020 and 1021 is applied to all of the other pick-up coils 521 through 530 and through these coils to the respective rectifier tubes 611 through 620. These voltages are all rectified by the rectifier tubes and cause a potential to appear across the corresponding storage or integrating condensers 621 through 630 in the manner described hereinbefore. However, in the case of one pick-up coil the voltage from the amplifier tube 1021 will substantially neutralize the voltage induced in this coil due to the fact that the start pulse is passing under this pick-up coil during this interval of time. As a result one of the condensers 621 through 630 will not have a charge stored upon it of the same magnitude as is stored upon the other condensers. Consequently, one of the associated gas tubes 651 through 660 will have a discharge initiated through it in response to the operation of the circuits of tube 1112. This operation is illustrated by graph 1416 and pulses 1412 and 1414. When the flow of current through the left-hand section of tube 1110 is interrupted a positive pulse of short duration is applied through the coupling condenser 1124 to the control element of the left-hand section of tube 1112. Inasmuch as the left-hand section of this tube is already conducting current at this time the pulses 1412 on graph 1413 produces substantially no effect upon the tube. However, at the termination of the integrating interval when current again starts to flow through the left-hand section of tube 1110 a negative pulse illustrated by pulses 1414 on graph 1413 is applied to the control element of the left-hand section of tube 1112 which causes current flowing through this section to be interrupted and current to flow through the right-hand section of this tube. As described above, the sections of tube 1112 are arranged so that current will continue to flow through the right-hand section of tube 1112 for a short interval of time and thereafter current will start to flow through the left-hand section and interrupt current flowing through the right-hand section independently of the application of any other signal or control voltages to this tube.

During the time the current is interrupted through the left-hand section of tube 1112 the voltage of its anode rises as shown by pulse 1415 on graph 1416. This voltage is repeated by tube 1115 and applied to the lower terminals of condensers 621, 627, 630, etc. and raises the potentials of both the terminals of these condensers. The charges stored upon the condenser are opposed to this voltage so that the combined voltage from the cathode of tube 1115 plus the voltage stored upon the condensers 621 through 630 is insufficient to initiate a discharge through any of the tubes 651 through 660, except the one tube associated with the condenser which has a smaller charge stored upon it designating the value of the particular digit. Thus a discharge is initiated through only one of the tubes 651 through 660 which tube indicates the identity or value of the digit represented by the two pulses.

The voltage wave form illustrated by graph 1417 of the plate of the right-hand section of tube 1110 is opposite to the voltage wave form of the plate of the left-hand section of this tube as illustrated by graph 1410. This voltage on the anode of the right-hand section of tube 1110 is applied to the control element of the left-hand section of tube 1114 through the small condenser 1122 with the result that the pulses 1418 and 1419 shown on graph 1420 are applied to this control element. The negative pulse 1418 interrupts current flowing through the left-hand section of tube 1114 and causes the voltage of the plate of this section to rise as shown by graph 1426. The positive pulse 1419 however, is insufficient to initiate a discharge through the left-hand section of tube 1114. Consequently, the current continues to flow through the right-hand section until a negative pulse is applied to this section through the coupling condenser 1125 from the output of tube 1115. The pulses applied to the control element of the right-hand section of tube 1114 are illustrated by pulses 1422 and 1423 on graph 1421 of Fig. 14. When the negative pulse 1423 is applied to the control element the right-hand section of this tube 1114 current flowing through the right-hand section is interrupted and current through the left-hand section initiated, restoring the tube to its original condition and illustrated in graph 1426.

During the time current is flowing through the left-hand section of tube 1114, a reset voltage is applied to the control grids of tubes 631 through 640 which voltage causes these tubes to discharge the upper terminals of condensers 621 through 630. However, when current flowing through the left-hand section of tube 1114 is interrupted the tubes 631 through 640 are substantially cut off so that during the integrating interval and the subsequent pulse interval 1415, tubes 631 through 640 do not effect the voltage applied to the upper terminals of these condensers and thus do not interfere with the integrating action of the recording of the digit. However, after the value of the digit is recorded the voltage of the plate of the left-hand section of tube 1114 again falls so that tubes 631 through 640 restore the charge upon the condensers 620 through 630 to their initial condition where they will be ready to respond to the next integrating interval in the manner described above.

The anode voltage from the right-hand section of tube 1110 is also applied to the grid of tube 1220 through the coupling condenser 1205. As a result tube 1220 repeats a pulse of positive voltage of short duration in response to each of the interruptions occurring through the left-hand section of tube 1110. For example, in response to the reception of the first stop pulse, current flow through the right-hand section of tube 1110 is initiated and as a result a negative pulse similar to pulse 1418 on graph 1420 is applied to the control element of tube 1220. This pulse is repeated as a positive pulse to the control grids of tubes 1211 through 1215 and causes a discharge to be initiated through one of the tubes 1211 through 1215 which comprises the reentrant chain steering circuit. As described hereinbefore, one of the tubes 1211 through 1215 will have a discharge flowing through it and the application of the positive pulse to the control grids of all of the tubes in the chain will cause a discharge to be initiated through the next succeeding tube in the chain which will interrupt the discharge flowing through the preceding tube in the chain. Assume for illustration that tube 1211 had a discharge flowing through it, therefore, upon the application of the positive pulse from the anode circuit of tube 1220 to the control grids of tubes 1211 through 1215 a discharge will be initiated through tube 1212.

Tube 1212 in having a discharge initiated through it interrupts the discharge through tube 1211 and conditions the right-hand section of tube 1221 to repeat a positive voltage from the cathode of tube 1212 which voltage is applied to the control elements of the second row of storing tubes 721 through 728 so that upon the initiation of the discharge through one of the tubes 651 through 660 a discharge will also be initiated through the tubes 721 to 728 in accordance with the translating network of resistors 707 in the manner described hereinbefore.

Each succeeding pair of start and stop pulses causes the circuits to operate in substantially the same manner except that the next time a discharge is initiated through the right-hand section of tube 1110 a discharge is initiated through tube 1213 and the discharge through tube 1212 interrupted. Consequently, when a discharge is initiated through one of the tubes 651 through 660 discharges will also be initiated through tubes 731 through 738 in accordance with the translating network of resistors 707. Thus, each succeeding pair of pulses causes discharges through succeeding groups of translator-register tubes. As explained hereinbefore the reception of pulses representing digital information will be continued until the last five digits of the subscriber's designation are stored in the translator-register tubes of Fig. 7.

The operation of the storage wipe-out circuit, spill amplifier circuit and spill relay circuit shown in Fig. 7A and the register tubes and relays shown in Figs. 8 and 9 have been explained in detail hereinbefore and will not be repeated here.

The values of the last five digits as finally received and registered in the register tubes of Figs. 8 and 9 may then be applied to operate lights, lamps, message registers, control switching circuits or they may be employed in any other desired manner. As described herein the circuits are then reconditioned to respond to other calls. If the circuits in responding to any pair of pulses fail to cause a discharge through one of the tubes 651 through 660 or cause discharges through two or more of these tubes, the entire system will either recondition itself for reception of the next incoming signal or completely block itself unresponsive to further incoming signals depending upon which condition exists as will be explained in detail hereinafter.

The system is arranged for testing purposes for manual or automatic operation on a one call at a time basis. When it is desired to cause the receiving equipment to respond to one chosen subscriber's designation key 903 is moved to its operated position. Under these circumstances the system operates as described above and records the numerical values of the digits selected and causes error register 906 to operate or the OK register 905 to operate. Upon the operation of the various register relays, associated lamps and one or the other of the registers 905 or 906, the operation of the circuit is arrested until key 904 is momentarily operated at which time a circuit is completed for the operation of relay 818. Relay 818 causes the various relays to operate as described above and restore the circuits to their normal or their idle condition except that with key 903 operated a circuit is completed for maintaining relay 818 operated under control of relay 815. This circuit extends from battery through the winding of relay 818, lower operated contacts of key 903 to ground through the upper inner operated contacts of relay 815. Under these circumstances relay 818 is maintained operated which relay in turn maintains relays 811 and 819 operated and relay 819 maintains relay 815 operated while relay 811 maintains relays 808 and 809 operated. Under these circumstances relay 815 in remaining operated prevents the reoperation of relay 810. The circuits thus remain in the above-described condition until either key 902 is released or key 903 is released at which time relay 818 releases and releases the above-described relays which are maintained operated thereby and restores the circuit to its idle or normal condition. Thereafter the circuit may be operated either on a manual or automatic basis as described hereinbefore.

In order to aid in operating the system small two-element gas discharge lamps frequently called "neon lamps" are connected in the double stability circuits so that the condition of these circuits may be readily observed. Thus lamp 350 is lighted when the right-hand section of tube 321 is conducting. Lamp 351 is lighted when the right-hand section of tube 323 is conducting. Likewise, lamps 1050, 1051, and 1052 indicate the conducting conditions of the respective tubes 1110, 1112, and 1114.

A detailed description of the operation of the recycle control circuits of Fig. 10 will now be presented. As previously discussed when a discharge is initiated through only one of the tubes 651 through 660 the circuit has probably functioned in the normal manner. If, on the other hand, the circuit has not functioned properly, either tube 1010 or tube 1012 has a discharge current initiated through it which current either causes the entire system to recondition itself for reception of the next incoming signal or to completely block itself unresponsive to further incoming signals depending upon which tube, 1010 or 1012, has a discharge initiated through it. The two conditions of improper operation mentioned above are generally caused by different factors. For example, if a discharge is initiated through tube 1010 indicating that more than one of the tubes 651 through 660 have a discharge flowing through them, it is evident that there is some fault or trouble in the receiver circuit itself, since in response to the incoming signals representing a digital value, the tubes 651 through 660 have registered two or more digital values. Therefore, under this condition it is desired that the receiver be blocked from further reception of pulses until this error or fault is corrected.

On the other hand, if tube 1012 has a discharge initiated through it resulting from the failure of any of the tubes 651 through 660 to have discharges flowing through them, this probably means that the trouble is either in the transmitting equipment at the subscriber's station or in the transmission line or that the receiver was connected to the line between a start signal and a stop signal or that either a start signal or a stop signal has been lost in transmission. Under these conditions, it is desired that the receiver recondition itself for the reception of the further incoming signals and that any digital information which is now registered in the receiver be retained.

In the event that tube 1010 has a discharge initiated through it which is caused by discharge current flowing through more than one of the tubes 651 through 660, a circuit will be completed for the operation of relay 1017. Relay 1017 in operating completes a circuit (over conductor 1022) through the lower winding of relay 811 and the upper winding of relay 820 for the operation of these relays. Relay 820 in operating completes an obvious circuit for the operation of message register 853 for recording the number of circuit failures.

The operation of relay 811 at this time restores the various circuits to their normal or idle condition except that relay 814 has not been operated because the digits required have not been properly received. Consequently, relay 810 remains operated and relay 812 remains released.

Briefly, the operation of relay 811 removes battery from the anodes of the gas tubes of the steering circuit shown in Fig. 12 (over conductor 851). Relay 811 also completes an obvious circuit for the operation of relay 808 which relay in turn completes a circuit for the operation of relay 809 and removes battery from the anodes of the tubes of the translating and registering circuit of Fig. 7, the storage wipe-out tubes of Fig. 7A, the integrating tube of Fig. 6 and from tube 422 of Fig. 4 (over conductor 854), thus extinguishing all discharges which may be flowing through any of these tubes. Therefore, the tubes of the storage wipe-out circuit, the translator register circuit, the integrator circuit and tube 422 are restored to their normal idle condition. The operation of relay 809 removes a short-circuit from inductance 852 and in effect applies a negative pulse to the control grid of the right-hand section of tube 323 (over conductor 855), thus interrupting the discharge in this section of the tube. Interruption of the discharge of the right-hand section of tube 323 will, as described hereinbefore, initiate a discharge in the left-hand section of this tube and thus this tube is restored to its normal or idle condition. Relays 811 and 820 are held operated by operated relay 1017. The circuits will now remain in this condition until a maintenance man who has received a warning by the operation of the alarm circuit, as hereinbefore described, extinguishes the discharge through tube 1010 by the operation of switch 1018. After the operation of switch 1018, relay 1017 will release and in turn will release relays 811 and 820 and the remaining circuits of the receiver are thus restored to their normal or idle condition and are ready to receive the next incoming pulse.

It is thus observed that when a discharge is initiated through more than one of the tubes 651 through 660 which causes a discharge to be initiated through tube 1010, all the circuits in the receiver are restored to their normal condition and the receiver is blocked from further reception of pulses.

In the event there is no discharge flowing through any of the tubes 651 through 660 which, as hereinbefore mentioned, indicates the likelihood of the trouble in the transmitting equipment at the subscriber's station or in the transmission line or that the receiver is connected to the line between a start and a stop pulse or that either a start or stop pulse has been lost in transmission to the receiver, a discharge will be initiated through tube 1012. The initiation of the discharge through tube 1012 will cause a negative pulse to be applied to the control element of both sections of tube 323, over lead 1023 through coupling condenser 335 from the anode circuit of tube 1012. The negative pulse thus applied to both sections of the control element of tube 323 will cause a current flow through the right-hand section of this tube to be interrupted and will cause initiation of the current flow from the left-hand section of this tube.

Assume, by way of example, that the first pulse received by the receiver is a stop pulse and as explained hereinbefore this pulse will initiate a discharge through tube 320 which in turn will cause a negative pulse to be applied to both sections of tube 323 which interrupts the current flowing through the left-hand section of the tube and initiates the current flowing to the right-hand section of tube 323. The interruption of the current flowing through the left-hand section of tube 323 causes a positive pulse of short duration to be applied over conductor 332 to the left-hand section of tube 1110. However, as hereinbefore described, current is already flowing through the left-hand section of tube 1110 and this pulse has no further effect. The next pulse received under the assumed condition then will be a start pulse of the next succeeding digit of the subscriber's designation which will cause a negative pulse to be applied to both sections of tube 323 in the manner as described hereinbefore. This pulse will interrupt current flowing through the right-hand section of tube 323 and initiate a current flowing through the left-hand section of tube 323. The initiation of the current flowing through the left-hand section of tube 323 will cause a negative pulse to be applied to the left-hand section of tube 1110 in the manner described hereinbefore and will interrupt the discharge flowing through the right-hand section of tube 1110. As previously described, the alternate pairs of start and stop pulses are of opposite polarity, that is, the start pulse and associated stop pulse of a digit are of one polarity and the start pulse and associated stop pulse of the next succeeding digit received are of the opposite polarity. Therefore, under the assumed condition, when the first pulse received, that is a stop pulse, is recorded in the magnetic recorder of Fig. 5, it will be of one polarity and when the start pulse of the next succeeding digit is recorded in the magnetic recorder, it will be in the opposite polarity. As described hereinbefore, discharges are initiated through tubes 651 through 660 in only those tubes in which there is a match between the recorded start pulse and the recorded stop pulse. In the present instance it will be noted that these two pulses as recorded are of opposite polarity. Therefore, they will be no match between the pulses as induced in the pick-up coils and, therefore, no discharge is initiated through any of the tubes 651 through 660 as hereinbefore described. This will cause a discharge to be initiated through tube 1012 which in turn will apply a negative voltage to both sections of tube 323 over conductor 1023 which will interrupt the current that is now flowing in the left-hand section of tube 323 and initiate a current flowing through the right-hand section. The reception of the next pulse (which will be a stop pulse) will cause the current flowing in the right-hand section of tube 323 to be interrupted and initiate the current again in the left-hand section of tube 323. The initiation of the current flow in the left-hand section of tube 323 will cause a negative pulse to be applied to the left-hand section of tube 1110 in the integrator control circuit as hereinbefore described. At this point there will be a pair of matched pulses recorded in the magnetic recorder as shown in Fig. 5 and the circuit will function in the normal manner and record the digital value of the last received start and stop pulse. Thereafter, the receiver is in condition to receive the remaining pairs of pulses representing the subscriber's designation. This same action of tube 1212 and of the flip-flop tube 323 will take place if during the transmission of a series of digits representing a subscriber's designation one particular pulse is lost. The receiver does not, under this condition, completely wipe out or clear any stored information that it may then have but it merely drops the digit in the reconditioning process and continues thereafter to receive, translate and record the succeeding digits.

The operation of the various circuits can perhaps be better illustrated by a few examples. Assume that at the start of each example given below all circuit are normal and that discharge current is flowing through tube 1215 in the steering circuit of Fig. 12 as explained hereinbefore. As hereinbefore described, the operation of the flip-flop circuit of tube 323 in response to negative pulses from the anode of the left-hand section of tube 322 controls the operation of the integrator control circuit shown in Fig. 11. The integrator control circuit of Fig. 11 in turn controls the operation of the integrator circuit of Fig. 6 and the steering circuit of Fig. 12. It is evident from the description hereinbefore given of the operation of tube 323 that the integrator control circuit is operated under normal conditions only in response to the reception of a stop pulse. The first pulse received by the receiver will effect a transfer of the flow of discharge current from the left-hand section of tube 323 to the right-hand section of this tube. This transfer has no effect upon the integrator control circuit of Fig. 11. However, the second pulse received will effect a transfer of the flow of discharge current from the right-hand section of tube 323 back again to the left-hand section of tube 323 and upon this transfer back, a negative pulse is applied to the control element of the left-hand section of tube 1110 in the integrator control circuit of Fig. 11. This in turn causes the integrator control circuit to operate and perform its function as hereinbefore described. The first pulse received and recorded in the magnetic recorder of Fig. 5 passes under the pole-pieces of a channel pick-up coil at about the same time the second pulse received and recorded in the magnetic recorder passes under the pole-pieces of the reference pick-up coil. If the two pulses as received and recorded are start and stop pulses of a pair representing a digital value, they will be substantially identical, both having the same polarity, wave form and amplitude. If both pulses are substantially identical and have the same polarity, a discharge will be initiated through one of the tubes 651 through 660, as hereinbefore described, which represents the digital value of the start and stop pulses transmitted on the line. If they are of opposite polarity indicating that they are pulses of a different pair, no match will be obtained between them and consequently there will be no discharge in any of the tubes 651 through 660. If this takes place, tube 1012 has a discharge initiated through it as described hereinbefore which in turn applies a negative pulse to both sections of tube 323. The negative pulse thus applied to both sections of tube 323 causes the receiver to recondition itself for reception of subsequent pulses as hereinbefore described. The digital value stored in tubes 651 through 660 is then translated and recorded in one of the groups of translator-register tubes of Fig. 7, as hereinbefore described, and the circuits are conditioned to respond to succeeding pairs of pulses. When the translator-register tubes are filled with the last five digits of the complete subscriber's designation (the only five of interest in the specific embodiment described herein), the long pause or blank between designations is received. This causes one of the spill amplifier tubes and its associated spill relay to function and transfer the stored digital information in the translator-register tubes of Fig. 7 to the register tubes of Figs. 8 and 9 where it is available for further application.

The following examples are presented in tabular form to illustrate the condition and operation of various parts of the circuits of the specific embodiment described herein in response to start and stop pulses received over the line. In the table given in each example the heading "Reference point" is shown for reference purposes only. The heading "Received pulse sequence" indicates the order in which the start and stop pulses of the subscriber's designation are received by the receiver. The heading "Discharge in tube 323L" indicates the condition of the left-hand section of tube 323 upon the reception of each of the pulses, that is, whether or not a discharge current is flowing in this section of the tube. The heading "Fig. 11 intg. cont. operated" indicates whether or not the integrator control circuit is operated upon the reception of each of the pulses. The heading "Fig. 6 dischg. in intg. tube" indicates the particular integrator tube shown in Fig. 6 which has a discharge initiated through it in response to reception of a pair of pulses. The heading "Fig. 12 dischg. in steering tube" shows the particular tube in the reentrant chain of tubes which comprises the steering circuit that has a discharge flowing through it as each pulse is received. The heading "Fig. 7 reg. group employed" indicates the group of translator-register tubes of Fig. 7 in which the particular digital value is stored. The numbers shown under this heading refer to the groups of tubes in the circuit as follows: No. 1 indicates tubes 711 through 718, No. 2 indicates tubes 721 through 728, No. 3 indicates tubes 731 through 738, No. 4 indicates tubes 741 through 748 and No. 5 indicates tubes 751 through 758.

Assume that the complete subscriber's designation being transmitted over the line to the receiver described herein is 87635219 and that the start pulses and associated stop pulses are of the polarity shown below:

S 8 S 7 S 6 S 3 S 5 S 2 S 1 S 9
++ −− ++ −− ++ −− ++ −−

*Example No. 1*

Figure 11:
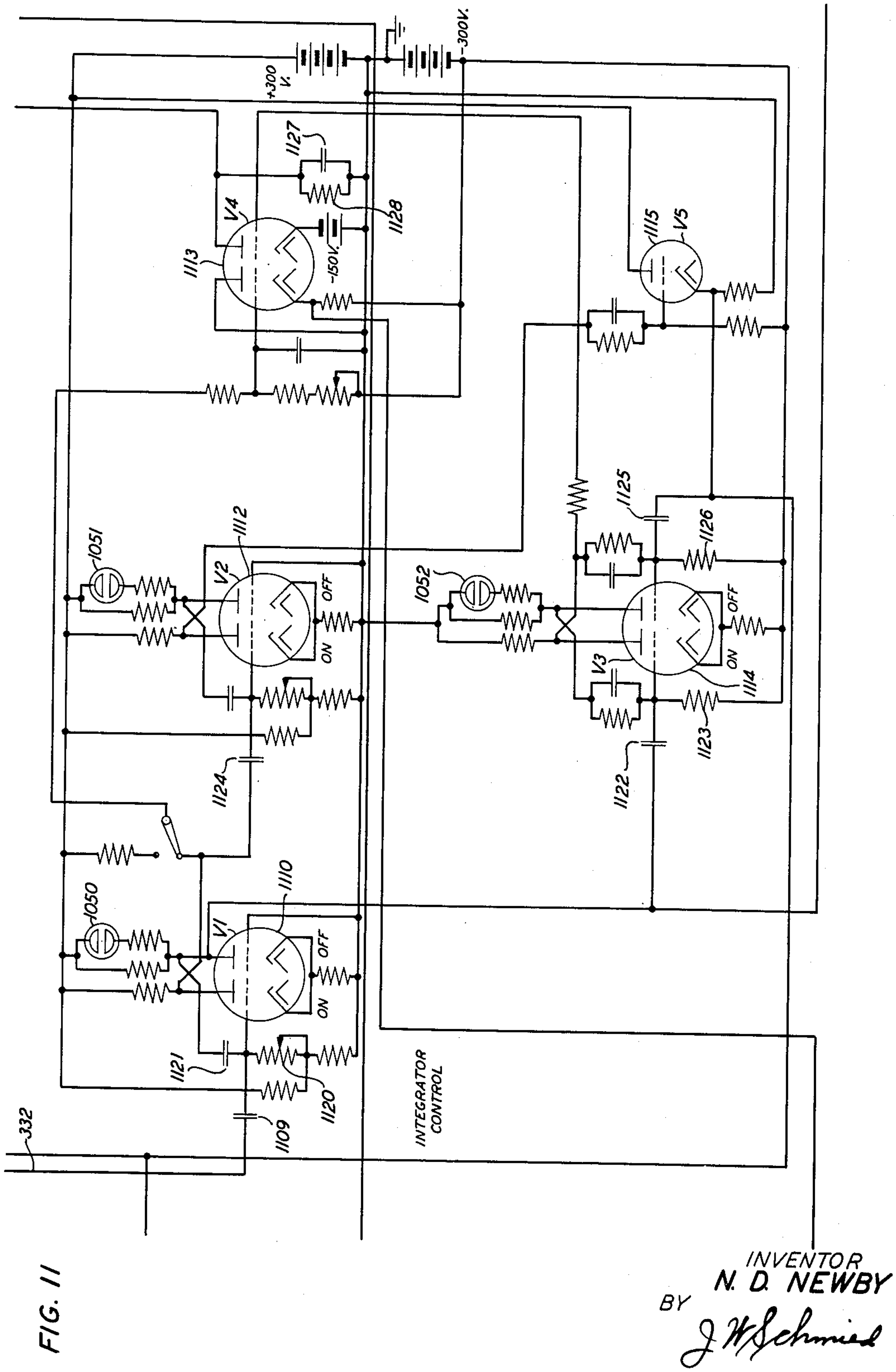

| Reference Point | Received Pulse Sequence | Dischg. in Tube 323L | Fig. 11 Intg. Cont. Operated | Fig. 6 Dischg. in Intg. Tube | Fig. 12 Dischg. in Steering Tube | Fig. 7 Reg. Group Employed |
|---|---|---|---|---|---|---|
| 1 | Normal | Yes | No | None | 1215 | ------- |
| 2 | S | No | No | None | 1215 | ------- |
| 3 | 3 | Yes | Yes | 653 | 1211 | 1 |
| 4 | S | No | No | None | 1211 | ------- |
| 5 | 5 | Yes | Yes | 655 | 1212 | 2 |
| 6 | S | No | No | None | 1212 | ------- |
| 7 | 2 | Yes | Yes | 652 | 1213 | 3 |
| 8 | S | No | No | None | 1213 | ------- |
| 9 | 1 | Yes | Yes | 651 | 1214 | 4 |
| 10 | S | No | No | None | 1214 | ------- |
| 11 | 9 | Yes | Yes | 659 | 1215 | 5 |
| 12 | | (Long pause between designations) | | | | |

In Example No. 1, it is assumed that relay 810 is operated after the start of the signals and that the first signal received and applied to the input transformer 310 is the start pulse of digit 3. Under normal conditions as indicated at reference point 1, the left-hand section of tube 323 is conducting current and a discharge current is flowing through steering tube 1215. When the first pulse, the start pulse for the digit 3 as indicated at reference point 2, is received, a negative pulse will be applied to both sections of tube 323 which will interrupt the discharge flowing through the left-hand section of this tube and will initiate a discharge in the right-hand section of tube 323. As hereinbefore explained this has no effect upon the integrator control circuit. Upon reception of the next succeeding pulse, the stop pulse of the digit 3 as indicated at reference point 3, a discharge will be reinitiated in the left-hand section of tube 323 which, as hereinbefore explained, will apply a negative pulse to the integrator control circuit which then performs its function. Because we have a start pulse and a stop pulse of the same polarity recorded in the magnetic recorder, a match will be obtained and a discharge will be initiated through one of the tubes 651 through 660, in this particular case, tube 653 as shown at reference point 3. The operation of the integrator control circuit at this time will cause a discharge to be initiated through steering tube 1211 which will interrupt the discharge flowing through the steering tube 1215. The digital value 3 represented by the discharge flowing through tube 653 will then be translated and recorded in the first group of translator-register tubes. Thereafter, the circuits of the receiver function as hereinbefore described for the reception of the start and stop pulses for the digits 5, 2, 1 and 9. The stop pulse for the digit 5 will cause a discharge to be initiated through tube 655 of Fig. 6 and steering tube 1212 and will be recorded in the second group of translator-register tubes of Fig. 7. Similarly, the stop pulse of the digit 2 will cause a discharge to be initiated through tube 652 of Fig. 6 and through tube 1213 of the steering circuit. The digit 2 is recorded in the third group of translator-register tubes. Similarly, the fourth digit, that is the digit 1, is recorded in the fourth group of translator-register tubes and the fifth digit, that is the digit 9, is recorded in the fifth group of translator-register tubes. Under the assumed conditions all five groups of the translator-register tubes are filled and the long pause between designations is received as indicated at reference point 12. As hereinbefore described, a discharge is initiated through tube 422 which in turn controls the operation of a spill amplifier and associated spill relay to transfer the information from the translator-register tubes to the register tubes of Figs. 8 and 9.

*Example No. 2*

| Reference Point | Received Pulse Sequence | Dischg. in Tube 323L | Fig. 11 Intg. Cont. Operated | Fig. 6 Dischg. in Intg. Tube | Fig. 12 Dischg. in Steering Tube | Fig. 7 Reg. Group Employed |
|---|---|---|---|---|---|---|
| 1 | Normal | Yes | No | None | 1215 | ------- |
| 2 | 2 | No | No | None | 1215 | ------- |
| 3 | S | Yes | Yes | None | 1211 | ------- |
| 4 | ------- | No | (Tube 1012 fires) | | ------- | ------- |
| 5 | 1 | Yes | Yes | 651 | 1212 | 2 |
| 6 | S | No | No | None | 1212 | ------- |
| 7 | 9 | Yes | Yes | 659 | 1213 | 3 |
| 8 | | (Long pause between designation) | | | | |
| 9 | S | No | No | None | 1213 | ------- |
| 10 | 8 | Yes | Yes | 658 | 1214 | 4 |
| 11 | S | No | No | None | 1214 | ------- |
| 12 | 7 | Yes | Yes | 657 | 1215 | 5 |
| 13 | S | No | No | None | 1215 | ------- |
| 14 | 6 | Yes | Yes | 656 | 1211 | 1 |
| 15 | S | No | No | None | 1211 | ------- |
| 16 | 3 | Yes | Yes | 653 | 1212 | 2 |
| 17 | S | No | No | None | 1212 | ------- |
| 18 | 5 | Yes | Yes | 655 | 1213 | 3 |
| 19 | S | No | No | None | 1213 | ------- |
| 20 | 2 | Yes | Yes | 652 | 1214 | 4 |
| 21 | S | No | No | None | 1214 | ------- |
| 22 | 1 | Yes | Yes | 651 | 1215 | ------- |
| 23 | S | No | No | None | 1215 | ------- |
| 24 | 9 | Yes | Yes | 659 | 1211 | ------- |
| 25 | | (Long pause between designation) | | | | |

In Example No. 2, it is assumed that relay 810 is operated after the start of the signals and that the first signal received and applied to the input transformer 310 is a stop pulse of the digit 2. As indicated at reference point 1, under normal conditions, a discharge is flowing through the left-hand section of tube 323 and through steering tube 1215. The stop pulse for digit 2 as indicated at reference point 2 interrupts the discharge flowing through the left-hand section of tube 323 but has no effect upon the integrator control circuit. The next digit received as indicated at reference point 3 is the start pulse of the next digit (which is the digit 1). This pulse as hereinbefore described initiates a discharge in the left-hand section of tube 323 which in turn causes the integrator control circuit to operate and perform its function. We now have two pulses recorded in the magnetic recorder of Fig. 5 which are of opposite polarity; therefore, there is no match between the pulses and as a consequence no discharge will be initiated through any of the tubes 651 through 660. The integrator control circuit in operating caused a discharge to be initiated through tube 1211 which interrupted discharge current flowing through tube 1215. As hereinbefore described, since none of the tubes 651 through 660 had a discharge initiated through them, tube 1012 in the recycle circuit has a discharge initiated through it which applies a negative pulse to both sections of tube 323 and, as indicated at reference point 4, causes a discharge to be initiated in the right-hand section of tube 323 and interrupts the discharge flowing through the left-hand section of this tube. The next pulse received by the receiver is the stop pulse for the digit 1. As indicated at reference point 5 this stop pulse causes, a discharge to be initiated through the left-hand section of tube 323. A negative pulse is then applied to the integrator control circuit which operates and performs its function and causes a discharge to be initiated through tube 1212 which interrupts the discharge flowing through tube 1211. The magnetic recorder of Fig. 5 has now rotated so that the first pulse received at reference point 2 which was the stop pulse of the digit 2 has been erased leaving the start and stop pulses for the digit 1 recorded in the disc. Since these are pulses of the same pair, there will be a match between them and as a consequence a discharge will be initiated through tube 651, as indicated at reference point 5, to indicate the digital value 1. The circuits then function to translate the digital value 1 and record it in the second group of translator-register tubes of Fig. 7. It is thus observed that the circuit has now reconditioned itself for reception of pulses of the complete subscriber's designation and has completely disregarded the first stop pulse received under the assumed condition and has recorded the digital value 1 of the first pair of matched pulses received by the receiver. The receiver then continues to function as hereinbefore described and records the next digital value, that is 9, in a third group of translator tubes. As indicated at reference point 8 the long pause between designations is now received by the receiver. However, since all five groups of the translator register circuits are not completely filled, there is no spilling or transfer action at the present time to the register tubes of Figs. 8 and 9, instead the receiver continues to receive the digital information transmitted on the line. The digit 8 as indicated at reference point 10 is recorded in the fourth group of the translator-register tubes, the digit 7 is recorded in the fifth group of the translator-register tubes and as indicated at reference point 14 the digit 6 is recorded in the first group of the translator register tubes. At reference point 14 it will be noted that all five groups of translator-register tubes are filled but here again there is no transfer action to the recorder tubes of Figs. 8 and 9 because the long pause between designations has not been received simultaneously. Therefore, the receiver continues to function as shown in the example and as each new digit is received a former digit stored in the group of translator-register tubes is cleared and discarded and the new digital value inserted in its place. At reference point 24 the last digit of the complete subscriber's designation, that is 9, is recorded in the first group of translator-register tubes and immediately thereafter the long pause or blank between designations is received as indicated at reference point 25. At this point it will be noted that the last five digits of the complete subscriber's designation are recorded in the group of the translator-register tubes, the digit 3 in the second group of translator-register tubes, the digit 5 in the third group of translator-register tubes, the digit 2 in the fourth group of translator-register tubes, the digit 1 in the fifth group of translator-register tubes, and the digit 9 in the first group of translator-register tubes. As explained hereinbefore tube 422 has a discharge initiated through it at this time which in turn controls the operation of a spill amplifier and associated spill relay to transfer the digital information now stored in the translator-register tubes to the recorder tubes Figs. 8 and 9 and simultaneously arrange this information in the correct numerical order.

*Example No. 3*

| Reference Point | Received Pulse Sequence | Dischg. in Tube 323L | Fig. 11 Intg. Cont. Operated | Fig. 6 Dischg. in Intg. Tube | Fig. 12 Dischg. in Steering Tube | Fig. 7 Reg. Group Employed |
|---|---|---|---|---|---|---|
| 1 | Normal | Yes | No | None | 1215 | |
| 2 | S | No | No | None | 1215 | |
| 3 | 7 | Yes | Yes | 657 | 1211 | 1 |
| 4 | S | No | No | None | 1211 | |
| 5 | 6 | Yes | Yes | 656 | 1212 | 2 |
| 6 | S | No | No | None | 1212 | |
| 7 | 3 | Yes | Yes | 653 | 1213 | 3 |
| 8 | S | No | No | None | 1213 | |
| 9 | 5 | Yes | Yes | 655 | 1214 | 4 |
| 10 | S | No | No | None | 1214 | |
| 11 | | | | | | |
| 12 | S | Yes | Yes | None | 1215 | |
| 13 | | No | (Tube 1012 fires) | | | |
| 14 | 1 | Yes | Yes | 651 | 1211 | 1 |
| 15 | S | No | No | None | 1211 | |
| 16 | 9 | Yes | Yes | 659 | 1212 | 2 |
| 17 | | (Long pause between designation) | | | | |
| 18 | S | No | No | None | 1212 | |
| 19 | 8 | Yes | Yes | 658 | 1213 | 3 |
| 20 | S | No | No | None | 1213 | |
| 21 | 7 | Yes | Yes | 657 | 1214 | 4 |
| 22 | S | No | No | None | 1214 | |
| 23 | 6 | Yes | Yes | 656 | 1215 | 6 |
| 24 | S | No | No | None | 1215 | |
| 25 | 3 | Yes | Yes | 653 | 1211 | 1 |
| 26 | S | No | No | None | 1211 | |
| 27 | 5 | Yes | Yes | 655 | 1212 | 2 |
| 28 | S | No | No | None | 1212 | |
| 29 | 2 | Yes | Yes | 652 | 1213 | 3 |
| 30 | S | No | No | None | 1213 | |
| 31 | 1 | Yes | Yes | 651 | 1214 | 4 |
| 32 | S | No | No | None | 1214 | |
| 33 | 9 | Yes | Yes | 659 | 1215 | 5 |
| 34 | | (Long pause between designation) | | | | |

In Example No. 3 it is assumed relay 810 is operated after the start of the signals and that the first signal received and applied to the input transformer 310 is a start pulse of the digit 7. Example No. 3 further illustrates the operation of the receiver if for some reason the stop pulse of one of the digits was not received. In this example, it is assumed for purposes of illustration that the stop pulse of the digit 2 as indicated at reference point 11 is not received. As hereinbefore described the circuit will function in a normal manner so that the digit 7 which is the first digit received will be stored in translator-register group No. 1, the digit 6 in group No. 2, the digit 3 in group No. 3, the digit 5 in group No. 4 and as indicated at reference point 10 the start pulse of the digit 2 is received which interrupts the discharge current flowing through the left-hand section of tube 323. As indicated at reference point 11 the stop pulse for this digit has not been received. Therefore, there is no discharge in any of the tubes 651 through 660 and consequently no information to record in the fifth group of the translator-register tubes. The magnetic recorder of Fig. 5 rotates past the erasing head as hereinbefore described and the start pulse for the digit 2 is erased from the disc. The next pulse received as indicated at reference point 12 is a start pulse for the digit 1. This pulse will initiate a discharge through the left-hand section of tube 323 which will cause the integrator control circuit to operate. However, there is no pulse recorded in the disc of the magnetic recorder to match with this pulse and, therefore, no discharge will be initiated through any of the tubes 651 through 660 and as explained hereinbefore tube 1012 will have a discharge initiated through it. The discharge through tube 1012 as indicated at reference point 13 causes a negative pulse to be applied to both sections of tube 323 which will interrupt the discharge current flowing through the left-hand section of tube 323 and condition the circuits for reception of the next stop pulse. When the stop pulse for the digit 1, as indicated at reference point 14, is received it will cause a discharge to be initiated through the left-hand section of tube 323 which in turn will cause the integrator control circuits to function and since there is a start pulse and a stop pulse which are a matched pair recorded in the magnetic disc of Fig. 5, a discharge will be initiated through tube 651 and the digital information represented by the discharge through tube 651 will be recorded in group 1 of the translator-register tubes. It will be observed that although a stop pulse was not received by the receiver the circuit recognized this fact and disregarded the start pulse which was received. In so doing the circuits conditioned themselves to receive the start and stop pulses of the next succeeding pair of digits. Thereafter, the circuits function in the normal manner and the digital information is received and recorded in the various groups in the translator-register circuit until, as indicated at reference point 33, the last five digits are received and recorded in the five groups of translator-register tubes and as indicated at reference point 34, the long pause between complete subscribers' designations is received. Thereupon, the circuit functions as described hereinbefore and transfers the digital information to the register tubes of Figs. 8 and 9 and simultaneously arranges this information in a correct order.

In the exemplary embodiment described it has been assumed that it is desired to store the numeral values of only the last five digits of a complete subscriber's designation. Consequently, only five groups of the various types of circuits and apparatus have been shown in the drawing. Any number may be employed as may be necessary or desired. If it is desired to record additional digits, additional tubes similar to tubes 1211, 1221, in the steering circuit will be provided together with tubes similar to 711 through 718 with a corresponding relay similar to 1312, a corresponding storage wipe-out tube similar to 1311, a spill amplifier tube similar to 1362 with an associated spill relay similar to 1371, and additional register tubes similar to 821 and 822 with associated relays similar to 831 through 834, to register or store the magnitude of each of the desired or necessary number of digits.

Although a specific embodiment of this invention has been shown and described, it will be understood that modifications may be made therein without departing from the scope and spirit thereof as defined by the appended claims. For example, one such modification which could be made comprises the provision of register circuits for recording all of the digits of a complete subscriber's designation plus one register circuit for recording the reception of the long pause or blank between subscriber's designation. When all registers are filled, the setting of the registers is transferred to the storing circuit in proper order under control of the position of the recorded long pause or blank in a manner similar to that described herein.

What is claimed is:

1. In a telephone switching system, apparatus responsive to repeated series of calling signals each series of which is separated by a recognizable signal condition different from any of said calling signals, a plurality of register circuits, apparatus for successively registering the signals of said series of calling signals in said register circuits, a plurality of storage circuits, transfer apparatus jointly controlled by said recognizable signal condition and said register circuits for transferring the setting of said register circuits to said storage circuits, and means responsive to said recognizable signal condition for controlling said transfer apparatus to rearrange the setting of said register circuits transferred to said storage circuits.

2. In a pulse signaling system, pulse receiving apparatus responsive to repeated series of groups of pulses each series of said groups being separated by a recognizable signal condition different from any of said groups of pulses, a plurality of register circuits connected in a closed ring, means for setting any register of the closed ring of register circuits in accordance with the first received group of pulses, means thereafter for successively setting each succeeding register of said closed ring of register circuits in accordance with each correspondingly received succeeding group of pulses, a plurality of storage circuits, transfer means jointly controlled by the setting of said register circuits and by said recognizable signal condition to transfer the setting of said register circuits to said storage circuits and means responsive to said recognizable signal condition for controlling said transfer means to change the order of the setting of said register circuits transferred to said storage circuits.

3. A signal receiver responsive to repeated series of calling signals each series of which is separated by a special signal, a plurality of register circuits connected in a reentrant chain, means for setting any register of the reentrant chain of register circuits in accordance with the first received signal, means thereafter for successively setting each succeeding register of said reentrant chain of register circuits in accordance with each correspondingly received succeeding signal, a plurality of storage circuits, transfer means jointly controlled by the setting of all of said registers in said reentrant chain of register circuits and by said special signal to transfer the setting of said register circuits to said storage circuits and means responsive to said special signal for controlling said transfer means to selectively arrange the setting of said register circuits in said storage circuits.

4. A receiver in accordance with claim 3 wherein said special signal comprises an unvarying signal condition of predetermined duration intervening between the last signal of a received series of signals and the first signal of the repeated series of signals.

5. In a telephone switching system, a receiver responsive to repeatedly received series of calling signals each series of which is separated by a special signal, a plurality of register circuits connected in a closed ring for rotational use, means for setting any register of the closed ring of register circuits in accordance with the first received pair of calling signals, means thereafter for successively setting each succeeding register of said closed ring of register circuits in accordance with each succeeding correspondingly received pair of calling signals, a plurality of storage circuits, means jointly controlled by the setting of said register circuits and said special signal to selectively transfer the setting of said register circuits to said storage circuits and to arrange the setting of said storage circuits in a sequence selectively determined by said special signal.

6. A pulse receiver comprising in combination, apparatus responsive to repeatedly received series of groups of pulses, each series of said groups separated by a special signal, a plurality of register circuits connected in a closed ring, a means for setting a register of the closed ring of register circuits in accordance with the first received group of pulses, means thereafter for successively setting each succeeding register of said closed ring of register circuits in accordance with each correspondingly received succeeding group of pulses, a plurality of storage circuits, a plurality of paths from each of said register circuits to said storage circuits for transferring the setting of said register circuits to said storage circuits, means jointly responsive to said special signal and to the presence of a setting in all of said registers in response to said groups of pulses of said series for selecting particular paths of said plurality of paths to connect each one of said registers to a particular one of said storage circuits and means controlled by said registers and said special signal for transferring the setting of each of said registers over the selected paths to said storage circuits.

7. In a telephone switching system, a receiver for receiving repeated series of pairs of pulses representing a called designation each pair of which represents a symbol or digit of said designation and each series of which is separated by a special signal, comprising in combination, an identifying means responsive to each of said pairs of pulses for identifying the symbol or digit represented by said pair of pulses, a plurality of register circuits connected in a reentrant chain for storing the successively identified symbols or digits, a steering means responsive to each pair of said pairs of pulses for controlling the registration of each of the correspondingly identified symbols or digits in successive registers of the reentrant chain of register circuits, a plurality of storage circuits, a transfer means controlled by said register circuits and responsive to said special signal for selectively transferring the registration of the identified symbols or digits in said register circuits to said storage circuits and to arrange the registration in said storage circuits to correspond to the sequence represened by said series.

8. In a telephone switching system, a receiver for receiving repeated series of pairs of pulses representing a called designation each pair of which represents a symbol or digit of said designation and each series of which is separated by a special signal comprising in combination, an identifying means responsive to each pair of said pairs of pulses for identifying the character or value of the symbol or digit represented by said pair of pulses, a plurality of register circuits connected in a reentrant chain for storing the successively identified symbols or digits, means responsive to the second pulse of each of the succeeding pairs of pulses for controlling the registration of each of the correspondingly identified symbols or digits in successive registers of the reentrant chain of register circuits, a plurality of storage circuits, a transfer means controlled by said register circuits and responsive to said special signal for transferring the registration of the identified symbols or digits in said register circuits to selected ones of said storage circuits whereby the registration in said storage circuits corresponds to the sequence represented by said series.

9. A receiver in accordance with claim 8 in combination with a means responsive to a malfunction of said identifying means for conditioning said receiver to be unresponsive to further received pulses.

10. A receiver in accordance with claim 8 in combination with a means responsive to a non-function of said identifying means for conditioning the receiver to be responsive to succeeding pairs of pulses and to discard the pulses received during said non-function.

11. In a telephone switching system, a receiver for receiving repeated series of groups of pulses representing a called designation each group of which represents a symbol or digit of said designation and each series of groups of which is separated by a special signal comprising in combination, an identifying means responsive to each group of said groups of pulses for identifying the symbol or digit represented by said group of pulses, a plurality of register circuits connected in a reentrant chain for storing the successively identified symbols or digits, a steering means responsive to each of said groups of pulses for controlling the registration of each of the correspondingly identified symbols or digits in successive registers of the reentrant chain of register circuits, a plurality of storage circuits, a plurality of paths between each of said register circuit and said storage circuits for transferring the setting of said register circuits to said storage circuits, means controlled by said steering means and said special signal for selecting particular paths of said plurality of paths to connect each one of said registers to a particular one of said storage circuits and means controlled by said registers and said special signal for transferring the setting of each of said registers over the selected paths to said storage circuits.

12. In a telephone switching system, a receiver for receiving repeated series of pairs of pulses representing a called designation each pair of which represents a symbol or digit of the said designation and each series of which is separated by a special signal comprising in combination, an identifying means responsive to each of said pairs of pulses for identifying the symbol or digit represented by said pair of pulses, a plurality of register circuits connected in a reentrant chain for storing the successively identified symbols or digits, means for successively setting the individual registers of the reentrant chain of register circuits in accordance with each successively identified symbol or digit, a plurality of storage circuits, a plurality of paths between each of said register circuits and said storage circuits for transferring the setting of said register circuits to said storage circuits, means jointly responsive to said special signal and to the presence of the setting of an identical symbol or digit in all of said register circuits for selecting particular paths of said plurality of paths to connect each one of said registers to a particular one of said storage circuits and means controlled by said registers and said special signal for transferring the setting of each of said registers over the selected paths to said storage circuits.

13. In a telephone switching system, a receiver for receiving repeated series of pairs of pulses representing a called designation each pair of which represents a symbol or digit of said designation and each series of which is separated by a special signal comprising in combination, an identifying means responsive to each pair of said pairs of pulses for identifying the character or value of the symbol or digit represented by said pair of pulses, a plurality of register circuits connected in a reentrant chain for storing the successively identified symbols or digits, a steering means responsive to a pulse of each of the succeeding pairs of pulses for controlling the registration of each of the correspondingly identified symbols or digits in successive registers of the reentrant chain of register circuits, a clearing means controlled by said steering means for clearing a particular register of said reentrant chain of register circuits and conditioning the cleared register to receive a new registration, a plurality of storage circuits, a plurality of paths from each of said register circuits to said storage circuits for transferring the setting of said register circuits to said storage circuits, means controlled by said steering means and said special signal for selecting particular paths of said plurality of paths to connect each one of said registers to a particular one of said storage circuits and means controlled by said registers and said special signal for transferring the setting of each of said registers over the selected paths to said storage circuits.

14. A signal receiver responsive to repeatedly received series of calling signals each series of which is separated by a special signal, a plurality of register circuits connected in a reentrant chain, said plurality being fewer in number than the number of calling signals in each of said series, means for setting a register of the reentrant chain of register circuits in accordance with the first received signal, means for successively setting each remaining succeeding register of said reentrant chain of register circuits in accordance with each succeeding correspondingly received signal, means thereafter for successively clearing each succeeding register of said reentrant chain of register circuits of its previous setting and resetting it in accordance with each correspondingly received succeeding signal, a plurality of storage circuits, means jointly controlled by the setting of all of said registers in said reentrant chain of register circuits and by said special signal to selectively transfer the setting of said register circuits to selected ones of said storage circuits.

15. A pulse receiver comprising in combination, apparatus repsonsive to repeatedly received series of groups of pulses each series of said groups being separated by a special signal, a plurality of register circuits connected in a closed ring, said plurality being fewer in number than the number of groups of pulses in each of said series, means for setting a register of the closed ring of register circuits in accordance with the first received group of pulses, means for successively setting each remaining succeeding register of said closed ring of register circuits in accordance with each succeeding correspondingly received group of pulses, means thereafter for successively clearing each succeeding register of said closed ring of register circuits of its previous setting and resetting it in accordance with each correspondingly received successive group of pulses, a plurality of storage circuits, a plurality of paths from each of said register circuits to said storage circuits for transferring the setting of said register circuits to said storage circuits, means jointly responsive to said special signal and to the presence of a setting in all of said registers in response to said groups of pulses of said series for selecting particular paths of said plurality of paths to connect each one of said registers to a particular one of said storage circuits and means controlled by said registers and said special signal for transferring the setting of each of said registers over the selected paths to said storage circuits.

16. In a telephone switching system, a receiver for receiving repeated series of pairs of pulses representing a called designation each pair of which represents a symbol or digit of said designation and each series of which is separated by a special signal comprising in combination, an identifying means responsive to each pair of said pairs of pulses for identifying the character or value of the symbol or digit represented by said pair of pulses, a plurality of register circuits connected in a reentrant chain for storing the successively identified symbols or digits, said plurality being fewer in number than the number of pairs of pulses in each of said series, means responsive to the second pulse of each of a succeeding pair of pulses for controlling the registration of each of the correspondingly identified symbols or digits in successive registers of the reentrant chain of register circuits, a plurality of storage circuits, a transfer means controlled by said register circuits and responsive to said special signal for transferring the registration of the identified symbols or digits in said register circuits to selected ones of said storage circuits and to arrange the registration in said storage circuits to correspond to the sequence represented by said series.

17. In a telephone switching system, a receiver for receiving repeated series of pairs of pulses representing a called designation each pair of which represents a symbol or digit of said designation and each series of which is separated by a special signal comprising in combination, an identifying means responsive to each pair of said pairs of pulses for identifying the character or value of the symbol or digit represented by said pair of pulses, a plurality of register circuits connected in a reentrant chain for storing the successively identified symbols or digits, said plurality being fewer in number than the number of pairs of pulses in each of said series, a steering means responsive to a pulse of each succeeding pair of pulses for controlling the registration of each of the correspondingly identified symbols or digits in successive registers of the reentrant chain of register circuits, a clearing means controlled by said steering means for clearing a particular register of said reentrant chain of register circuits and conditioning the cleared register to receiver a new registration, a plurality of storage circuits, a plurality of paths from each of said register circuits to said storage circuits for transferring the registration in each of said register circuits to said storage circuits, means controlled by said steering means and said special signal for selecting particular paths of said plurality of paths to connect each one of said registers to a particular one of said storage circuits, and means controlled by said registers and said special signal for transferring the registration in each of said registers over the selected paths to said storage circuits.

18. A series of registers for registering a successive series of digits designated as A to X, inclusive, in which A represents the first digit and X the last digit of the series and in which the serial succession as well as the individual characteristics of each digit has a useful significance, pulsing means for placing said digits in said registers in successive order beginning with any digit from A to X, inclusive, storage devices equal in number to the number of said digits, a plurality of paths from each of said registers to said storage devices for transferring each digit of the series of digits registered in said registers to an individual one of said storage devices, a special indicator means for identifying the register of the series in which a predetermined digit is registered, and a selector controlled by said special indicator means for selecting particular paths of said plurality of paths whereby said digits of said series of digits are selectively transferred to said storage devices always in the order A to X beginning with an invariably predetermined storage device.

19. A system for receiving a succession of digital indicia each represented by a time interval between impulses together with means for registering a special signal having a time interval of distinctly different order than any of said intervals, registers for registering said indicia in a definite sequence but with no definite correspondence between the first of said indicia and the first of said registers, storage devices for said indicia, transfer paths between said registers and said storage devices, there being one possible path between every register and every storage device, transfer path closers for selectively closing said paths in groups with one path of each group unique to each register and unique to a selected storage device, and selective closers for said paths whereby the relation of said special signal to said impulses closes said paths to transfer said digital indicia to said storage devices in the same sequence as in said registers but beginning always with a definite correspondence between the first of said indicia and the first of said storage devices.

References Cited in the file of this patent

UNITED STATES PATENTS

| | | |
|---|---|---|
| 2,603,715 | Vaughan | July 15, 1952 |
| 2,615,971 | Malthaner | Oct. 28, 1952 |
| 2,617,931 | Trousdale | Nov. 11, 1952 |
| 2,620,399 | Malthaner | Dec. 2, 1952 |